US012508580B2

(12) United States Patent
Ma et al.

(10) Patent No.: US 12,508,580 B2
(45) Date of Patent: Dec. 30, 2025

(54) ATOMICALLY DISPERSED METAL CATALYSTS AND APPLICATIONS THEREOF

(71) Applicant: University of South Florida, Tampa, FL (US)

(72) Inventors: Shengqian Ma, Tampa, FL (US); Hui Yang, Beijing (CN)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 101 days.

(21) Appl. No.: 17/221,237

(22) Filed: Apr. 2, 2021

(65) Prior Publication Data

US 2021/0316289 A1 Oct. 14, 2021

Related U.S. Application Data

(60) Provisional application No. 63/008,857, filed on Apr. 13, 2020.

(51) Int. Cl.
| | |
|---|---|
| B01J 31/16 | (2006.01) |
| B01J 37/04 | (2006.01) |
| B01J 37/08 | (2006.01) |
| H01M 4/90 | (2006.01) |
| B01J 35/64 | (2024.01) |
| H01M 8/1004 | (2016.01) |

(52) U.S. Cl.
CPC ........... *B01J 31/1691* (2013.01); *B01J 37/04* (2013.01); *B01J 37/08* (2013.01); *H01M 4/9008* (2013.01); *B01J 35/64* (2024.01); *B01J 2531/842* (2013.01); *B01J 2531/845* (2013.01); *B01J 2531/847* (2013.01); *H01M 8/1004* (2013.01)

(58) Field of Classification Search
None
See application file for complete search history.

(56) References Cited

U.S. PATENT DOCUMENTS 8,480,792 B2 * 7/2013 Yaghi .................... B01J 31/183
95/143

FOREIGN PATENT DOCUMENTS

| CN | 106565964 A | * | 1/2017 |
| CN | 107626294 A | * | 1/2018 |

OTHER PUBLICATIONS

CN 106565964 A, English Translation from Google Patents (Year: 2017).*
Li et al. CN 107626294 A, a machine generated translation is enclosed (Year: 2018).*
Bashyam et al., A class of non-precious metal composite catalysts for fuel cells, 2006, pp. 63-66 (4 pages), vol. 143, Nature.
(Continued)

*Primary Examiner* — Yun Qian
(74) *Attorney, Agent, or Firm* — HUSCH BLACKWELL LLP

(57) ABSTRACT

Described herein is a simple and versatile synthetic strategy for the preparation of metal-organic frameworks comprising a carbon matrix doped with nitrogen atoms, wherein transition metal ions are bonded to the carbon matrix via the nitrogen atoms. This strategy is applicable for the synthesis of single metal catalysts or multi metal catalysts rich with atomically dispersed metal active sites. The metal-organic frameworks provided herein have numerous application when used in fuel cells.

16 Claims, 48 Drawing Sheets

(56) References Cited

OTHER PUBLICATIONS

Benzigar et al., Recent advances in functionalized micro and mesoporous carbon materials: synthesis and applications, 2018, 41 pages, vol. 47, Issue No. 8, Chemical Society Reviews.

Cantillo et al., Investigation of a microporous iron (iii) porphyrin framework derived cathode catalyst in PEM fuel cells, Sep. 16, 2016, pp. 15621-15630, vol. 4, Journal of Materials Chemistry A.

Chang et al., Vitalizing fuel cells with vitamins: pyrolyzed vitamin B12 as a non-precious catalyst for enhanced oxygen reduction reaction of polymer electrolyte fuel cells, 2012, pp. 5305-5314 (14 pages), vol. 5, Energy & Environmental Science.

Chen et al., From bimetallic metal-organic framework to porous carbon: high surface area and multicomponent active dopants for excellent electrocatalysis, 2015, pp. 5010-5016 (7 pages), vol. 27, Advanced Materials.

Chen et al., Enhanced oxygen reduction with single-atomic-site iron catalysts for a zinc-air battery and hydrogen-air fuel cell, 2018, pp. 1-12 (12 pages), vol. 9, Nature communications.

Chen et al., Atomic Fe dispersed on N-doped carbon hollow nanospheres for high-efficiency electrocatalytic oxygen reduction, 2019, 8 pages, vol. 31, Document No. 1806312, Advanced materials.

Cheng et al., Single cobalt atom and N codoped carbon nanofibers as highly durable electrocatalyst for oxygen reduction reaction, 2017, pp. 6864-6871 (8 pages), vol. 7, Acs Catalysis.

Chong et al., Investigation of Oxygen Reduction Activity of Catalysts Derived from Co and Co/Zn Methyl-Imidazolate Frameworks in Proton Exchange Membrane Fuel Cells, 2016, pp. 1541-1545 (5 pages), vol. 3, ChemElectroChem.

Chung et al., Direct atomic-level insight into the active sites of a high-performance PGM-free ORR catalyst, 2017, pp. 479-484 (6 pages), vol. 357, Science.

Ding et al., Space-confinement-induced synthesis of pyridinic-and pyrrolic-nitrogen-doped graphene for the catalysis of oxygen reduction, 2013, pp. 11755-11759 (5 pages), vol. 52, Angewandte Chemie Intenational Edition.

Fei et al., Atomic cobalt on nitrogen-doped graphene for hydrogen generation, 2015, pp. 1-8 (8 pages), vol. 6, Nature communications.

Fei et al, General synthesis and definitive structural identification of MN4C4 single-atom catalysts with tunable electrocatalytic activities, 2018, 12 pages, Center for Functional Nanomaterials, Brookhaven National Laboratory, U.S. Department of Energy.

Fu et al., In situ polymer graphenization ingrained with nanoporosity in a nitrogenous electrocatalyst boosting the performance of polymer-electrolyte-membrane fuel cells, 2017, 8 pages, vol. 29, Document No. 1604456, Advanced Materials.

Galeano et al., Carbon-Based Yolk-Shell Materials for Fuel Cell Applications, 2014, pp. 220-232, vol. 24, Advanced Functional Materials.

Galeano et al., Nitrogen-doped hollow carbon spheres as a support for platinum-based electrocatalysts, 2014, pp. 3856-3868 (13 pages), vol. 4, Acs Catalysis.

Goenaga et al., A family of platinum group metal-free catalysts for oxygen reduction in alkaline media, 2018, pp. 148-157 (10 pages), vol. 395, Journal of Power Sources.

Gokhale et al., Novel dual templating approach for preparation of highly active Fe—NC electrocatalyst for oxygen reduction, 2017, pp. 49-55 (7 pages), vol. 224, Electrochimica Acta.

Guo et al., The oxygen reduction electrocatalytic activity of cobalt and nitrogen co-doped carbon nanocatalyst synthesized by a flat template, 2017, pp. 1-8 (8 pages), vol. 12, Article No. 144, Nanoscale research letters.

Guo et al., Hollow capsules of doped carbon incorporating metal@ metal sulfide and metal@ metal oxide core-shell nanoparticles derived from metal-organic framework composites for efficient oxygen electrocatalysis, 2019, pp. 3624-3631 (8 pages), vol. 7, Journal of Materials Chemistry A.

Han et al., Hollow N-doped carbon spheres with isolated cobalt single atomic sites: superior electrocatalysts for oxygen reduction, 2017, pp. 17269-17272 (4 pages), vol. 139, Journal of the American Chemical Society.

Hu et al., Hollow spheres of iron carbide nanoparticles encased in graphitic layers as oxygen reduction catalysts, 2014, pp. 3749-3753 (5 pages), vol. 126, Issue No. 14, Angewandte Chemie.

Ikeda et al., Ligand-free platinum nanoparticles encapsulated in a hollow porous carbon shell as a highly active heterogeneous hydrogenation catalyst, 2006, pp. 7221-7224 (4 pages), vol. 118, Angewandte Chemie.

Jiang et al., Understanding the high activity of Fe—N—C electrocatalysts in oxygen reduction: Fe/Fe3C nanoparticles boost the activity of Fe—N x, 2016, vol. 138, pp. 3570-3578 (9 pages), Journal of the American Chemical Society.

Kramm et al., Correlations between mass activity and physicochemical properties of Fe/N/C catalysts for the ORR in PEM fuel cell via 57Fe Mossbauer spectroscopy and other techniques, 2014, pp. 978-985, vol. 136, Issue No. 3, Journal of the American Chemical Society.

Lee et al., Recent Progress in the Synthesis of Porous Carbon Materials, 2006, pp. 2073-2094 (22 pages), vol. 18, Advanced Materials.

Lee et al., A highly active and durable Co—N—C electrocatalyst synthesized using exfoliated graphitic carbon nitride hanosheets, 2015, pp. 10334-10339, vol. 7, Nanoscale.

Li et al., Structural and mechanistic basis for the high activity of Fe—N—C catalysts toward oxygen reduction, 2016, pp. 2418-2432 (15 pages), vol. 9, Energy & Environmental Science.

Liang et al., Mesoporous metal-nitrogen-doped carbon electrocatalysts for highly efficient oxygen reduction reaction, 2013, pp. 16002-16005 (4 pages), vol. 135, Journal of the American Chemical Society.

Liang et al., Molecular metal-Nx centres in porous carbon for electrocatalytic hydrogen evolution, 2015, pp. 1-8 (8 pages), vol. 6, Nature communications.

Lin et al., Noble-metal-free Fe-N/C catalyst for highly efficient oxygen reduction reaction under both alkaline and acidic conditions, 2014, pp. 11027-11033 (7 pages), vol. 136, Journal of the American Chemical Society.

Lin et al., Heterometal-embedded organic conjugate frameworks from alternating monomeric iron and cobalt metalloporphyrins and their application in design of porous carbon catalysts, Jun. 10, 2015, pp. 3431-3436 (6 pages), vol. 27, Advanced Materials.

Lin et al., New heterometallic zirconium metalloporphyrin frameworks and their heteroatom-activated high-surface-area carbon derivatives, Feb. 18, 2015, pp. 2235-2238 (4 pages), vol. 137, Journal of the American Chemical Society.

Liu et al., Dopamine as a carbon source: the controlled synthesis of hollow carbon spheres and yolk-structured carbon nanocomposites, 2011, pp. 6799-6802 (6 pages), vol. 50, Angewandte Chemie International Edition.

Liu et al., The solid-phase synthesis of an Fe—N—C electrocatalyst for high-power proton-exchange membrane fuel cells, 2018, pp. 1218-1222 (5 pages), vol. 130, Angewandte Chemie.

Lv et al., Selectively nitrogen-doped carbon materials as superior metal-free catalysts for oxygen reduction, 2018, pp. 1-11 ( 11 pages), vol. 9, Nature Communications.

Ma et al., Cobalt imidazolate framework as precursor for oxygen reduction reaction electrocatalysts, 2011, pp. 2063-2067 (5 pages), vol. 17, Chemistry—A European Journal.

Mamtani et al., Heteroatom-doped carbon nanostructures as oxygen reduction reaction catalysts in acidic media: an overview, 2015, pp. 436-450 (15 pages), vol. 145, Catalysis Letters.

Masa et al., On the role of metals in nitrogen-doped carbon electrocatalysts for oxygen reduction, 2015, pp. 10102-10120 (19 pages), vol. 54, Angewandte Chemie International Edition.

Meng et al., Reactive multifunctional template-induced preparation of Fe—N-doped mesoporous carbon microspheres towards highly efficient electrocatalysts for oxygen reduction, 2016, pp. 7948-7955 (8 pages), vol. 28, Advanced Materials.

Palaniselvam et al., Nanoporous graphene enriched with Fe/Co—N active sites as a promising oxygen reduction electrocatalyst for anion exchange membrane fuel cells, 2016, pp. 2150-2162 (13 pages), vol. 26, Advanced Functional Materials.

(56) References Cited

OTHER PUBLICATIONS

Park et al., Characterization of Zeolitic Imidazolate Framework-derived Polyhedral Carbonaceous Material and its Application to Electrocatalyst for Oxygen Reduction Reaction, International Journal of Electrochemical Science, 2016, pp. 9295-9306 (12 pages), vol. 11.
Proietti et al., Iron-based cathode catalyst with enhanced power density in polymer electrolyte membrane fuel cells, 2011, pp. 1-9 (9 pages), vol. 2, Nature communications.
Roelfes et al., End-on and side-on peroxo derivatives of non-heme iron complexes with pentadentate ligands: models for putative intermediates in biological iron/dioxygen chemistry, 2003, pp. 2639-2653 (15 pages), vol. 42, Issue No. 8, Inorganic Chemistry.
Sa et al., A general approach to preferential formation of active Fe—N x sites in Fe—N/C electrocatalysts for efficient oxygen reduction reaction, 2016, pp. 15046-15056 (11 pages), vol. 138, Journal of the American Chemical Society.
Sahraie et al., Quantifying the density and utilization of active sites in non-precious metal oxygen electroreduction catalysts, Oct. 21, 2015, pp. 1-9 (9 pages), vol. 6, Nature communications.
Serov et al., Fe—N—C oxygen reduction fuel cell catalyst derived from carbendazim: synthesis, structure, and reactivity, 2014, (8 pages), vol. 4, Document No. 1301735, Advanced Energy Materials.
Shen et al., Synergistic effects between atomically dispersed Fe—N—C and C—S—C for the oxygen reduction reaction in acidic media, 2017, pp. 13988-13992 (5 pages), vol. 129, Angewandte Chemie.
Shen et al., Transition metal-nitrogen-carbon nanostructured catalysts for the oxygen reduction reaction: from mechanistic insights to structural optimization, 2017, pp. 1449-1470 (22 pages), vol. 10, Issue No. 5, Nano Research.
Shui et al., Highly efficient nonprecious metal catalyst prepared with metal-organic framework in a continuous carbon hanofibrous network, 2015, pp. 10629-10634 (6 pages), vol. 112, Issue No. 34, Proceedings of the National Academy of Sciences (PNAS).
Strickland et al., Highly active oxygen reduction non-platinum group metal electrocatalyst without direct metal-nitrogen coordination, Jun. 10, 2015, pp. 1-8 (8 pages), vol. 6, Nature communications.
Subramanian et al., Unraveling the Oxygen-Reduction Sites in Graphitic-Carbon Co—N—C-Type Electrocatalysts Prepared by Single-Precursor Pyrolysis, 2017, pp. 1969-1978 (10 pages), vol. 9, ChemCatChem, Chemistry Europe, European Chemical Societies Publishing.
Tang et al., Synthesis of nitrogen-doped mesoporous carbon spheres with extra-large pores through assembly of diblock copolymer micelles, 2015, pp. 588-593 (6 pages), vol. 54, Angewandte Chemie International Edition.
Tian et al., Optimized synthesis of Fe/N/C cathode catalysts for PEM fuel cells: a matter of iron-ligand coordination strength, 2013, pp. 6867-6870 (4 pages), vol. 52, Angewandte Chemie International Edition.
Venna et al., Structural evolution of zeolitic imidazolate framework-8, 2010, pp. 18030-18033 (4 pages), vol. 132, Journal of the American Chemical Society.
Wan et al., A cellulose fibers-supported hierarchical forest-like cuprous oxide/copper array architecture as a flexible and free-standing electrode for symmetric supercapacitors, 2017, p. 17093-17656, vol. 5, Issue 33, Journal of Materials Chemistry A.
Wang et al., MOF derived catalysts for electrochemical oxygen reduction, Sep. 14, 2014, pp. 14064-14070 (9 pages), vol. 2, Journal of Materials Chemistry A.
Wang et al., Platinum-cobalt bimetallic nanoparticles in hollow carbon nanospheres for hydrogenolysis of 5-hydroxymethylfurfural, Feb. 20, 2014, pp. 293-300 (8 pages), vol. 13, Nature materials.
Wang et al., S-doping of an Fe/N/C ORR catalyst for polymer electrolyte membrane fuel cells with high power density, Jul. 2015, pp. 9907-9910 (5 pages), vol. 54, Angewandte Chemie.
Wang et al., Design of N-coordinated dual-metal sites: a stable and active Pt-free catalyst for acidic oxygen reduction reaction, 2017, pp. 17281-17284 (4 pages), vol. 139, Journal of the American Chemical Society.
Wang et al., Nitrogen-Coordinated Single Cobalt Atom Catalysts for Oxygen Reduction in Proton Exchange Membrane Fuel Cells, 2018, 11 pages, vol. 30, Document No. 1706758, Advance Matter.
Workman et al., Fe—N—C catalyst graphitic layer structure and fuel cell performance, 2017, pp. 1489-1493 (5 pages), vol. 2, ACS Energy Letters.
Wu et al., High-Performance Electrocatalysts for Oxygen Reduction Derived from Polyaniline, Iron, and Cobalt, Apr. 22, 2011, pp. 443-447 (6 pages), vol. 332, Science.
Wu et al., Nanostructured nonprecious metal catalysts for oxygen reduction reaction, 2013, pp. 1878-1889 (12 pages), vol. 46, Issue No. 8, Accounts of chemical research.
Wu et al., High-performance electrocatalysts for oxygen reduction derived from cobalt porphyrin-based conjugated mesoporous polymers, 2014, pp. 1450-1455 (6 pages), vol. 26, Advanced materials.
Xia et al., Templated nanoscale porous carbons, 2010, pp. 639-659 (21 pages), vol. 2, Nanoscale.
Xia et al., Well-defined carbon polyhedrons prepared from nano metal-organic frameworks for oxygen reduction, Aug. 14, 2014, 9 pages, Journal of Materials Chemistry A.
Xiao et al., Meso/macroporous nitrogen-doped carbon architectures with iron carbide encapsulated in graphitic layers as an efficient and robust catalyst for the oxygen reduction reaction in both acidic and alkaline solutions, 2015, pp. 2521-2527 (7 pages), vol. 27, Advanced materials.
Xie et al., From Supramolecular Species to Self-Templated Porous Carbon and Metal-Doped Carbon for Oxygen Reduction Reaction Catalysts, 2019, pp. 5017-5021 (5 pages), vol. 131, Angewandte Chemie.
Yang et al., The role of iron in the preparation and oxygen reduction reaction activity of nitrogen-doped carbon, 2015, 18 pages, Chemical Communications.
Yang et al., Catalytically active bimetallic nanoparticles supported on porous carbon capsules derived from metal-organic framework composites, 2016, pp. 11872-11881 (10 pages), vol. 138, Journal of the American Chemical Society.
Yang et al., General synthetic strategy for libraries of supported multicomponent metal nanoparticles, 2018, pp. 4594-4604 (11 pages), vol. 12, ACS nano.
Ye et al., The spin-dependent Seebeck effect and the charge and spin figure of merit in a hybrid structure of single-walled carbon nanotubes and zigzag-edge graphene nanoribbons, 2018, pp. 19424-19429, vol. 20, Physical Chemistry Chemical Physics.
You et al., Bimetal-organic framework self-adjusted synthesis of support-free nonprecious electrocatalysts for efficient oxygen reduction, 2015, pp. 7068-7076 (9 pages), vol. 5, Acs Catalysis.
Yuan et al., A Highly Active and Support-Free Oxygen Reduction Catalyst Prepared from Ultrahigh-Surface-Area Porous Polyporphyrin, 2013, pp. 8507-8511 (5 pages), vol. 125, Angewandte Chemie.
Zang et al., Single Co atoms anchored in porous N-doped carbon for efficient zinc-air battery cathodes, 2018, pp. 8961-8969 (9 pages), vol. 8, Acs Catalysis.
Zhang et al., Porous Carbon Supports: Recent Advances with Various Morphologies and Compositions, 2015, 18 pages, Wiley-VCH.
Zhang et al., A facile route to bimetal and nitrogen-codoped 3D porous graphitic carbon networks for efficient oxygen reduction, 2016, 7 pages, vol. 12, Small.
Zhang et al., Networking pyrolyzed zeolitic imidazolate frameworks by carbon nanotubes improves conductivity and enhances oxygen-reduction performance in polymer-electrolyte-membrane fuel cells, 2017, 7 pages, vol. 29, Document No. 1604556, Advanced Materials.
Zhang et al., Single atomic iron catalysts for oxygen reduction in acidic media: particle size control and thermal activation, 2017, pp. 14143-14149 (7 pages), vol. 139, Journal of the American Chemical Society.

(56) References Cited

OTHER PUBLICATIONS

Zhao et al., Self-supporting oxygen reduction electrocatalysts made from a nitrogen-rich network polymer, 2012, pp. 19528-19531, vol. 134, Journal of the American Chemical Society.

Zhao et al., Highly efficient non-precious metal electrocatalysts prepared from one-pot synthesized zeolitic imidazolate frameworks, 2014, pp. 1093-1097, vol. 26, Advanced Materials.

Zhao et al., Few-layer graphdiyne doped with sp-hybridized nitrogen atoms at acetylenic sites for oxygen reduction electrocatalysis, 2018, pp. 924-931 (8 pages), vol. 10, Nature chemistry.

Zhao et al., Cascade anchoring strategy for general mass production of high-loading single-atomic metal-nitrogen catalysts, 2019, pp. 1-11 (11 pages), vol. 10, Nature communications.

Zhao et al., Puffing up energetic metal-organic frameworks to large carbon networks with hierarchical porosity and atomically dispersed metal sites, 2019, pp. 1997-2001 (5 pages), vol. 131, Angewandte Chemie.

Zhi et al., From Well-Defined Carbon-Rich Precursors to Monodisperse Carbon Particles with Hierarchic Structures, 2007, pp. 1849-1853, vol. 19, Advanced Materials.

Zhu et al., Atomically dispersed Fe/N-doped hierarchical carbon architectures derived from a metal-organic framework composite for extremely efficient electrocatalysis, 2017, pp. 504-511 (8 pages), vol. 2, ACS Energy Letters.

Zitolo et al., Identification of catalytic sites for oxygen reduction in iron-and nitrogen-doped graphene materials, 2015, pp. 937-942, vol. 14, Nature materials.

Zitolo et al., Identification of catalytic sites in cobalt-nitrogen-carbon materials for the oxygen reduction reaction, 2017, pp. 1-11 (11 pages), vol. 8, Nature communications.

\* cited by examiner

ATOMICALLY DISPERSED METAL CATALYSTS AND APPLICATIONS THEREOF

CROSS-REFERENCE TO RELATED APPLICATIONS

This application claims the benefit of and priority to U.S. Provisional Patent Application No. 63/008,857, filed on Apr. 13, 2020, the contents of which are incorporated by reference herein in their entireties.

BACKGROUND

At present, generally the most effective catalyst for electrocatalytic reactions utilizes a platinum (Pt) electrode catalyst supported on an amorphous carbon substrate. A typical Pt loading on membrane electrode assembly (MEA) surface ranges from about 0.2 mg/cm$^2$ to about 0.4 mg/cm$^2$. Because platinum is a precious metal with limited supply, its use as a catalyst adds a significant cost to a PEMFC system. Other platinum group metals (PGMs), such as Pd, Rh, Ru, etc., are being evaluated as a possible replacement for Pt. However, PGMs also generally suffer from high cost and limited reserves. As such, the use of PGMs in electrochemical devices such as a fuel cell typically adds significant cost to the system and represents a major barrier to commercialization. There is a strong need to find low cost materials as non-PGM catalyst to replace the usage of PGM materials therefore the overall cost of the fuel cell system. In light of these considerations, there is a need to develop a low cost alternative to PGMs as the electrode catalyst for fuel cells and similar electrocatalytic applications.

SUMMARY

Described herein is a simple and versatile synthetic strategy for the preparation of metal-organic frameworks comprising a carbon matrix doped with nitrogen atoms, wherein transition metal ions are bonded to the carbon matrix via the nitrogen atoms. This strategy is applicable for the synthesis of single metal catalysts or multi metal catalysts rich with atomically dispersed metal active sites. The metal-organic frameworks provided herein have numerous application when used in fuel cells.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
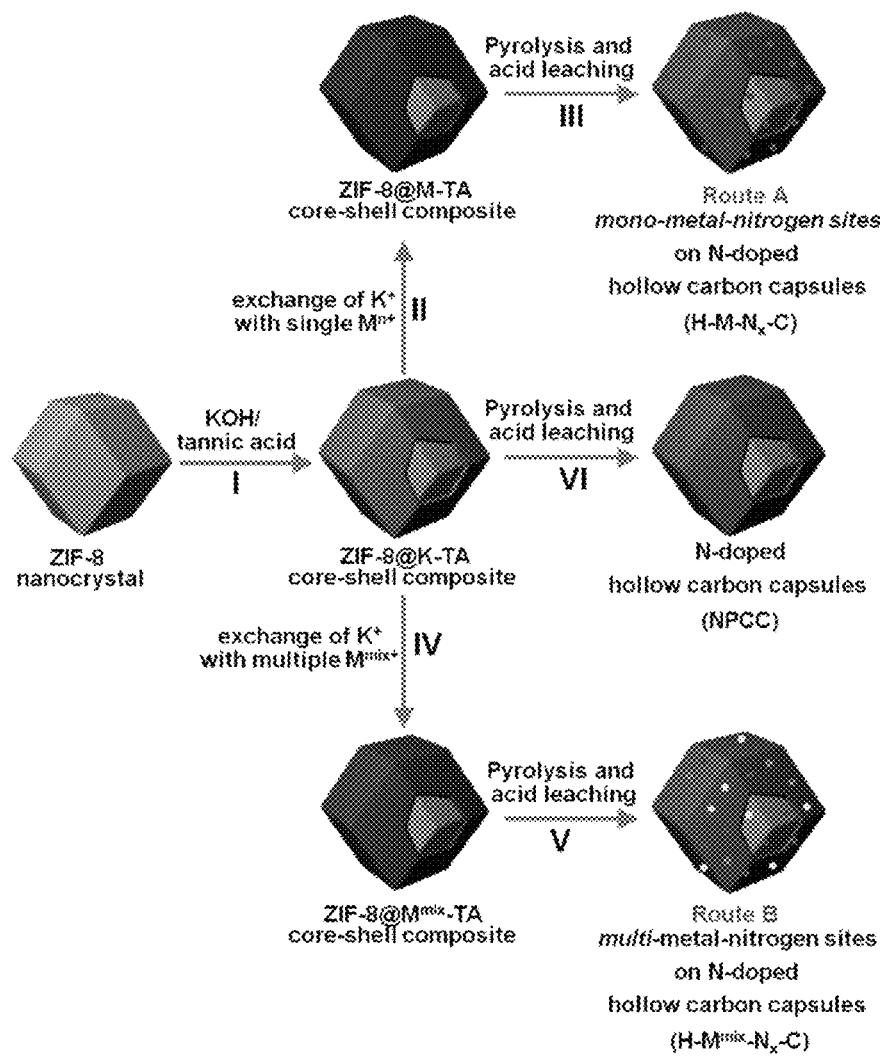
FIG. 1 shows a schematic of the various routes for producing the metal-organic frameworks described herein.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

In the specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "a solvent" includes mixtures of two or more solvents and the like.

"Optional" or "optionally" means that the subsequently described event or circumstance can or cannot occur, and that the description includes instances where the event or circumstance occurs and instances where it does not.

Throughout this specification, unless the context dictates otherwise, the word "comprise," or variations such as "comprises" or "comprising," will be understood to imply the inclusion of a stated element, integer, step, or group of elements, integers, or steps, but not the exclusion of any other element, integer, step, or group of elements, integers, or steps.

As used herein, the term "about" is used to provide flexibility to a numerical range endpoint by providing that a given numerical value may be "a little above" or "a little below" the endpoint without affecting the desired result. For purposes of the present disclosure, "about" refers to a range extending from 10% below the numerical value to 10% above the numerical value. For example, if the numerical value is 10, "about 10" means between 9 and 11 inclusive of the endpoints 9 and 11.

As used herein, the term "admixing" is defined as mixing two or more components together so that there is no chemical reaction or physical interaction. The term "admixing" also includes the chemical reaction or physical interaction between the two or more components.

As used herein, a zeolitic imidazolate frameworks (ZIFs) are a class of metal-organic frameworks that are topologically isomorphic with zeolites. ZIFs are composed of tetrahedrally-coordinated transition metal ions (e.g. Fe, Co, Cu, Zn) connected by imidazolate linkers. In one aspect, the zeolitic imidazolate framework is a zinc-based ZIF including, but not limited to, ZIF-1, ZIF-2, ZIF-3, ZIF-4, ZIF-5, ZIF-7, ZIF-8, ZIF-68, or any combination thereof.

As used herein, "aryl group" is any carbon-based aromatic group including, but not limited to, benzene, naphthalene, etc. The term "aryl group" also includes "heteroaryl group," which is defined as an aryl group that has at least one heteroatom incorporated within the ring of the aromatic ring. Examples of heteroatoms include, but are not limited to, nitrogen, oxygen, sulfur, and phosphorus. In one aspect, the heteroaryl group is imidazole. The aryl group can be substituted or unsubstituted. The aryl group can be substituted with one or more groups including, but not limited to, alkyl, alkynyl, alkenyl, aryl, halide, nitro, amino, ester, ketone, aldehyde, carboxylic acid, or alkoxy.

As used herein, a polyphenol is an organic compound comprising two or more aryl groups, wherein two or more aryl groups have at least one hydroxyl group directly bonded to the aryl group or indirectly bonded to the aryl group via a linker. In one aspect, the polyphenol has from 2, 3, 4, 5, 6, 7, 8, 9, 10, 11, 12, 13, 14, 15, 16, 17, 18, 19, or 20 aryl groups, where each phenyl group has from 1 to 4 hydroxyl groups covalently bonded to each aryl group. In one aspect, the polyphenol has from 2, 3, 4, 5, 6, 7, 8, 9, 10, 11, 12, 13, 14, 15, 16, 17, 18, 19, or 20 phenyl groups, where each phenyl group has from 1 to 4 hydroxyl groups covalently bonded to each phenyl group. An example of a polyphenol useful herein includes, but is not limited to, tannic acid.

In certain aspects, a salt of the polyphenol can be used to produce the metal organic frameworks described herein. In one aspect, one or more hydroxyl protons can be deprotonated from the polyphenol by treating the polyphenol with a strong base. In one aspect, the polyphenol can be treated with an alkali metal base (e.g., LiOH, NaOH, or KOH) or an alkaline earth metal base (e.g., $CaOH_2$, $MgOH_2$) to produce the salt of the of the polyphenol.

As used herein, a plurality of items, structural elements, compositional elements, and/or materials may be presented in a common list for convenience. However, these lists should be construed as though each member of the list is individually identified as a separate and unique member. Thus, no individual member of any such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an example, a numerical range of "about 1" to "about 5" should be interpreted to include not only the explicitly recited values of about 1 to about 5, but also to include individual values and sub-ranges within the indicated range. Thus, included in this numerical range are individual values such as 2, 3, and 4, the sub-ranges such as from 1-3, from 2-4, from 3-5, from about 1-about 3, from 1 to about 3, from about 1 to 3, etc., as well as 1, 2, 3, 4, and 5, individually. The same principle applies to ranges reciting only one numerical value as a minimum or maximum. The ranges should be interpreted as including endpoints (e.g., when a range of "from about 1 to 3" is recited, the range includes both of the endpoints 1 and 3 as well as the values in between). Furthermore, such an interpretation should apply regardless of the breadth or range of the characters being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed, that while specific reference to each various individual combination and permutation of these compounds may not be explicitly disclosed, each is specifically contemplated and described herein. For example, if a ZIF is disclosed and discussed, and a number of different transition metal ions are discussed, each and every combination of ZIF and transition metal ion that is possible is specifically contemplated unless specifically indicated to the contrary. For example, if a class of ZIFs A, B, and C are disclosed, as well as a class of transition metal ions D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, and C; D, E, and F; and the example combination A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such composition is specifically contemplated and should be considered disclosed.

Metal Organic Frameworks (MOF)

Described herein are metal organic frameworks comprising a carbon matrix doped with nitrogen atoms, wherein transition metal ions are bonded to the carbon matrix via the nitrogen atoms. The metal organic frameworks have unique structural and physical properties, which lends them to be versatile in a number of different applications and uses. Methods for preparing and using the metal organic frameworks described herein are provided below.

Provided herein is a synthetic strategy that can create diverse libraries of porous carbon catalysts supporting single metal atom catalysts. Such versatility allows the fast synthesis and screening of diverse electrocatalysts for target applications. Improvements in overall catalytic activities and stability are demanded for practical applications, which may be achievable through judicious selection of the metals and relative proportions of individual metal components in the catalysts.

In one aspect, the metal-organic framework is produced by
(a) pyrolyzing a metal-organic framework precursor, wherein the metal-organic framework precursor comprises a zeolitic imidazolate framework comprising a polyphenol coating with one or more transition metal ions to produce a first pyrolyzed product;
(b) contacting the first pyrolyzed product with an acid to produce a second product;
(c) pyrolyzing the second product to produce the metal-organic framework.

In one aspect, the metal-organic framework precursor is produced by (i) coating the zeolitic imidazolate framework with a polyphenol or salt thereof to produce a first coated product; and (ii) admixing the first coated product with one or more transition metal salts. In one aspect, the zeolitic imidazolate framework is admixed with the polyphenol in a solvent such as for example, water or an organic solvent to produce the coated product. In another aspect, the zeolitic imidazolate framework is admixed with a polyphenol salt in a solvent such as for example, water or an organic solvent to produce the coated product. The Examples provide non-limiting procedures for producing the coated ZIF particles useful herein.

The coated particle is then admixed with one or more transition metal salts. In one aspect, a salt of iron, nickel, cobalt, platinum, palladium, rhodium, iridium, rhenium, ruthenium, chromium, or any combination thereof can be admixed with the coated ZIF particles. In one aspect, the transition metal salt is a metal nitrate, a metal acetate, or a metal chloride. In another aspect, the transition metal salt is a nitrate, acetate, or chloride salt of iron, nickel, cobalt, platinum, palladium, rhodium, iridium, rhenium, ruthenium, chromium, or any combination thereof. The coated ZIF particles and one or more transition metal salts can be admixed with one another in an organic solvent to produce the metal-organic framework precursor. The Examples provide non-limiting procedures for producing the metal-organic framework precursors.

The metal-organic framework precursor is next pyrolyzed to produce a first pyrolyzed product. In one aspect, the metal-organic framework precursor is pyrolyzed at a temperature up to about 1,200° C., or about 700° C., about 800° C., about 900° C., about 1,000° C., about 1,100° C., or about 1,200° C., where any value can be a lower and upper endpoint of a range (e.g., about 700° C. to about 1,100° C., about 800° C. to about 1,000° C., etc.). In another aspect, the metal-organic framework precursor is pyrolyzed under an inert atmosphere such as nitrogen or argon. In another aspect, the metal-organic framework precursor is pyrolyzed at a temperature up to about 1,200° C. from about 0.5 hours to about 12 hours.

After the metal-organic framework precursor is pyrolyzed to produce a first pyrolyzed product, the first pyrolyzed product is contacted with an acid to produce a second product. In one aspect, the first pyrolyzed product is immersed in a solution of acid. In one aspect, the first pyrolyzed product is cooled to room temperature (e.g., 20° C. to 30° C.) prior to immersing the first pyrolyzed product in the acid. In another aspect, the first pyrolyzed product is immersed in the acid while the first pyrolyzed product is still warm or hot.

In one aspect, the acid is a strong acid such as, for example, $H_2SO_4$, HCl, $H_3PO_4$. In another aspect, the acid is a strong acid having a concentration of from about 0.1 M to about 1.0 M, or about 0.1 M, about 0.2 M, about 0.3 M, about 0.4 M, about 0.5 M, about 0.6 M, about 0.7 M, about 0.8 M, about 0.9 M, or about 1.0 M, where any value can be a lower and upper endpoint of a range (e.g., about 0.3 M to about 0.7 M, about 0.4 M to about 0.6 M, etc.).

In certain aspects, the first pyrolyzed product can be admixed with the acid at an elevated temperature to produce the second product. In one aspect, the first pyrolyzed product and acid are admixed at a temperature up to about 120° C., or about 70° C., about 80° C., about 90° C., about 100° C., about 110° C., or about 120° C., where any value can be a lower and upper endpoint of a range (e.g., about 70° C. to about 110° C., about 80° C. to about 100° C., etc.). In another aspect, the first pyrolyzed product and acid are admixed at a temperature up to about 120° C. from about 0.5 hours to about 24 hours to produce the second product. After the second product is produced, it can be further processed such as, for example, washing the second product with water and subsequent drying.

The second product is next pyrolyzed to produce the metal-organic framework. In one aspect, the second product is pyrolyzed at a temperature up to about 1,200° C., or about 700° C., about 800° C., about 900° C., about 1,000° C., about 1,100° C., or about 1,200° C., where any value can be a lower and upper endpoint of a range (e.g., about 700° C. to about 1,100° C., about 800° C. to about 1,000° C., etc.).

In another aspect, the second product is pyrolyzed under an inert atmosphere such as nitrogen or argon. In another aspect, the second product is pyrolyzed at a temperature up to about 1,200° C. from about 0.5 hours to about 12 hours.

The metal-organic frameworks described herein have one or more transition metal ions that are atomically dispersed throughout the metal-organic framework. The metal-organic frameworks described herein do not possess transition metal ion nanoparticles as determined by transmission emission microscopy (TEM) and powder x-ray diffraction (PXRD).

Not wishing to be bound by theory, the transition metal ions are coordinated by nitrogen atoms present in the organic (e.g., carbon) framework. In one aspect, the amount of nitrogen in the metal-framework is from about 1 wt % to about 20 wt % of the metal-organic framework, or about 1 wt %, about 2 wt %, about 3 wt %, about 4 wt %, about 5 wt %, about 6 wt %, about 7 wt %, about 8 wt %, about 9 wt %, about 10 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, where any value can be a lower and upper endpoint of a range (e.g., about 5 wt % to about 15 wt %, etc.).

The amount of transition metal ions present in the metal-organic frameworks can vary. In one aspect, the transition metal ions are from about 0.2 wt % to about 3 wt % of the metal-organic framework, or about 0.2 wt %, about 0.4 wt %, about 0.6 wt %, about 0.8 wt %, about 1.0 wt %, about 1.2 wt %, about 1.4 wt %, about 1.6 wt %, about 1.8 wt %, about 2.0 wt %, about 2.2 wt %, about 2.4 wt %, about 2.6 wt %, about 2.8 wt %, or about 3.0 wt %, where any value can be a lower and upper endpoint of a range (e.g., about 1.0 wt % to about 2.2 wt %, etc.).

In one aspect, the transition metal ions can be a single transition metal. In another aspect, the transition metal ions can be a mixture of two or more transition metals. Mixed oxidation states are also contemplated as well. For example, when the transition metal is iron, it can be $Fe^{+2}$, $Fe^{+3}$, or a combination thereof.

In one aspect, the transition metal ion is iron, wherein the amount of iron ions in the metal-framework is from about 0.2 wt % to about 2 wt % of the metal-organic framework, or about 0.2 wt %, about 0.4 wt %, about 0.6 wt %, about 0.8 wt %, about 1.0 wt %, about 1.2 wt %, about 1.4 wt %, about 1.6 wt %, about 1.8 wt %, or about 2.0 wt %, where any value can be a lower and upper endpoint of a range (e.g., about 1.0 wt % to about 1.6 wt %, etc.).

In one aspect, the transition metal ion is cobalt, wherein the amount of cobalt ions in the metal-framework is from about 0.2 wt % to about 3 wt % of the metal-organic framework, or about 0.2 wt %, about 0.4 wt %, about 0.6 wt %, about 0.8 wt %, about 1.0 wt %, about 1.2 wt %, about 1.4 wt %, about 1.6 wt %, about 1.8 wt %, about 2.0 wt %, about 2.2 wt %, about 2.4 wt %, about 2.6 wt %, about 2.8 wt %, or about 3.0 wt %, where any value can be a lower and upper endpoint of a range (e.g., about 1.0 wt % to about 2.2 wt %, etc.).

In one aspect, the transition metal ion is nickel, wherein the amount of nickel ions in the metal-framework is from about 0.2 wt % to about 3 wt % of the metal-organic framework, or about 0.2 wt %, about 0.4 wt %, about 0.6 wt %, about 0.8 wt %, about 1.0 wt %, about 1.2 wt %, about 1.4 wt %, about 1.6 wt %, about 1.8 wt %, about 2.0 wt %, about 2.2 wt %, about 2.4 wt %, about 2.6 wt %, about 2.8 wt %, or about 3.0 wt %, where any value can be a lower and upper endpoint of a range (e.g., about 1.0 wt % to about 2.2 wt %, etc.).

In one aspect, the transition metal ion is iron and cobalt, wherein the amount of iron and cobalt ions in the metal-framework is independently from about 0.1 wt % to about 1 wt % of the metal-organic framework, or about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1.0 wt %, where any value can be a lower and upper endpoint of a range (e.g., about 0.2 wt % to about 0.6 wt %, etc.).

In one aspect, the transition metal ion is iron and nickel, wherein the amount of iron and nickel ions in the metal-framework is independently from about 0.1 wt % to about 1 wt % of the metal-organic framework, or about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1.0 wt %, where any value can be a lower and upper endpoint of a range (e.g., about 0.2 wt % to about 0.6 wt %, etc.).

In one aspect, the transition metal ion is iron, cobalt, and nickel, wherein the amount of iron, cobalt, and nickel ions in the metal-framework is independently from about 0.1 wt % to about 1 wt % of the metal-organic framework, or about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1.0 wt %, where any value can be a lower and upper endpoint of a range (e.g., about 0.2 wt % to about 0.6 wt %, etc.).

The mental-organic frameworks described herein have certain physical properties that make them very useful in catalytic applications. In one aspect, the mental-organic frameworks described herein have a Brunauer-Emmett-Teller (BET) surface area of about 800 $m^2/g$ to about 1,100 $m^2/g$, or about 800 $m^2/g$, about 820 $m^2/g$, about 840 $m^2/g$, about 860 $m^2/g$, about 880 $m^2/g$, about 900 $m^2/g$, about 920 $m^2/g$, about 940 $m^2/g$, about 960 $m^2/g$, about 980 $m^2/g$, 1,000 $m^2/g$, 1,020 $m^2/g$, about 1,040 $m^2/g$, about 1,060 $m^2/g$, about 1,080 $m^2/g$, or about 1,100 $m^2/g$, where any value can be a lower and upper endpoint of a range (e.g., about 840 $m^2/g$ to about 1.40 $m^2/g$, etc.).

In another aspect, the organic frameworks described herein have a total pore volume of about 0.5 $cm^3/g$ to about 0.70 $cm^3/g$, or about 0.5 $cm^3/g$, about 0.55 $cm^3/g$, about 0.60 $cm^3/g$, about 0.65 $cm^3/g$, or about 0.70 $cm^3/g$, where any value can be a lower and upper endpoint of a range (e.g., about 0.55 $cm^3/g$ to about 0.65 $cm^3/g$, etc.).

Applications of Frameworks

The metal-organic frameworks described herein can be used as electrocatalysts in fuel cells. A fuel cell is an electrochemical cell comprising two electrodes separated by an electrolyte. Electrochemical reactions occur at the electrodes, and the chemical energy of the fuel and the oxidant is converted to electrical energy and heat.

Depending upon the application of the fuel cell, the cathode or anode can include the metal-organic framework described herein. In one aspect, when the fuel cell is used to perform an oxygen reduction reaction (ORR), the cathode includes the metal-organic framework described herein. The oxygen reduction reaction is depicted in equation (1) below.

$$O_2 + 4e^- + 4H^+ \rightarrow 2H_2O \tag{1}$$

In general, the cathodic oxygen reduction reaction, such as that described by Equation 1, typically occurs at the surface of an electrocatalyst. Molecular oxygen is first adsorbed on the electrocatalyst and is subsequently converted to water by capturing four electrons and reacting with four protons.

In another aspect, the metal-organic frameworks described herein can be used in the electrolysis of water. The electrolysis of water is a combination of two space separated electrochemical processes—the hydrogen and oxygen evolution reactions (HER and OER, respectively).

In one aspect, the anode of the fuel cell includes the metal-organic framework described herein to perform an oxygen evolution reaction (OER). The oxygen and hydrogen evolution reactions are depicted in equation (2).

$$2H_2O \rightarrow O_2 + 4e^- + 4H^+ \quad (2)$$

In another aspect, when the cathode of the fuel cell includes the metal-organic framework described herein in order to perform a hydrogen evolution reaction (HER). The hydrogen evolution reaction is depicted in equation (3).

$$2H^+ + 2e^- \rightarrow H_2 \quad (3)$$

In one aspect, the fuel includes a cathode, anode, and an electrolyte, where the cathode and/or anode include the metal-organic framework described herein. In one aspect, the electrolyte is an acidic electrolyte or an alkaline electrolyte.

In another aspect, the fuel cell comprises a membrane electrode assembly. In a hydrogen-fueled or alcohol-fueled proton exchange membrane fuel cell (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

In one aspect, the metal-organic framework described herein can be used as a cathode layer in a membrane electrode assembly (MEA). In one aspect, the metal-organic framework can be applied to a membrane as an ink to form a catalyst coated membrane (CCM) or as a layer on a gas diffusion layer (GDL) to form a gas diffusion electrode (GDE), and then into the MEA of a PEMFC.

Aspects

The following listing of exemplary aspects supports and is supported by the disclosure provided herein.

Aspect 1. A metal-organic framework comprising a carbon matrix doped with nitrogen atoms, wherein transition metal ions are bonded to the carbon matrix via the nitrogen atoms.

Aspect 2. A metal-organic framework produced by
(a) pyrolyzing a metal-organic framework precursor, wherein the metal-organic framework precursor comprises a zeolitic imidazolate framework comprising a polyphenol coating with one or more transition metal ions to produce a first pyrolyzed product;
(b) contacting the first pyrolyzed product with an acid to produce a second product;
(c) pyrolyzing the second product to produce the metal-organic framework.

Aspect 3. The metal-organic framework of aspect 2, wherein the metal-organic framework precursor is produced by (i) coating the zeolitic imidazolate framework with a polyphenol or salt thereof to produce a first coated product; and (ii) admixing the first coated product with one or more transition metal salts.

Aspect 4. The metal-organic framework of aspect 3, wherein the polyphenol salt comprises an alkali metal salt or an alkaline earth metal salt.

Aspect 5. The metal-organic framework in any one of aspects 2 to 4, wherein the zeolitic imidazolate framework is all zinc-based ZIFs, including but not limited to ZIF-1, ZIF-2, ZIF-3, ZIF-4, ZIF-5, ZIF-7, ZIF-8, ZIF-68, or any combination thereof.

Aspect 6. The metal-organic framework in any one of aspects 2 to 5, wherein the zeolitic imidazolate framework is ZIF-8.

Aspect 7. The metal-organic framework in any one of aspects 2 to 6, wherein the polyphenol comprises tannic acid.

Aspect 8. The metal-organic framework in any one of aspects 1 to 7, wherein the transition metal ions comprises iron, nickel, cobalt, platinum, palladium, rhodium, iridium, rhenium, ruthenium, chromium, or any combination thereof.

Aspect 9. The metal-organic framework in any one of aspects 1 to 7, wherein the transition metal ions comprises iron.

Aspect 10. The metal-organic framework in any one of aspects 1 to 7, wherein the transition metal ions comprises iron with nickel, cobalt, or a combination thereof.

Aspect 11. The metal-organic framework in any one of aspects 1 to 10, wherein the transition metal ions is from 0.2 wt % to 3 wt % of the metal-organic framework.

Aspect 12. The metal-organic framework in any one of aspects 1 to 11, wherein the metal-organic framework has nitrogen in the amount of from about 1 wt % to about 20 wt %.

Aspect 13. The metal-organic framework in any one of aspects 2 to 12, wherein the metal-organic framework precursor is pyrolyzed at a temperature up to about 1,200° C.

Aspect 14. The metal-organic framework in any one of aspects 2 to 13, wherein the metal-organic framework precursor is pyrolyzed under an inert atmosphere.

Aspect 15. The metal-organic framework in any one of aspects 2 to 14, wherein the first pyrolyzed product is admixed with an acid having a concentration of from about 0.1 M to about 1.0 M.

Aspect 16. The metal-organic framework in any one of aspects 2 to 15, wherein the second product is pyrolyzed at a temperature up to about 1,200° C.

Aspect 17. The metal-organic framework in any one of aspects 1 to 16, wherein the second product is pyrolyzed under an inert atmosphere.

Aspect 18. The metal-organic framework in any one of aspects 1 to 17, wherein the metal-organic framework has a Brunauer-Emmett-Teller (BET) surface area of about 800 $m^2/g$ to about 1,100 $m^2/g$.

Aspect 19. The metal-organic framework in any one of aspects 1 to 17, wherein the metal-organic framework has a total pore volume of about 0.5 $cm^3/g$ to about 0.7 $cm^3/g$.

Aspect 20. An ink comprising the metal-organic framework in any one of aspects 1 to 19.

Aspect 21. A fuel cell comprising a cathode and anode, wherein the cathode or the anode comprises the metal-organic framework in any one of aspects 1 to 19.

Aspect 22. The fuel cell of aspect 21, wherein the fuel cell comprises a membrane electrode assembly comprising a cathode and anode, wherein the cathode comprises the metal-organic framework in any one of aspects 1 to 19.

Aspect 23. The fuel cell of aspect 21 or 22, wherein the fuel cell comprises an acidic electrolyte or an alkaline electrolyte.

Aspect 24. A method for performing oxygen reduction reaction (ORR), the method comprising introducing oxygen into the fuel cell in any one of aspects 21 to 23.

Aspect 25. A method for performing oxygen evolution reaction (OER), the method comprising introducing oxygen into the fuel cell in any one of aspects 21 to 23.

Aspect 26. A method for performing hydrogen evolution reaction (HER), the method comprising introducing hydrogen into the fuel cell in any one of aspects 21 to 23.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. Numerous variations and combinations of reaction conditions (e.g., component concentrations, desired solvents, solvent mixtures, temperatures, pressures, and other reaction ranges and conditions) can be used to optimize the product purity and yield obtained from the described process. Only reasonable and routine experimentation will be required to optimize such process conditions.
Chemicals Solvents were purified according to standard laboratory methods. Other commercially available reagents were purchased in high purity and used without further purification.

Experimental Methods

Chemicals

All reagents and solvents were sourced from commercial sources and used without further purification, unless otherwise noted.
Instrumentation Powder X-ray diffraction (PXRD) patterns were collected on Bruker AXS X-ray diffractometer with Cu Kα source. BET surface areas were determined from $N_2$ adsorption/desorption isotherms obtained at 77 K using a Micromeritics ASAP2020. Samples were heated under vacuum at 100° C. for 5 h before the measurements. Scanning electron microscopy (SEM) images and energy dispersive spectra (EDS) were recorded on a Hitachi 800 Scanning Electron Microscope equipped with an EDS module. Transmission electron microscopy (TEM) analyses were performed on a Tecnai F20 Transmission Electron Microscope operating at an accelerating voltage of 200 kV. Scanning transmission electron microscopy (STEM) images and EDS mapping analyses were carried out on a JEOL JEM-2100F Transmission Electron Microscope operating at an accelerating voltage of 200 kV. HAADF-STEM images were collected on a Titan G2 80-200 ChemiSTEM scanning transmission electron microscope operated at 200 kV, equipped with a probe spherical aberration corrector. Inductively coupled plasma atomic emission spectroscopy (ICP-AES) data was obtained on a Jobin Yvon Horiba-Ultima 2 spectrometer system. Elemental analyses (EA) were performed on a Vario MICRO analysis system. Raman spectra were measured on a Raman system and excited with a Cobolt Samba™ 532 nm diode laser. Powder samples were spread over a quartz substrate for the Raman measurements. X-ray photoelectron spectroscopy (XPS) analyses were performed on Kratos Axis DLD spectrometer, fitted with a monochromated Al Kα X-ray source. Fourier transform infrared spectra (FTIR) were recorded on a ThermoElectron Nicolet high-resolution FT-MIR/FT-FarIR. $^{57}$Fe Mössbauer measurements were performed on a Ms-500 Mössbauer spectrometer at room temperature. The spectra were calibrated with respect to α-Fe standard.

X-ray absorption spectra at the Fe K-edge were collected in transmission mode on beamline 10BM-B of the Advanced Photon Source. A Hitachi Vortex-ME4 four-element silicon drift fluorescence detector was used. For all samples, data acquistion was continued until an adequate signal-to-noise ratio had been obtained, requiring from 3-10 scans depnding on the sample. The X-ray beam was monochromatized using a Si (111) monochromator and detuned by 50% to reduce the contribution of higher-order harmonics. All Fe K-edge spectra were collected at ambient temperature. The data were processed using the Athena and Artemis programs of the IFEFFIT package. Reference foil data were aligned to the first zero-crossing of the second derivative of normalized μ(E) data, which was calibrated to the literature $E_0$ value for the iron K-edge. Spectra were averaged in μ(E) prior to normalization. Background removal was achieved by spline fitting. EXAFS data were extracted above the threshold energy, $E_0$. FEFF 9 was used to calculate theoretical phases and amplitudes from structure models consisting of crystal structures or the Cartesian coordinates of geometrically optimized computational models. All data were initially fitted with simultaneous k-weighting of 1, 2, and 3, then finalized with $k^3$-weighting in R-space. Fit windows in k-space were determined based on the lowest quality data collected, and for all data sets were from 0-6 Å$^{-1}$. Fit windows in R-space were determined on a case-by-case basis, based on the features apparent in the spectrum. In all fits, the amplitude reduction factor ($S_0^2$) and energy shift of the photoelectron ($\Delta E_0$) were global parameters. Independent structural parameters determined by the fits included the change in the scattering half path length (R) and the relative mean square displacement of the scattering element ($\sigma^2$). For each fit, the number of variables was not permitted to exceed 2/3 the number of independent points, in keeping with the Nyquist criterion.

X-ray absorption spectra at the Co K-edge and Ni K-edges were collected on the X-ray Absorption Spectroscopy beamline at the Australian Synchrotron (200 mA, 3.0 GeV). The X-ray beam was monochromatized using a Si (111) monochromator. Fluorescence spectra were collected in transmittance mode. Incident and transmitted X-rays were monitored using gas ionization chambers. The energy scales were calibrated using Co and Ni foils, respectively. All data processing procedures were similar to those described above for the Fe K-edge measurements.

Fe, Co and Ni L-edge XANES spectra, as well as C K-edge and N K-edge XANES spectra, were collected in the partial electron yield (PEY) mode on the Soft X-ray beamline at the Australian Synchrotron. The PEY data were normalized against a current measured simultaneously on a gold mesh in the beamline to eliminate potential spectral artefacts caused by fluctuations in the beam intensity whilst scanning. Samples were sprinkled on carbon adhesive tape for the analyses.
Rotating Ring Disk Electrochemistry Oxygen reduction reaction (ORR) tests were performed by employing a Bio-Logic multi-channel VMP3 Potentiostat, a Pine instruments MSR rotator and ring rotating disk electrode (RRDE) electrode with a glassy carbon disk (0.2472 cm$^2$) and Pt ring (6.25 mm of ring inner, 7.92 mm of outer diameter, and 320 μm ring-disk gap). Catalyst inks were prepared by combining 5 mg of the catalyst in methanol solvent with Nafion solution (70:30 catalyst to ionomer ratio). The ink was ultrasonically mixed for 15 min and continually stirred during the weighing and deposition processes. The loading was determined by depositing an aliquot of the ink onto a piece of aluminum foil and measuring the weight with a Mettler Toledo XP2U microbalance. The volume of the ink was adjusted to reach the desired loading of 100 μg $_{catalyst}$/cm$^2$. The catalyst ink was deposited onto the glassy carbon disk/Pt ring RRDE working electrode, which had previously been polished on a felt pad with a 5 micron and then a 0.05 micron alumina slurry and then thoroughly rinsed.

All electrochemical tests were performed on a standard three-electrode system with a RRDE working electrode, a Hg/HgSO$_4$ reference electrode and a gold counter electrode. The potential of the reference electrode vs. the reversible hydrogen electrode (RHE) was measured experimentally by saturating the electrolyte with hydrogen for 0.5 h and testing the open circuit potential (OCV) using a Pt working electrode. The experiments were performed in 0.5 M H$_2$SO$_4$ solution at room temperature (except for the experiment involving Pt/C catalysts, which was performed in 0.1 M HClO$_4$). Cyclic voltammograms (CVs) were collected in a nitrogen-saturated electrolyte between 0 V and 1.1 V vs. RHE with a scan rate of 10 mV s$^{-1}$ and a rotation rate of 1600 rpm. The electrolyte was then purged with oxygen and CVs were collected as described above with the electrode rotating at 1600 rpm.

Membrane Electrode Assembly (MEA) Preparation and Single Fuel Cell Tests

Proton exchange membrane fuel cell (PEMFC) tests were conducted by using a BioLogic HCP-803 Potentiostat. To fabricate electrodes for the fuel cell tests, cathode catalyst inks were prepared by sonicating 15 mg of the as-prepared catalyst powder with 200 mg of 5 wt. % Nafion® solution, 2 mL of isopropanol and 1 mL of deionized water. The ink was sprayed onto a 5 cm$^2$ gas diffusion layer (GDL) using an airbrush until the desired catalyst loading was reached. First, all materials were compared using a cathode catalyst loading of 2 mg$_{cat}$·cm$^{-2}$.

Subsequently, cathodes with different amount of catalyst loadings (1 mg$_{cat}$·cm$^{-2}$, 2 mg$_{cat}$·cm$^{-2}$, and 3 mg$_{cat}$·cm$^{-2}$) were prepared with the H—Fe-Nr-C material. GDLs made of carbon paper with a carbon coating (SIGRACET® Gas Diffusion Media, Type GDL 25 BC) were used for both electrodes. The Nafion content in the dry cathode was 40 wt. %. The anode electrodes were prepared by the same methodology. The anode inks were synthesized from BASF 30% platinum on Vulcan XC-72. The anode loading was 0.2 mg$_{Pt}$·cm$^{-2}$ with a 2:1 ionomer to Pt ratio. The cathode and anode electrodes were then hot-pressed against either side of a 212 Nafion membrane at 140° C. for 10 min using a load of 1000 kg.

Single fuel cell experiments on the prepared MEAs were performed using a Fuel Cell Technologies test stand and single cell hardware. A BioLogic HCP-803 potentiostat was used to collect polarization curves. The cell has a serpentine flow channel and an active area of 5 cm$^2$. All tests were performed at 80° C., the backpressure of the two electrodes was 29.4 psia, and the relative humidity (RH) of all gases was 100%. The flow rate of ultra-high purity (UHP) H$_2$ at the anode was held constant at 0.1 L·min$^{-1}$ and the UHP O$_2$ (or air) flow was maintained at 0.2 L·min$^{-1}$. The testing protocol was as follows: the cell was held at open circuit voltage (OCV) for 30 min; then the voltage was held at 0.6 V for 10 min, followed by 0.4 V for 10 min for conditioning. A polarization curve was then obtained by changing the potential from OCV to 0.2 V, decreasing the potential in steps of 25 mV from OCV to 0.65, and in 50 mV steps from 0.65 V to 0.2 V, with each potential being held for 30 seconds before recording the current. All overpotentials reported used the reversible OCV as a reference. The durability test on the H—Fe—N$_x$—C catalyst was carried out at 0.7 V for 30 h using an oxygen (or air) feed to the cathode. The polarization curves were recorded at two stages: initial (t=0) and at the end of the experiment (t=30 h) using an oxygen (or air) feed to the cathode.

Synthesis of ZIF-8 nanocrystals

For a typical experiment, 4 g of 2-methylimidazole (2-mim) was dissolved in 60 mL of methanol (MeOH). 1.68 g of Zn(NO$_3$)$_2$·6H$_2$O dissolved in 20 mL of MeOH was subsequently added to the 2-mim/MeOH solution. The mixture was then stirred for 1 h and incubated for another 24 h at 25° C. The product was washed several times with de-ionized water and MeOH, then collected by centrifugation and placed in a vacuum oven to dry at 25° C.

Synthesis of ZIF-8@K-TA

To obtain a solid ZIF-8@K-TA material, 200 mg of ZIF-8 nanocrystals were dispersed in 10 mL of de-ionized water in a 100 mL conical flask. This was followed by addition of 3 mL of TA/KOH/H$_2$O solution (24 mM, pH=8) to the ZIF-8 nanocrystal suspension. After stirring for 5 min, the product was collected by centrifugation, washed several times with de-ionized water and MeOH, and then placed in an oven to dry.

Synthesis of ZIF-8@M-TA and ZIF-8@M$^{mix}$-TA Composites

The ZIF-8@K-TA was dispersed in a methanolic solution (30 mL) of Fe(NO$_3$)$_3$·9H$_2$O (60 mg). After stirring for 2 h, the product was collected by centrifugation, washed several times with de-ionized water and MeOH, and then placed in a vacuum oven to dry. Other composites were synthesized via similar synthetic routes. ZIF-8@Co-TA: Co(NO$_3$)$_2$·6H$_2$O (60 mg); ZIF-8@Ni-TA: Ni(NO$_3$)$_2$·6H$_2$O (60 mg); ZIF-8@FeCo-TA: Fe(NO$_3$)$_3$·9H$_2$O (30 mg)/Co(NO$_3$)$_2$.6H$_2$O (30 mg); ZIF-8@FeNi-TA: Fe(NO$_3$)$_3$·9H$_2$O (30 mg)/Ni(NO$_3$)$_2$·6H$_2$O (30 mg); ZIF-8@CoNi-TA: Co(NO$_3$)$_2$·6H$_2$O (30 mg)/Ni(NO$_3$)$_2$.6H$_2$O (30 mg); ZIF-8@FeCoNi-TA: Fe(NO$_3$)$_3$·9H$_2$O (20 mg)/Co(NO$_3$)$_2$·6H$_2$O (20 mg)/Ni(NO$_3$)$_2$·6H$_2$O (20 mg).

Synthesis of H-M-N$_x$—C and H-M$^{mix}$-N$_x$—C Catalysts

ZIF-8@Fe-TA was placed in a heating zone within a tubular furnace. The pyrolysis of ZIF-8@Fe-TA was conducted under a nitrogen flow and heated to 900° C. with a ramp rate of 1° C.·min$^{-1}$. The product was obtained by pyrolysis for another 3 h at 900° C. The black product was then immersed in 0.5 M H$_2$SO$_4$ at 90° C. for 12 h, followed by washing with de-ionized water. After drying at 90° C. in a vacuum oven, the powder was heat-treated at 900° C. under a N$_2$ atmosphere for 3 h to obtain the final product, termed H—Fe—N$_x$—C. Other catalysts, H—Co—N$_x$—C, H—Ni—N$_x$—C, H—FeCo—N$_x$—C, H—FeNi—N$_x$—C, H—CoNi—N$_x$—C, and H—FeCoNi—N$_x$—C, were prepared from the corresponding precursor using the same protocol.

Results

Synthesis and Characterization of the H-M-N$_x$—C and H-M$^{mix}$-N$_x$—C Catalysts.

To implement the protocol illustrated in FIG. 1, ZIF-8 nanocrystals were prepared then deposited a potassium-tannic acid (K-TA) coordination polymer on their surface to deliver a core-shell ZIF-8@K-TA composite (Step I).[11-13] Here, the abundant hydroxyl and galloyl groups of tannic acid coordinate potassium cations to create a surface-bound network. The potassium cations in ZIF-8@K-TA were subsequently exchanged for transition metal cations through immersion of in a methanolic solution containing the desired metal as a dissolved salt. When a single transition metal salt was used, this post-synthetic cation exchange produced ZIF-8@M-TA with Fe(III), Co(II), and Ni(II) (Step II, Route A). After pyrolysis under a $N_2$ atmosphere, followed sequentially by acid leaching and an additional pyrolysis treatment, the organic components of ZIF-8@M-TA transform into hollow N-doped porous carbon capsules. The zinc(II) ions of the ZIF disappear from the material due to reduction to zerovalent zinc and subsequent evaporation.[11-13] Meanwhile, the transition metal ions in the tannic acid layer remain strongly coordinated by nitrogen, affording isolated metal cation sites anchored on the capsule walls (Step III, Route A). These final materials are denoted herein as H-M-$N_x$—C, M=Fe, Co, or Ni. Reduction of the metal cations to the metallic state during the pyrolysis step was largely avoided here due to the low metal loadings (<2 wt. %).

TABLE 1

Summary of the elemental compositions of the as-synthesized catalysts.

| Material | Precursor | Fe wt. % | Co wt. % | Ni wt. % | N wt. % |
|---|---|---|---|---|---|
| H—Fe—$N_x$—C | ZIF-8@Fe-TA | 1.27 | n/a | n/a | 7.78 |
| H—Co—$N_x$—C | ZIF-8@Co-TA | n/a | 1.8 | n/a | 11.41 |
| H—Ni—$N_x$—C | ZIF-8@Ni-TA | n/a | n/a | 1.4 | 8.93 |
| H—FeCo—$N_x$—C | ZIF-8@FeCo-TA | 0.71 | 0.44 | n/a | 11.36 |
| H—FeNi—$N_x$—C | ZIF-8@FeNi-TA | 0.68 | n/a | 0.35 | 13.37 |
| H—CoNi—$N_x$—C | ZIF-8@CoNi-TA | n/a | 0.54 | 0.38 | 10.86 |
| H—FeCoNi—$N_x$—C | ZIF-8@FeCoNi-TA | 0.45 | 0.36 | 0.4 | 12.76 | n/a = not applicable.
Metal and nitrogen content determined by ICP-AES and element analysis, respectively.

Figures 2A, 2B, 2C, 2D, 2E, 2F, 2G, 2H, 2I, 2J, 2K, 2L:
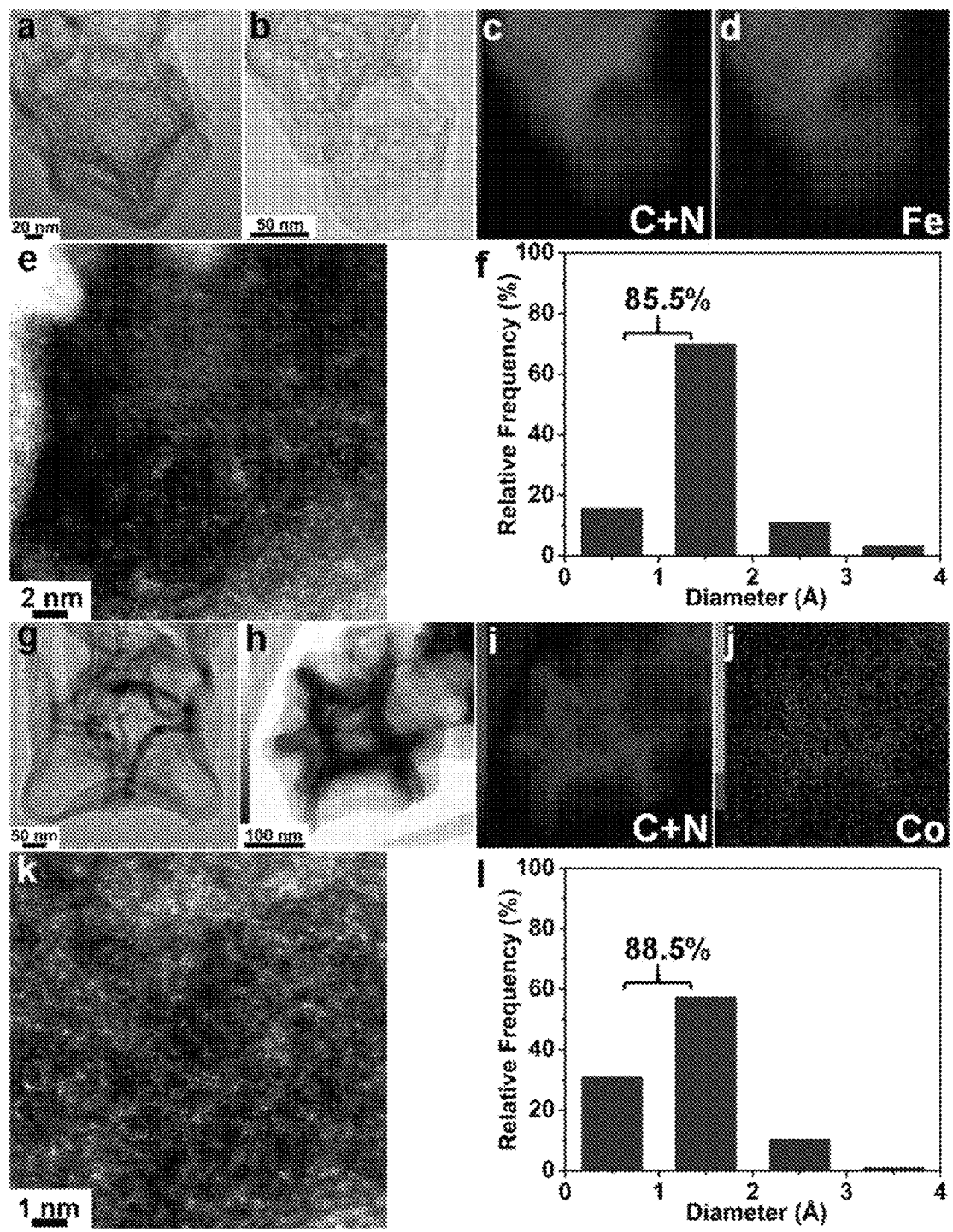
FIGS. 2A-2L represent (a) TEM image, (b-d) BF-STEM image and corresponding element maps showing the distribution of C, N, and Fe, (e) HAADF-STEM image of H—Fe—N$_x$—C. Single Fe atoms are indicated by red circles. (f) The size distribution of the small spots in panel (e); (g) TEM image, (h-j) BF-STEM image and corresponding element maps showing the distribution of C, N, and Co, (k) atomic-resolution HAADF-STEM image of H—Co—N$_x$—C. Single Co atoms are highlighted by red circles. (l) The size distribution of the small spots in panel (k).
Figure 10:
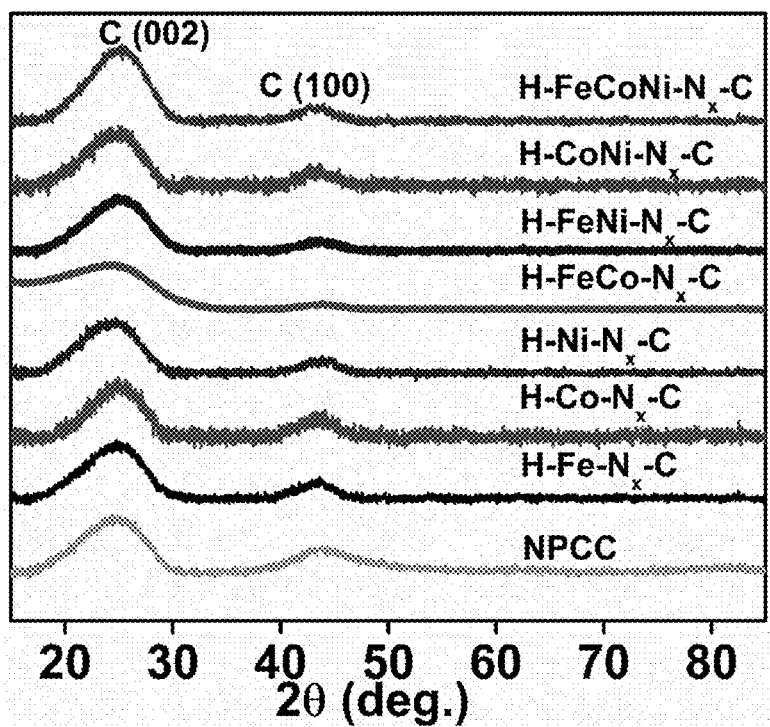
FIG. 10 shows PXRD patterns of metal-organic frameworks described herein.
Figures 11A, 11B:
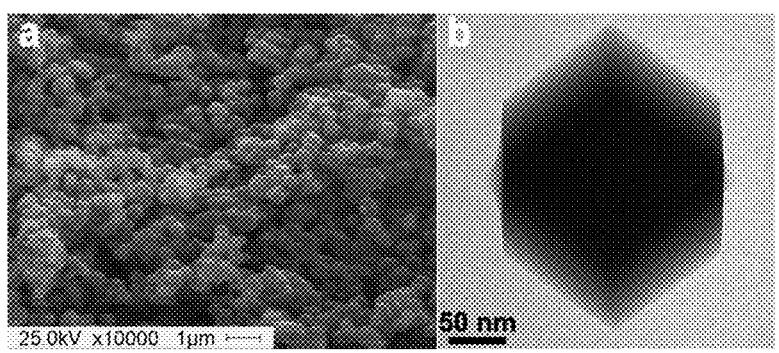
FIGS. 11A-11B show SEM (a) and TEM (b) images of ZIF-8 dodecahedra.
Figures 12A, 12B:
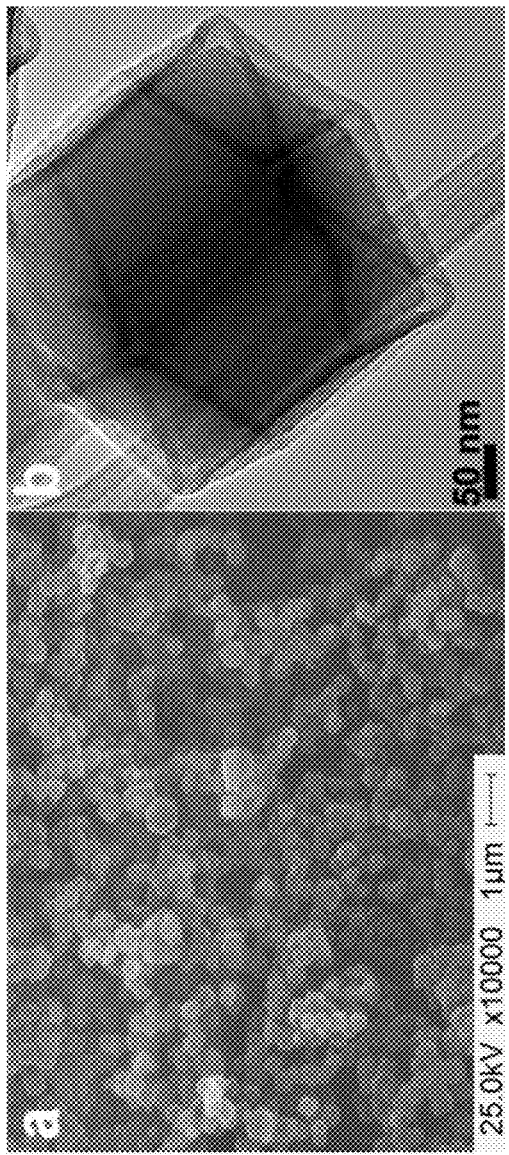
FIGS. 12A-12C show SEM (a) and TEM (b) images and EDS spectrum (c) of ZIF-8@K-TA.
Figure 12C:
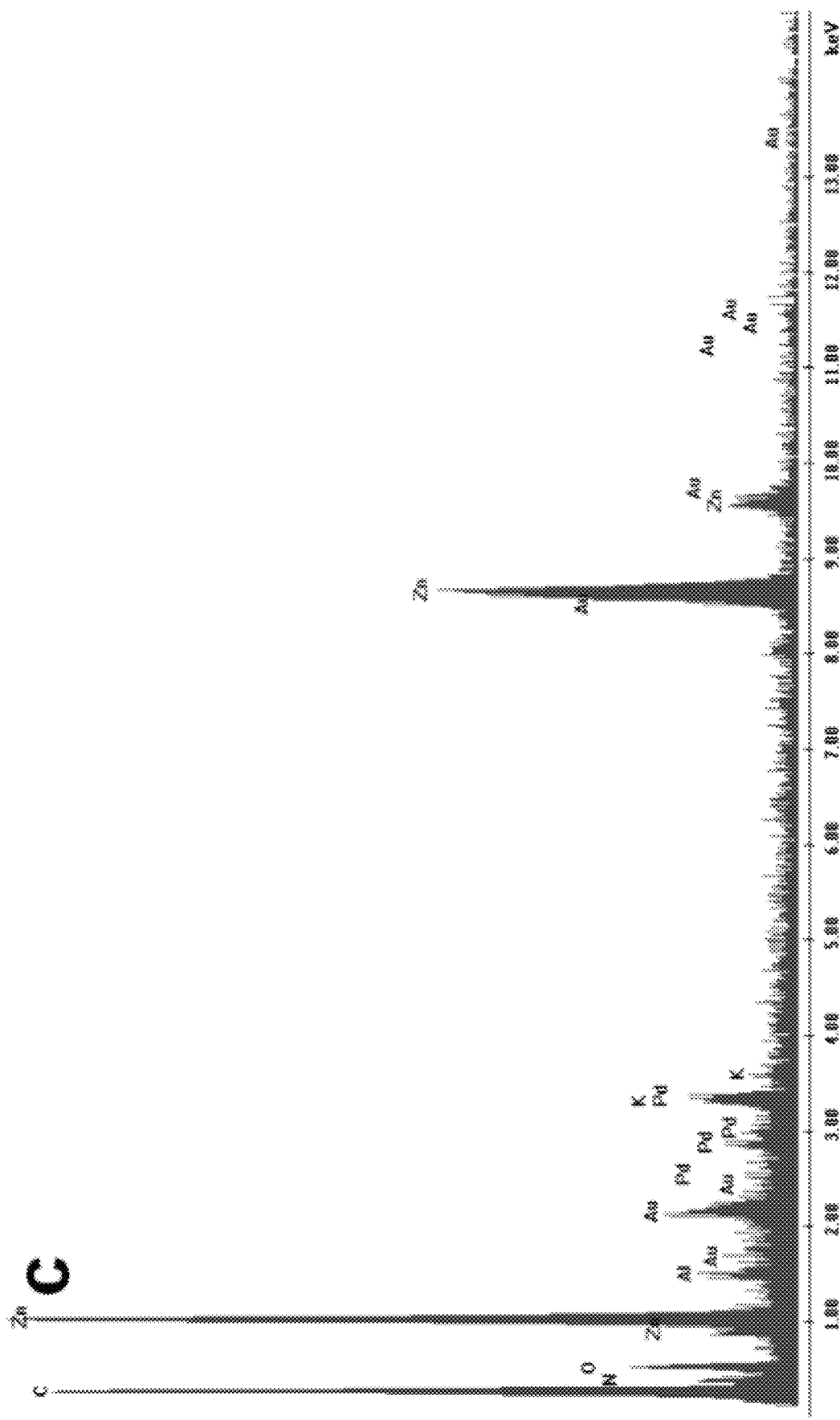
Figures 13A, 13B:
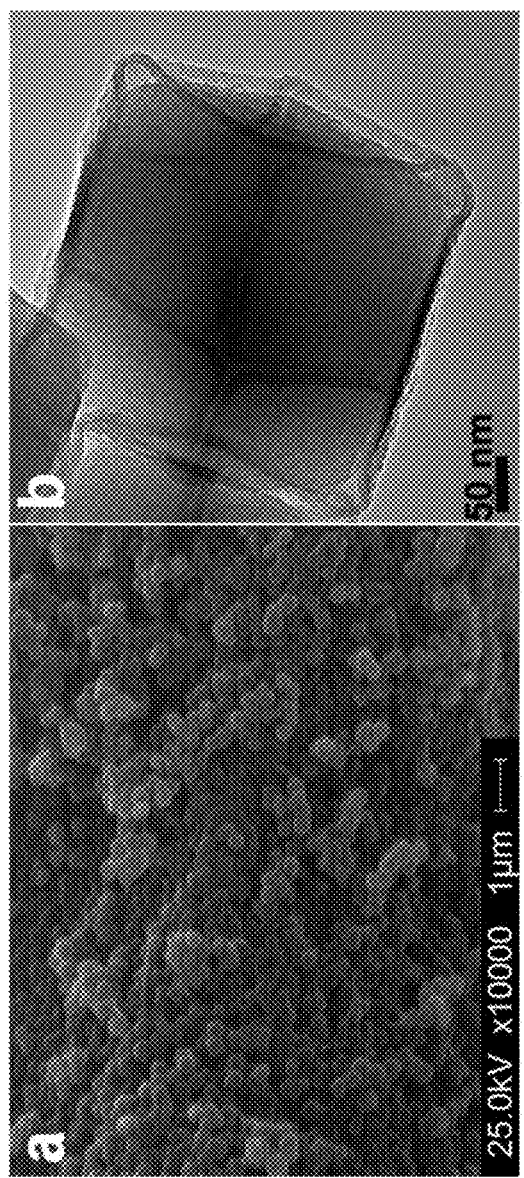
FIGS. 13A-13C show SEM (a) and TEM (b) images and EDS spectrum (c) of ZIF-8@Fe-TA.
Figure 13C:
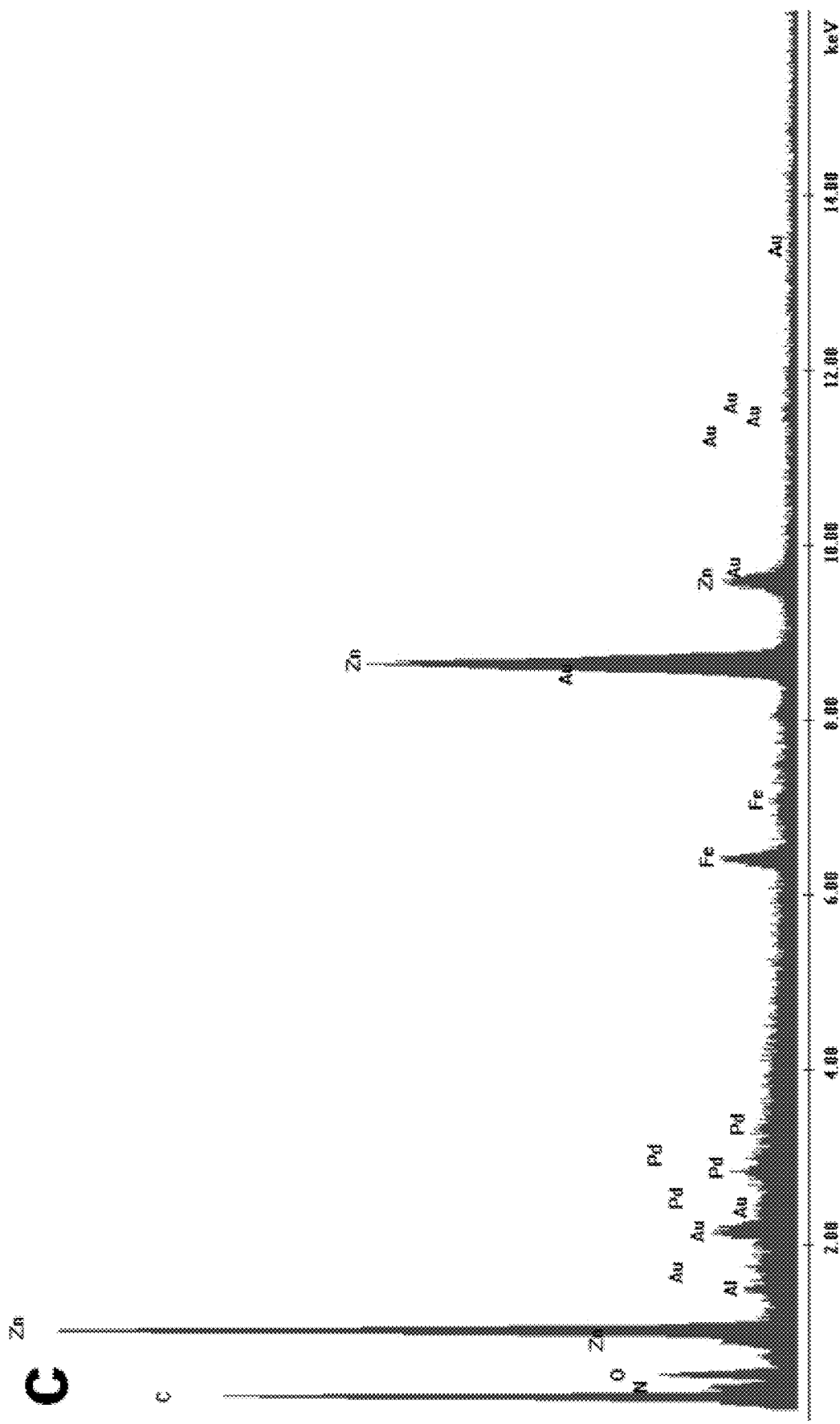
Figure 20:
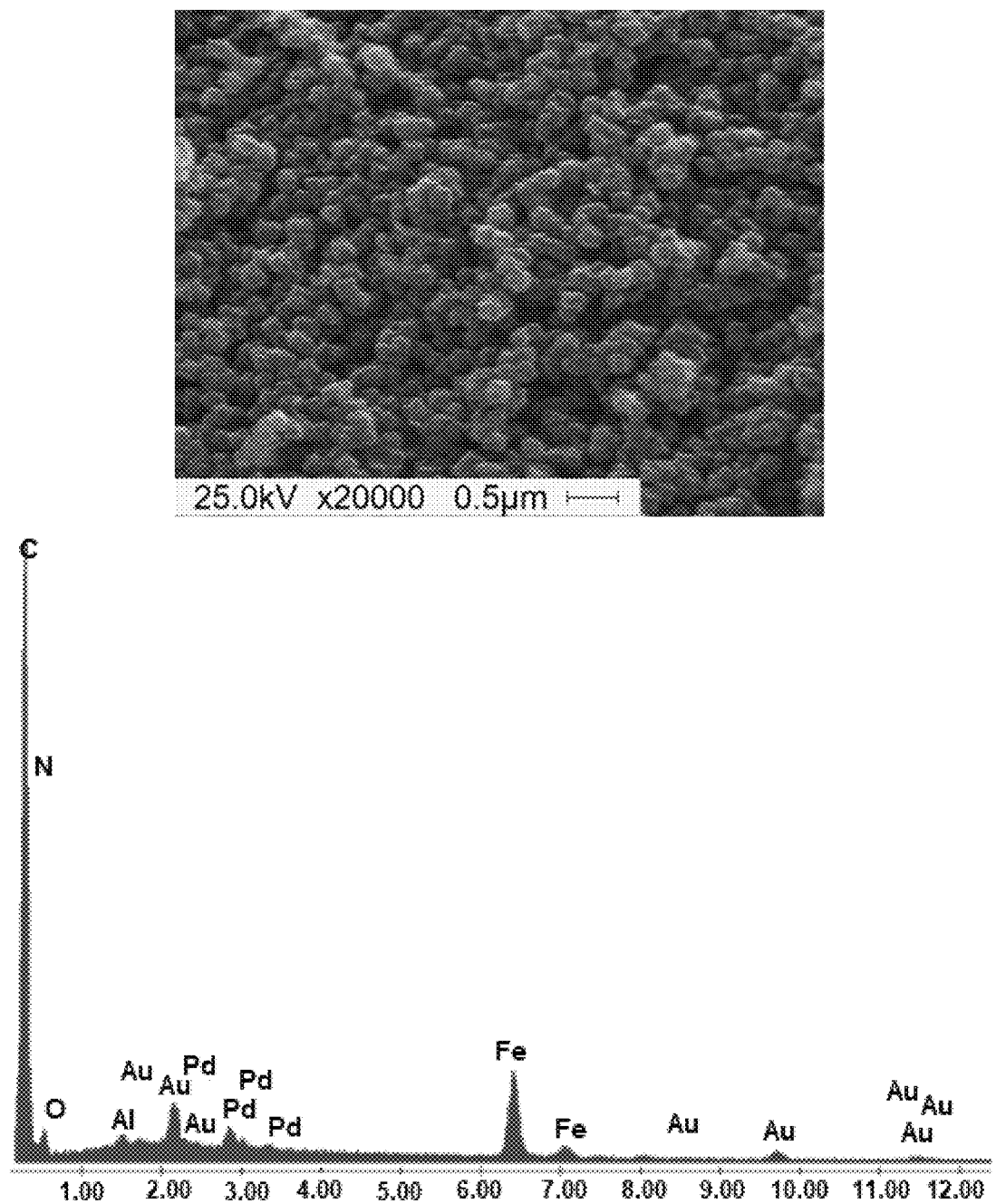
FIG. 20 shows SEM image and EDS spectrum of H—Fe—N$_x$—C.
Figure 36:
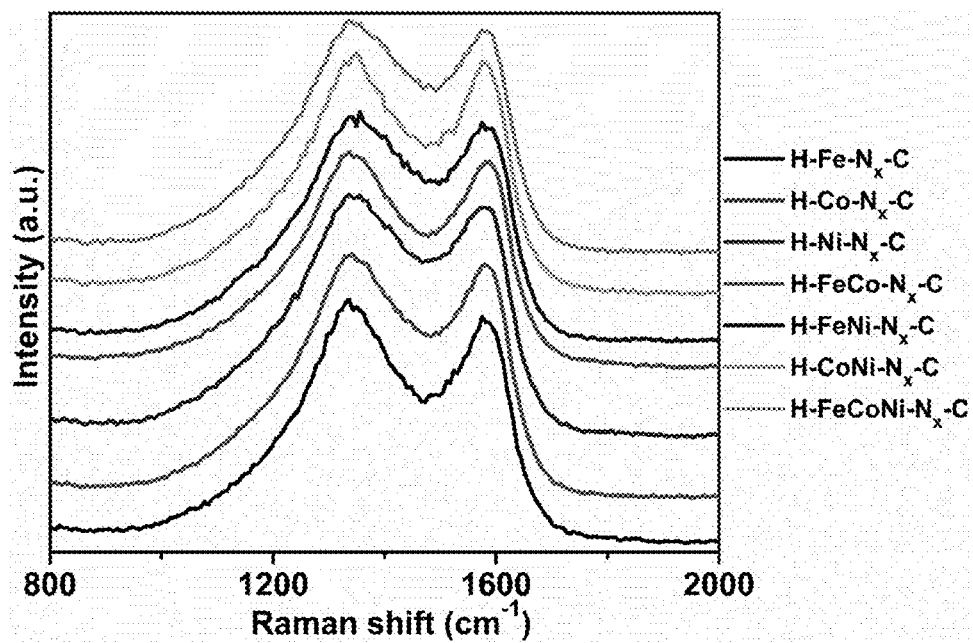
FIG. 36 shows Raman spectra of metal-organic frameworks described herein.

H—Fe—$N_x$—C was first evaluated to give a detailed structural description of this family of materials. Scanning electron microscopy (SEM) and transmission electron microscopy (TEM) images revealed that H—Fe—$N_x$—C possessed a hollow capsule-like morphology and its surface becomes much rougher following the pyrolysis treatment (FIGS. 2a, 13, 20). Although they would be readily apparent by these methods, no crystalline iron nanoparticles were observed by TEM (FIG. 2a) or powder X-ray diffraction (PXRD) (FIG. 10). This provides the first significant evidence that the iron has deposited in single-atom sites, rather than aggregating into larger assemblies. This was confirmed by bright-field scanning transmission electron microscopy (BF-STEM), where Fe and N are shown to be uniformly distributed throughout the capsule walls (FIGS. 2b-d). Atomic-resolution high-angle annular dark-field scanning transmission electron microscopy (HAADF-STEM) was carried out with the aim of precisely locating the atomically dispersed metals. Numerous bright spots were identified, marked with red cycles in FIGS. 2e and 2f, which correspond to the heavier iron atoms. The broad signals observed in the PXRD pattern of H—Fe—$N_x$—C at around 25° and 44° (FIG. 10) result from graphitic features of the carbon support. The same features also appeared in the PXRD pattern of the hollow N-doped porous carbon capsule (NPCC) sample (i.e. the related metal-free material derived from pyrolysis of ZIF-8@K-TA). The Raman spectrum of H—Fe—$N_x$—C exhibited D (1350 $cm^{-1}$) and G (1590 $cm^{-1}$) bands typical of a semi-graphitic carbon (FIG. 36). On this basis, the carbon capsules were expected to offer good electrical conductivity, as is required for efficient electrocatalysis. H—Fe—$N_x$—C contains 1.2 wt. % iron and 8.4 wt. % nitrogen, as revealed by inductively coupled plasma atomic emission spectroscopy (ICP-AES) and elemental analysis (EA), respectively (Table 1).

Figure 37:
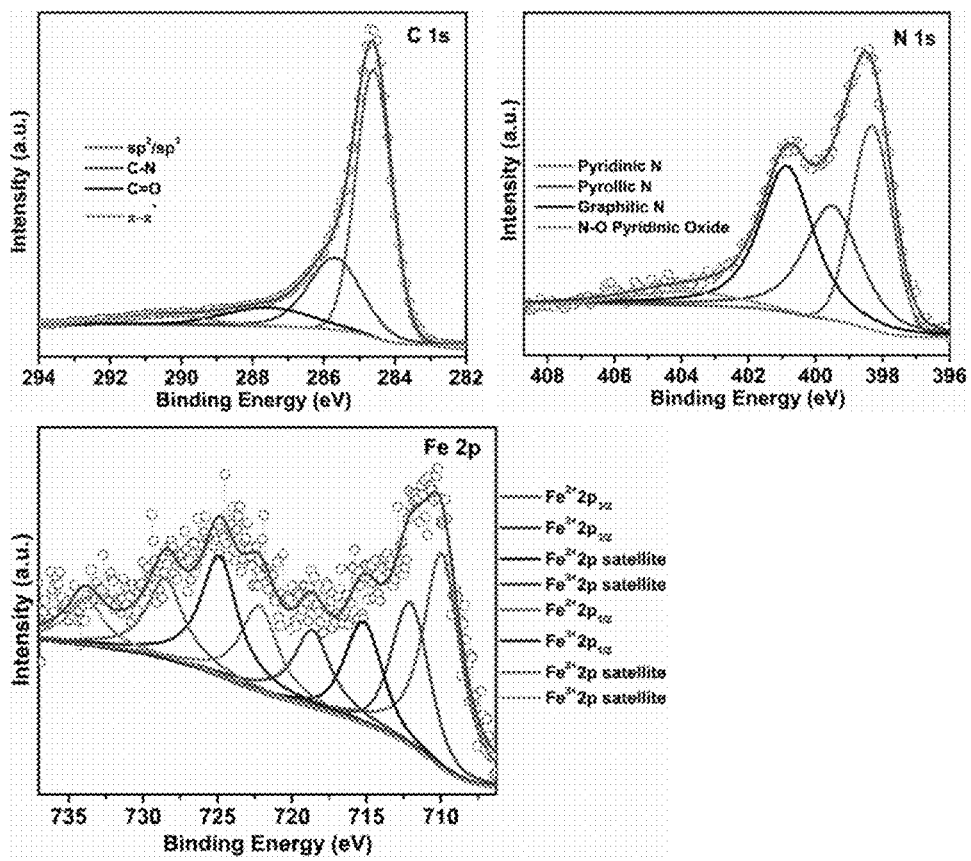
FIG. 37 shows the XPS spectra of H—Fe—$N_x$—C.

XPS spectra of H—Fe—$N_x$—C revealed iron, carbon, and nitrogen (FIG. 37). The N 1s XPS spectrum could be fitted by four components located at 398.3 eV (pyridinic-N), 399.2 eV (pyrrolic-N), 401.1 eV (graphitic-N) and 404.5 eV (quaternary-N). These nitrogen atoms are doped into the carbon support. Since pyridinic and pyrrolic nitrogen atoms can act as donors to iron ions via coordination bonds, these observations suggest that Fe occupies sites in the carbon lattice that bear some similarity to molecular species such as iron porphyrins.[57,59,61] In the Fe 2p region, the XPS spectrum shows clear signals attributed to both iron(II) and iron(III). Metallic iron was not detected.

Figures 3A, 3B, 3C, 3D, 3E, 3F, 3G, 3H, 3I:
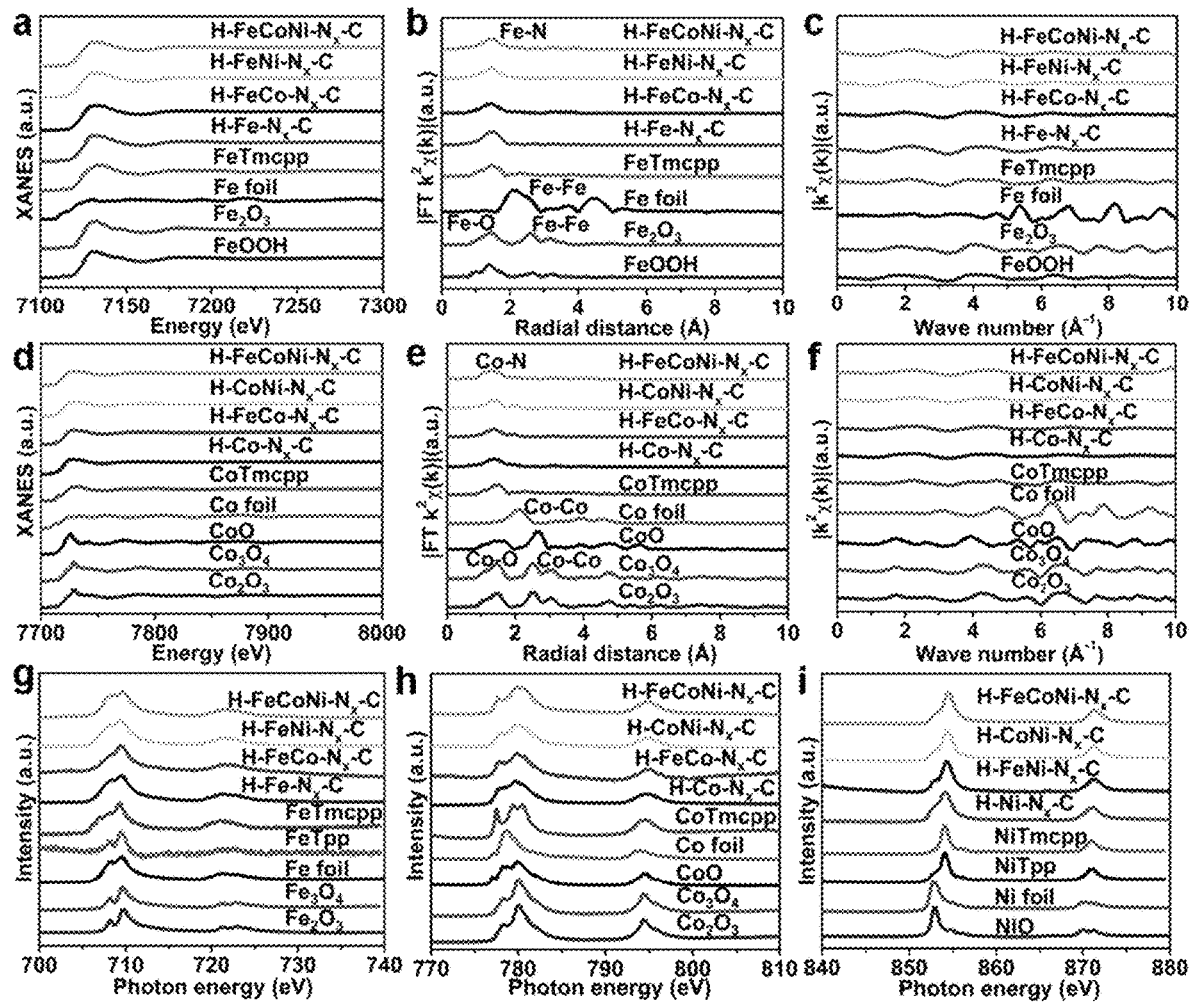
FIGS. 3A-3I represent (a) XANES spectra, (b, c) Fe K-edge Fourier transform (FT) EXAFS spectra of H—Fe—N$_x$—C together with various Fe standards. (d) XANES spectra, (e, f) Co K-edge (FT) EXAFS spectra of H—Co—N$_x$—C together with various Co standards. (g-i) Fe, Co, and Ni L-edge XANES spectra of different materials. iron(III)-(4-methoxycarbonylphenyl)porphyrin (FeTmcpp); cobalt(II)-(4-methoxycarbonylphenyl)porphyrin (CoTmcpp); nickel(II)-(4-methoxycarbonylphenyl)porphyrin (NiTmcpp); iron(II)-tetraphenyl porphyrin (FeTpp); nickel(II)-tetraphenyl porphyrin (NiTpp).
Figure 44:
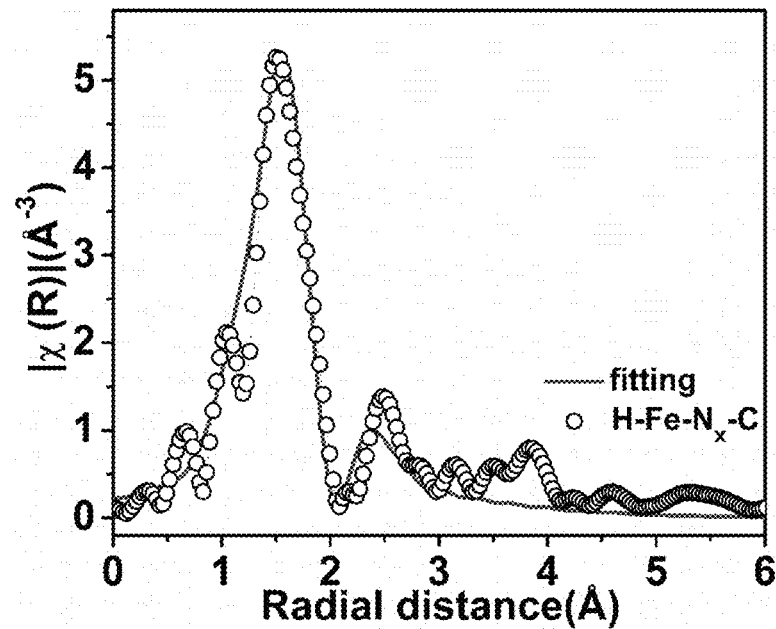
FIG. 44 shows the Fe K-edge R space for H—Fe—$N_x$—C. The curve fit is based on a Fe—$N(C)_x$ scattering path.
Figure 45:
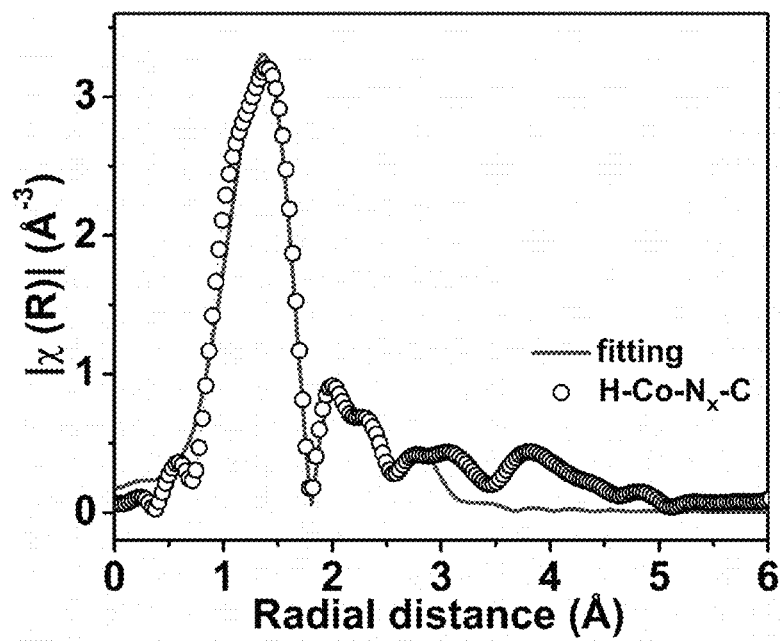
FIG. 45 shows the Co K-edge R space plot for H—Co—$N_x$—C. The curve fit is based on a Co—$N(C)_x$ scattering path.

X-ray absorption spectroscopy (XAS) was applied probe the electronic structure of the iron sites in H—Fe—$N_x$—C. Fe foil, $Fe_2O_3$, FeOOH and FeTmcpp (iron-(4-methoxycarbonylphenyl)porphyrin) were also analyzed as points of comparison (FIGS. 3a-c). Normalized X-ray absorption near edge structure (XANES) spectra established that the Fe K-edge absorption edge of H—Fe—$N_x$—C is situated close to that of FeTmcpp, which corroborates the conclusion obtained from XPS that the iron sites in H—Fe—$N_x$—C comprise positively charged iron cations (FIG. 3a). Extended X-ray absorption fine structure (EXAFS) analyses enabled deeper investigation of the Fe coordination environment. Markedly different oscillations were observed for H—Fe—$N_x$—C compared to the iron foil, $Fe_2O_3$ and FeOOH references (FIGS. 3b, 3c). The oscillations of H—Fe—$N_x$—C at low-k are similar to those of the FeTmcpp standard, which is again consistent with the presence of porphyrin-like sites in H—Fe—$N_x$—C. Similar to FeTmcpp, H—Fe—$N_x$—C displays a single well-resolved peak at 1.5 Å in R-space, which implies an Fe—$N_x$ scattering path. Fitting the EXAFS data to Fe—$N_x$ species with the iron centers being coordinated by approximately four nitrogen donors with an average Fe—N bond length of 1.972 Å was successful (FIG. 44, Table 3). The Fe L-edge XANES spectrum of H—Fe—$N_x$—C is dominated by distinct sets of peaks ranging from 705 to 712 eV ($L_3$ region, $2p_{3/2} \rightarrow 3d$) and 718 to 726 eV ($L_2$ region, $2p_{1/2} \rightarrow 3d$), which provide further evidence that Fe is present in mixed states ($Fe^{3+}$ and $Fe^{2+}$) (FIG. 3g).

Figures 4A, 4B, 4C:
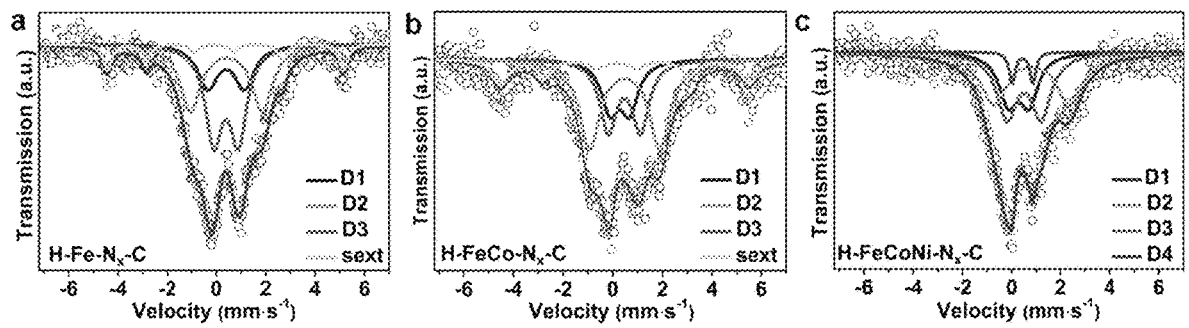
FIGS. 4A-4C represent $^{57}$Fe Mössbauer spectra of (a) H—Fe—N$_x$—C, (b) H—FeCo—N$_x$—C, and (c) H—FeCoNi—N$_x$—C.

To further probe the structure and electronic states of the Fe species in H—Fe—$N_x$—C, $^{57}$Fe Mössbauer spectroscopy measurements were conducted. The spectrum obtained from H—Fe—$N_x$—C can be fitted with three doublets (FIG. 4a). $D_1$ and $D_2$ can readily be assigned to porphyrin-like square-planar Fe(II)—$N_4$ coordination sites with Fe(II) in low- and medium-spin states, respectively.[26,66,67] $D_3$ in a low-spin state is assigned to a N—Fe(III)$N_4$—$O_2$ site, supported by DFT calculations.[26,66-68] These doublets are a well-known signature of active ORR sites in Fe—$N_x$—C catalysts. In addition to the three doublets, the presence of a minor sextet suggests the presence of a very small amount of α-Fe or iron carbide in the H—Fe—$N_x$—C sample (the observation of very small metallic Fe clusters is not totally unexpected here given the high pyrolysis temperature of 900° C. used to synthesize H—Fe—$N_x$—C. At such temperatures, coordinating N is also slowly being lost from the N-doped carbons support). The coexistence of Fe—$N_x$ sites with Fe/$Fe_3C$ has been demonstrated to improve ORR performance.[69] However, porous carbon supports containing only Fe and/or $Fe_3C$ nanocrystals exhibit very low ORR activities.[69]

Figure 5:
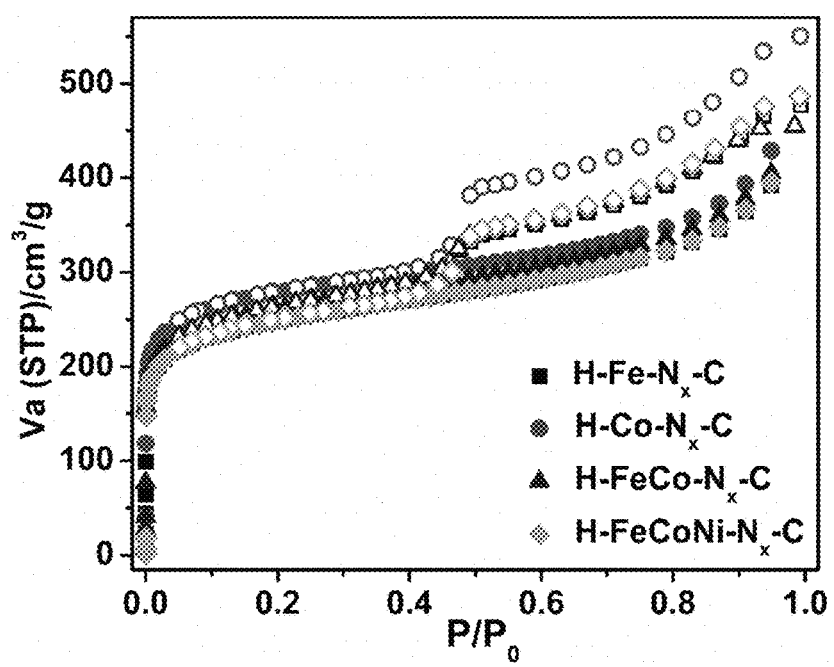
FIG. 5 represents N$_2$ adsorption (filled symbols) and desorption (open symbols) isotherms measured at 77 K for selected single metal and multi metal catalysts.
Figure 32:
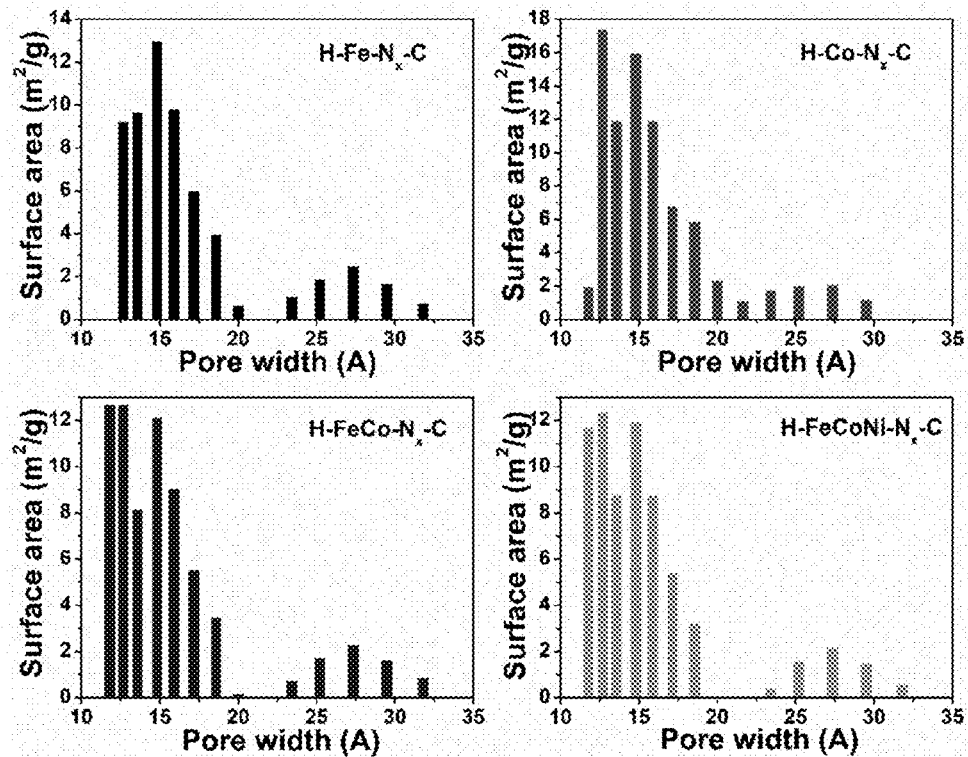
FIG. 32 shows pore size distribution plots calculated using a DFT method from the $N_2$ isotherms measured at 77 K for H—Fe—$N_x$—C, H—Co—$N_x$—C, H—FeCo—$N_x$—C and H—FeCoNi—$N_x$—C.

Nitrogen adsorption-desorption isotherms allowed the accessible porosity of H—Fe—$N_x$—C to be probed. The Brunauer-Emmett-Teller (BET) specific surface area for the sample, determined from an isotherm measured at 77 K (FIG. 5), was 917 m$^2$ g$^{-1}$ (Table 2) The isotherm showed rapid N$_2$ uptake at low relative pressure (P/P$_0$<0.1), followed by a more gradual increase at pressures between 0.1<P/P$_0$<0.95, indicating the existence of both micro- and mesopores (FIG. 5). The pore size distribution was calculated using a DFT model. The analyses verified that the samples had a hierarchical pore structure, with void diameters clustered around 15 Å and 27 Å (FIG. 32).

On the basis this raft of complementary experimental techniques, we conclude that H—Fe—N$_x$—C comprises iron cations in the 2+ and 3+ oxidation states coordinated by approximately four nitrogen atoms. These porphyrin-like sites are dispersed in the walls of hollow N-doped carbon capsules. The matrix has an electrically conductive and highly accessible surface area and a network of large pores. This range of characteristics is attractive from the viewpoint of electrocatalysis, since the material presents all of its irons sites in a manner that is accessible to incoming small-molecule substrates. Both mass transfer and electron transfer are envisaged to be viable. Given these attractive features, we explored the wider scope of this synthetic approach and its applicability to the fabrication of other catalysts containing isolated M-N$_x$ active sites.

Figures 14A, 14B:
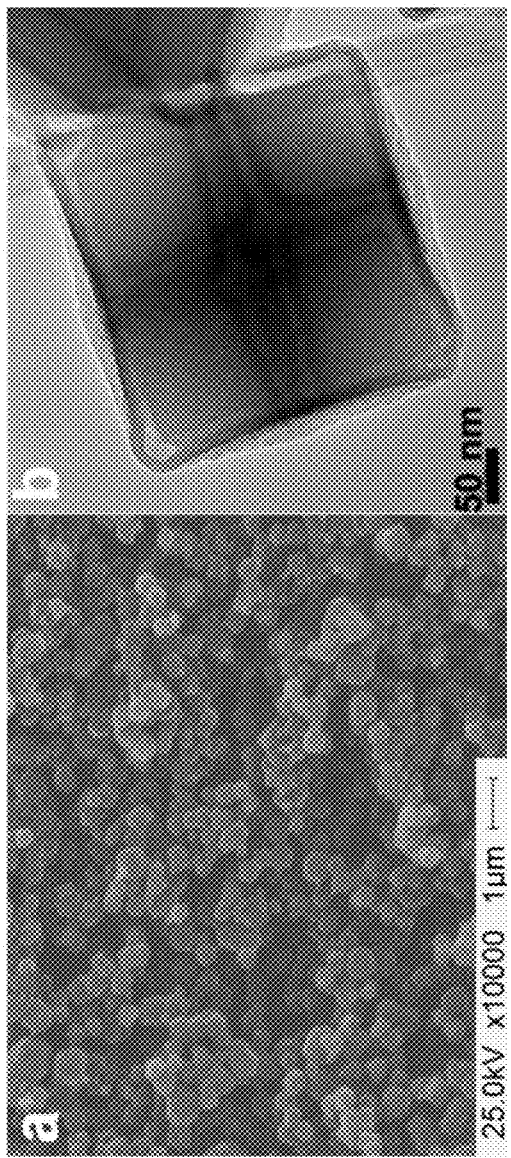
FIGS. 14A-14C show SEM(a) and TEM (b) images and EDS spectrum (c) of ZIF-8@Co-TA.
Figure 14C:
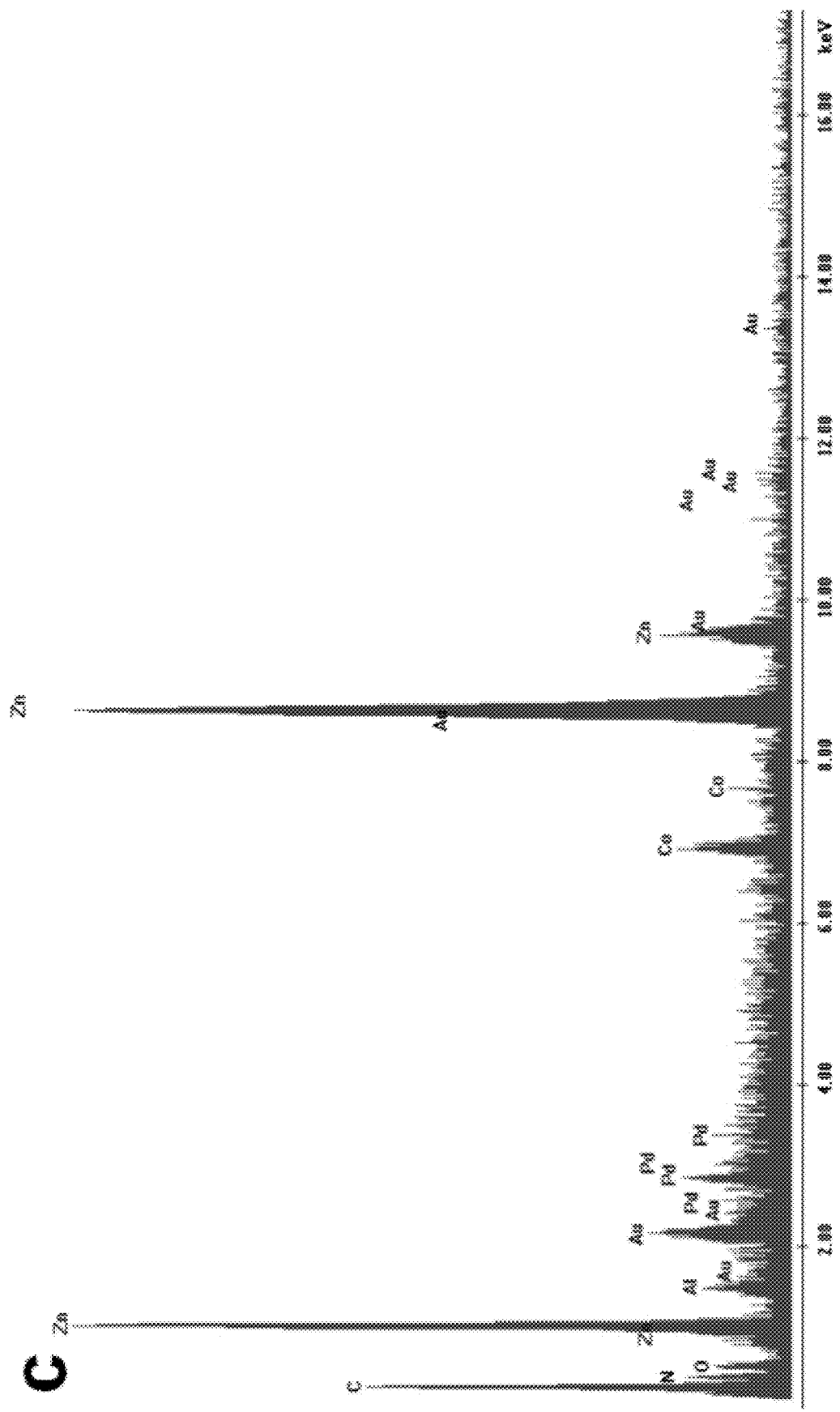
Figures 15A, 15B:
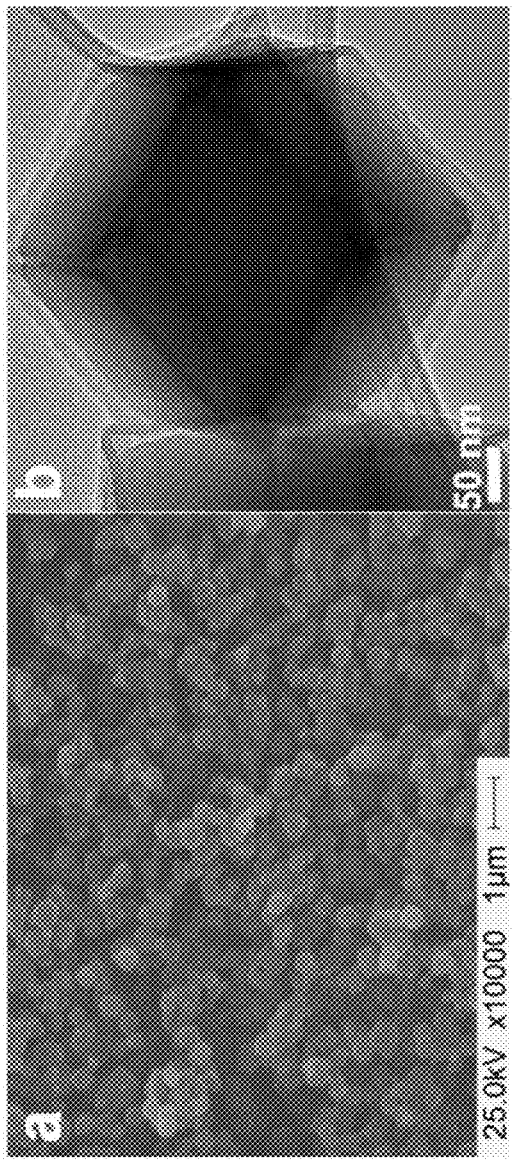
FIGS. 15A-15C show SEM(a) and TEM (b) images and EDS spectrum (c) of ZIF-8@Ni-TA.
Figure 15C:
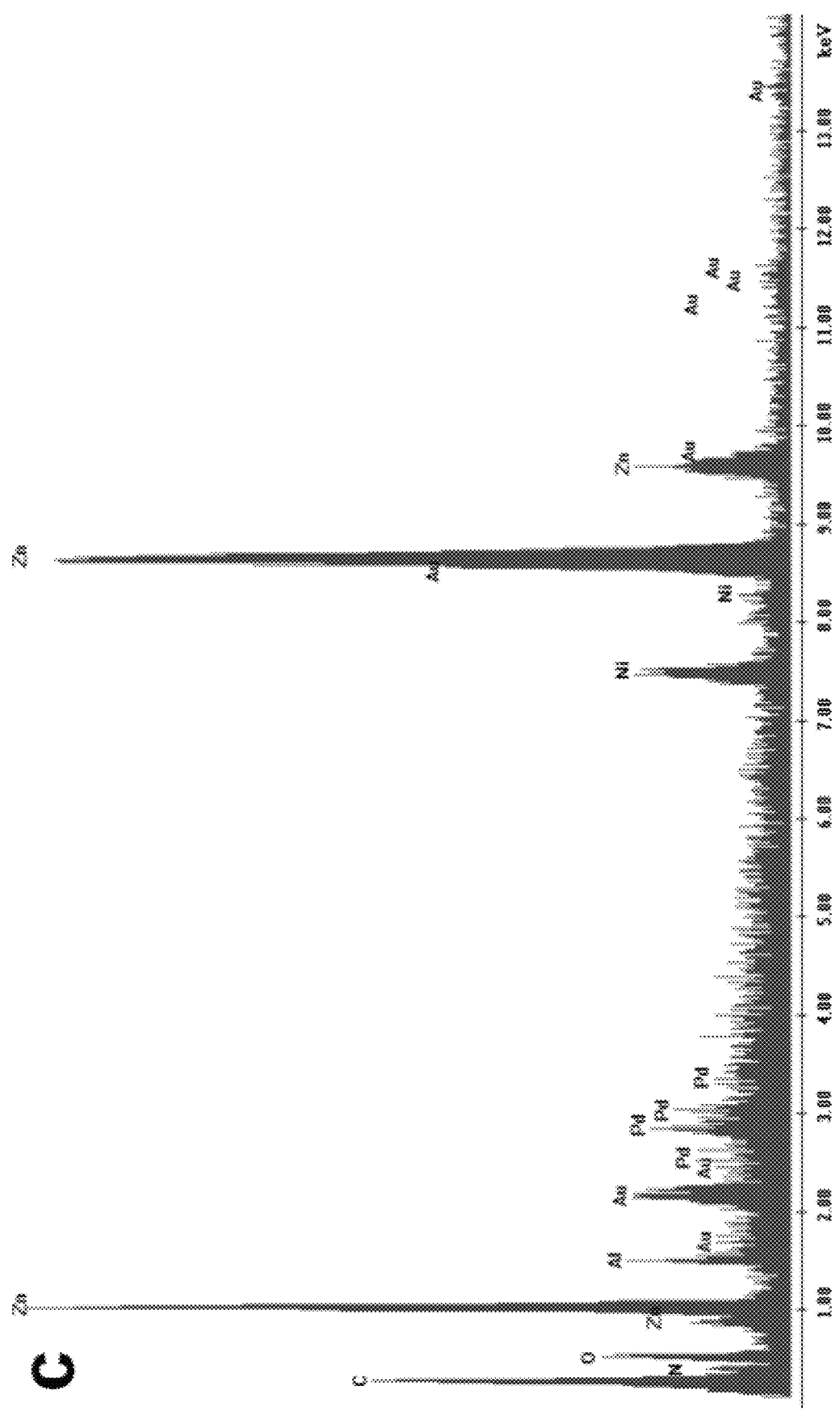
Figure 21:
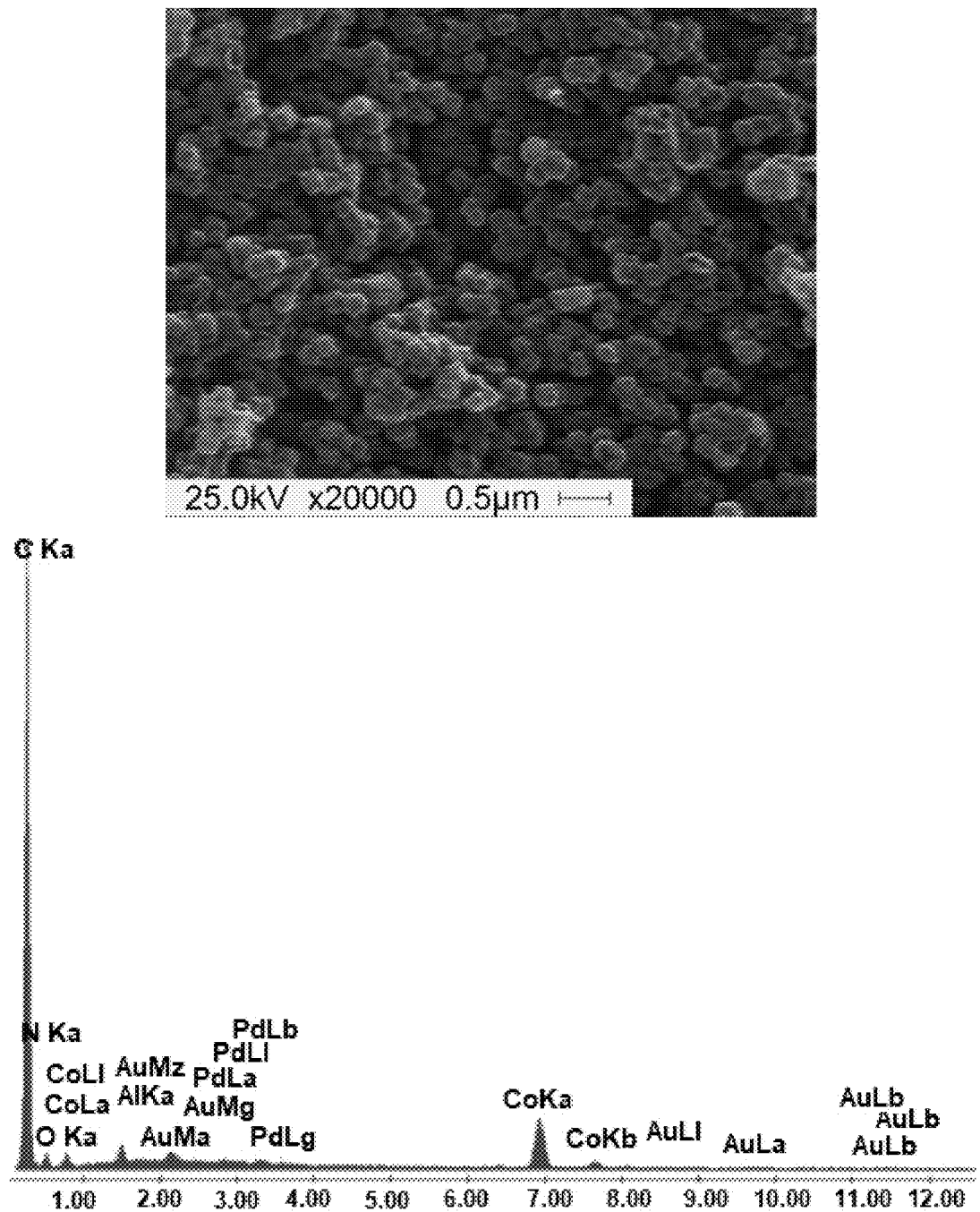
FIG. 21 shows SEM image and EDS spectrum of H—Co—N$_x$—C.
Figure 22:
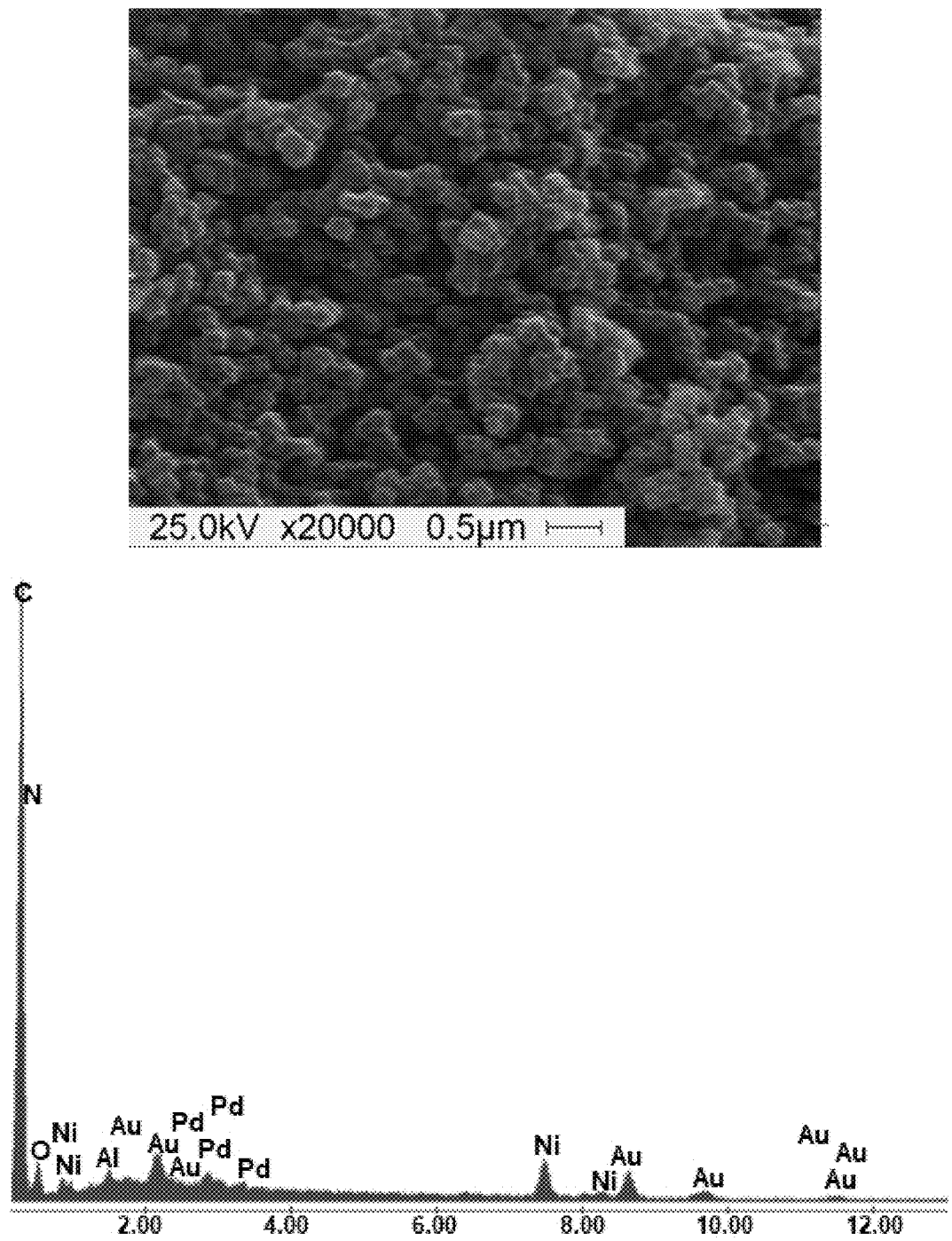
FIG. 22 shows SEM image and EDS spectrum of H—Ni—$N_x$—C.
Figures 28A, 28B, 28C, 28D:
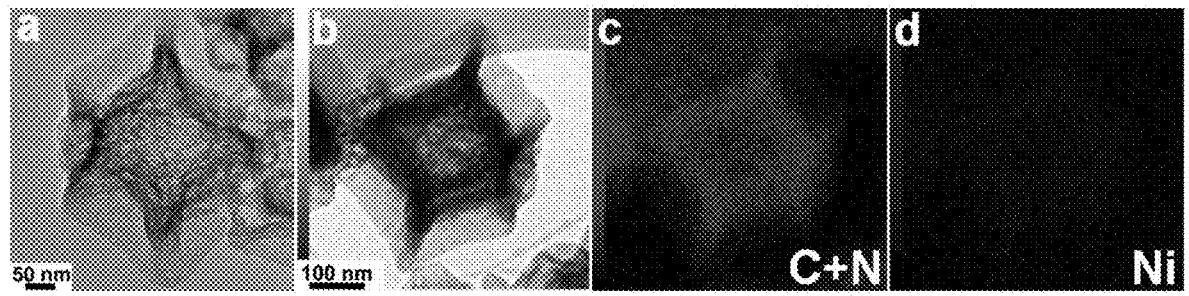
FIGS. 28A-28D show TEM (a) and BF-STEM (b) images and elemental maps (c, d) of H—Ni—$N_x$—C.
Figures 29A, 29B, 29C, 29D, 29E:
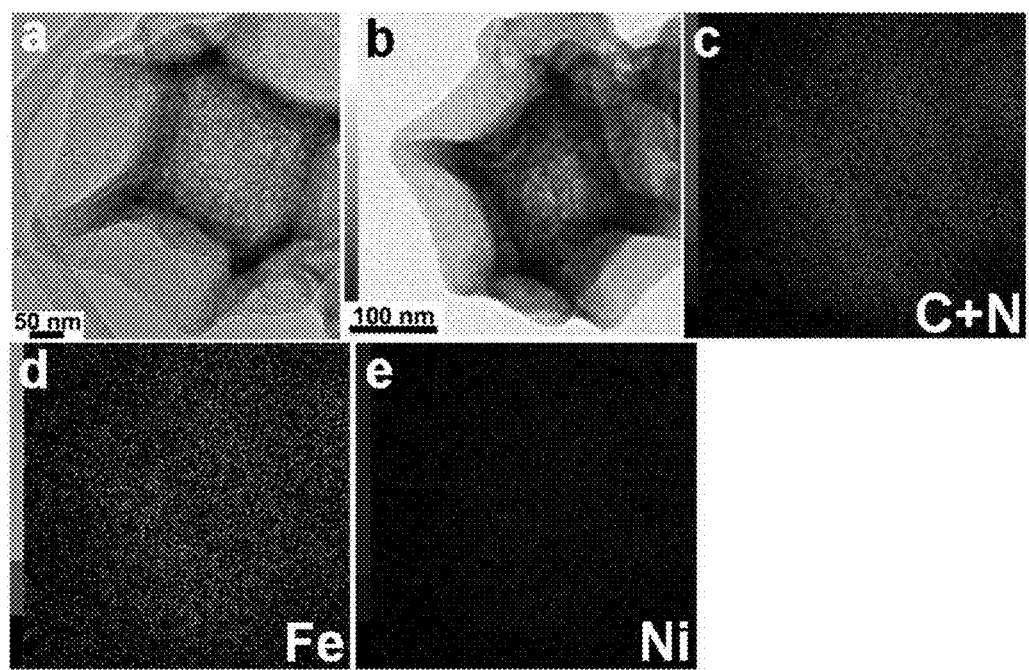
FIGS. 29A-29e show TEM (a) and BF-STEM (b) images and elemental maps (c-e) of H—FeNi—$N_x$—C.
Figures 30A, 30B, 30C, 30D, 30E:
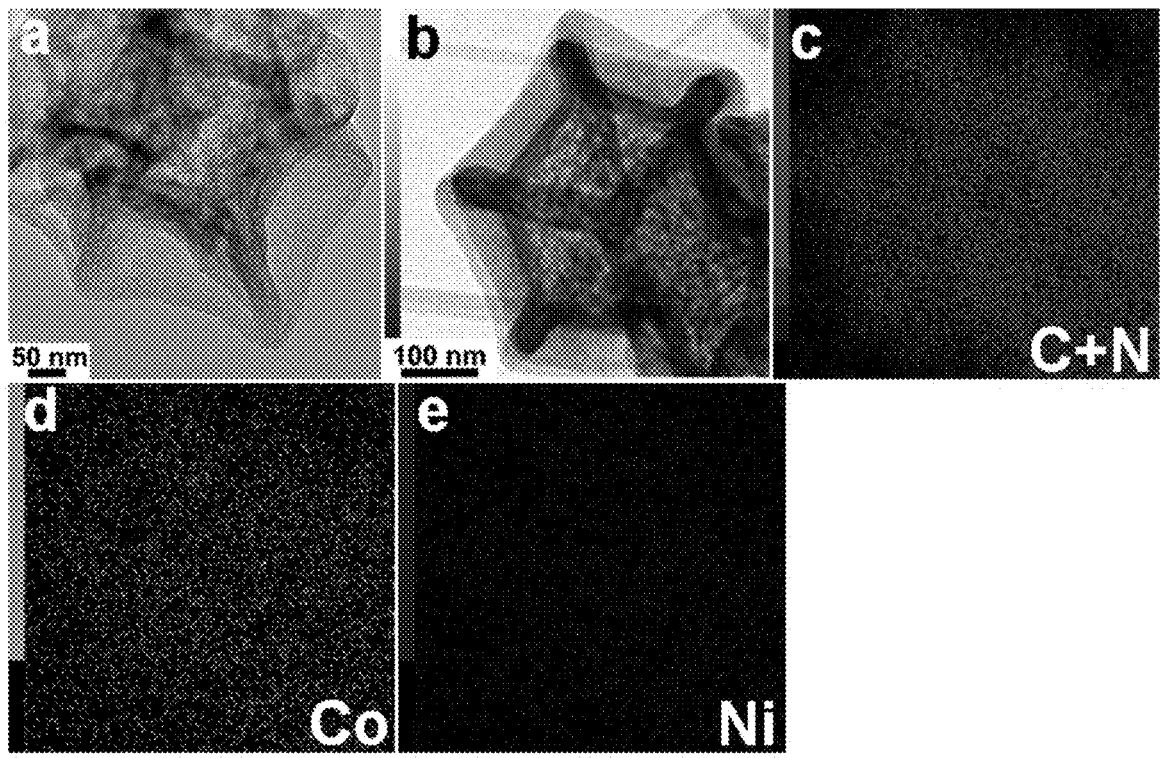
FIGS. 30A-30E show TEM (a) and BF-STEM (b) images and elemental maps (c-e) of H—CoNi—$N_x$—C.
Figure 38:
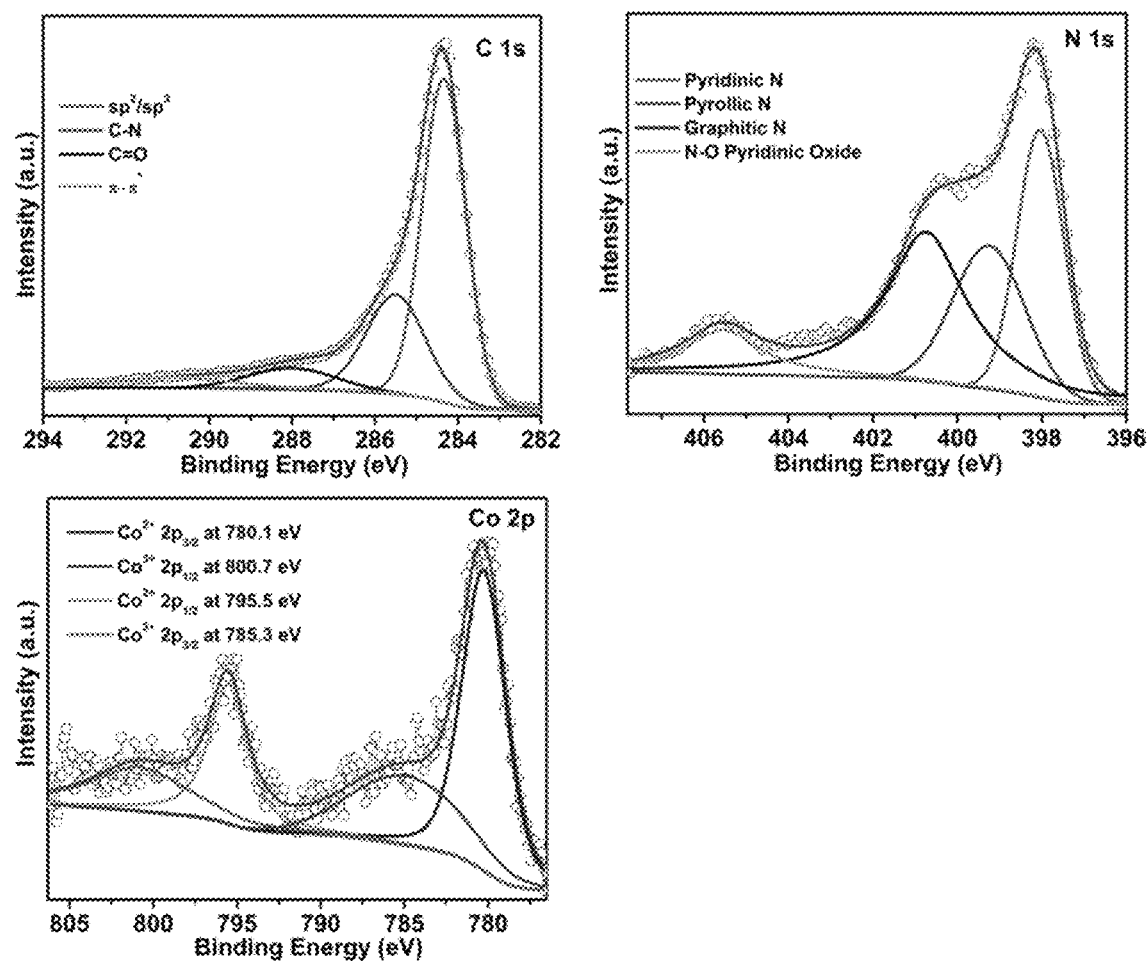
FIG. 38 shows the XPS spectra of H—Co—$N_x$—C.
Figure 39:
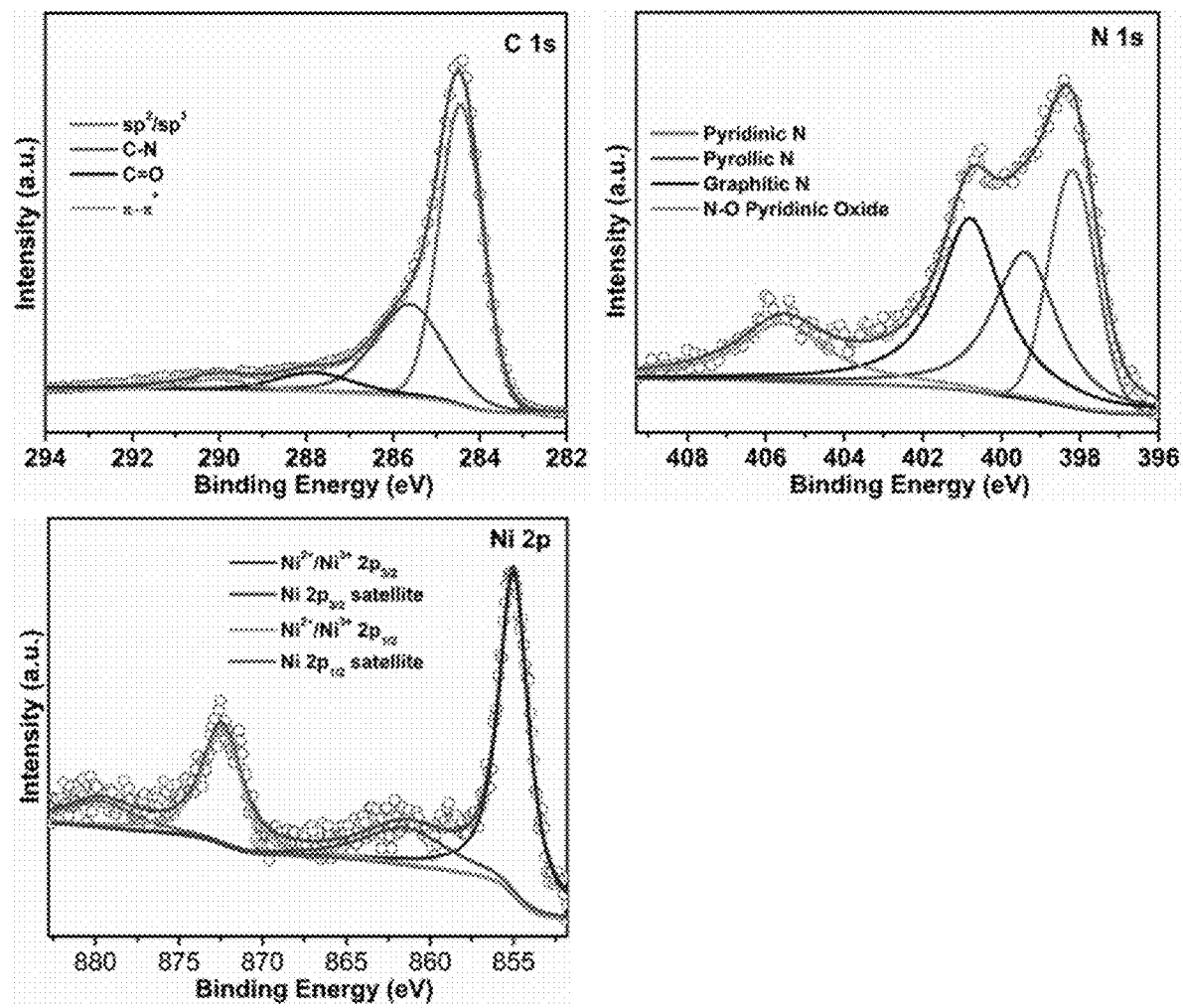
FIG. 39 shows the XPS spectra of H—Ni—$N_x$—C.
Figures 46A, 46B, 46C:
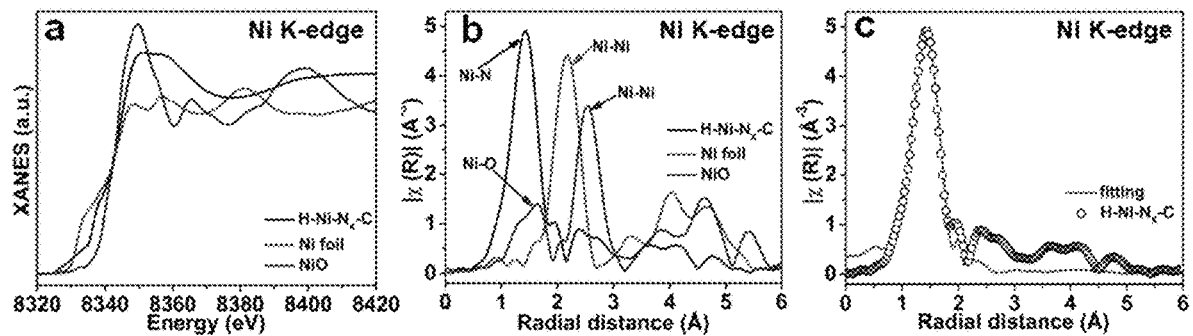
FIGS. 46A-46C show (a) Ni K-edge XANES spectra for H—Ni—$N_x$—C together with reference data for Ni foil and NiO; (b) Ni K-edge EXAFS oscillation plot for H—Ni—$N_x$—C together with reference data for Ni foil and NiO; (c) Ni K-edge R space plot for H—Ni—$N_x$—C together with a fitted curve based on a Ni—$N(C)_x$ scattering path.

H—Co—N$_x$—C and H—Ni—N$_x$—C were synthesized using a similar method as that used to prepare H—Fe—N$_x$—C, except that cobalt and nickel ions, respectively, were introduced into the tannic acid (M-TA) shell of ZIF-8@M-TA composites. Electron microscopy images and EDS spectra for H—Co—N$_x$—C and H—Ni—N$_x$—C were consistent with their nominal compositions: ZIF-8@Co-TA (FIG. 14) and ZIF-8@Ni-TA (FIG. 15). A subsequent pyrolysis step at high temperature (900° C.), acid washing, and a second pyrolysis step resulted in the formation of H—Co—N$_x$—C or H—Ni—N$_x$—C. The PXRD (FIG. 10), SEM (FIGS. 21 and 22) and TEM (FIGS. 2g and 28) images confirmed that the capsules are hollow and no visible crystalline metal particles exist. BF-STEM and EDX mapping (FIGS. 2h-2j and 28) showed that the C, N and Co/or Ni atoms are dispersed uniformly throughout the capsules. XPS indicated that no cobalt or nickel nanocrystals were present in the samples. (FIGS. 38 and 39). As shown in the atomic-resolution HAADF-STEM image and size distribution panel (FIGS. 2k and 2l), the high density of Co single-atoms (highlighted by red circles) on the hollow capsules implies a high loading of atomically dispersed Co—N$_x$ sites. The electronic structure of cobalt was also probed by XAS analysis. Co K-edge XANES and EXAFS data for H—Co—N$_x$—C are shown in FIGS. 3d-f and S38 closely resembled data collected for CoTmcpp, suggesting a Co—N$_4$ porphyrin-like environment existed in H—Co—N$_x$—C. The XANES spectra at the Co L-edge further again found similarities between H—Co—N$_x$—C and CoTmcpp (FIG. 3h), with Co$^{2+}$ being the dominant Co oxidation state present (consistent with XPS analyses, FIG. 38). The XAS analysis (FIGS. 3i and 46) of H—Ni—N$_x$—C also revealed a Ni—N$_x$ coordination environment and demonstrates that Ni(II) single atoms were present in H—Ni—N$_x$—C. The predominance of Ni(II) was also confirmed by XPS (FIG. 39).

Figures 16A, 16B:
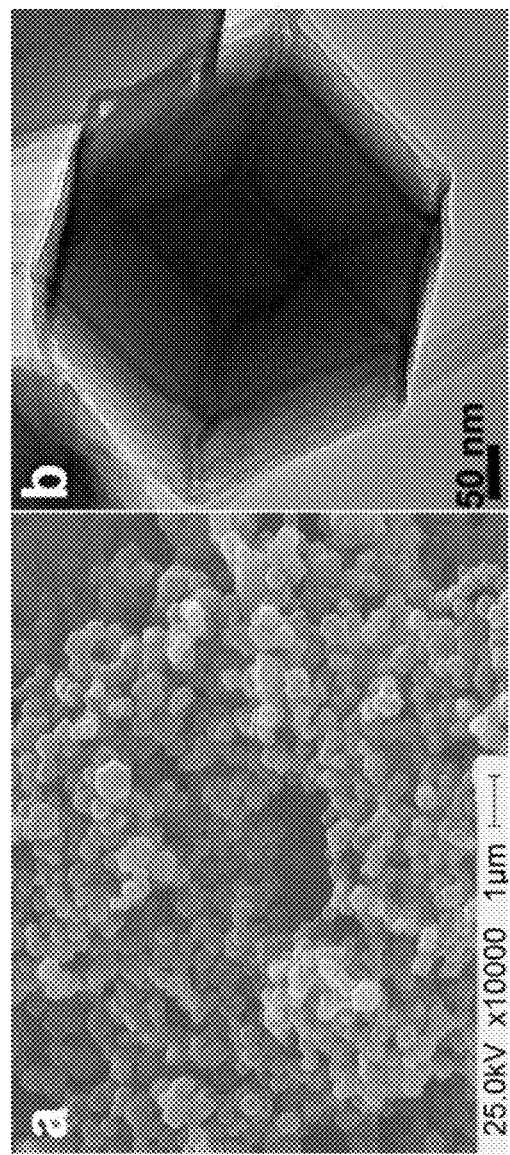
FIGS. 16A-16C show SEM(a) and TEM (b) images and EDS spectrum (c) of ZIF-8@FeCo-TA.
Figure 16C:
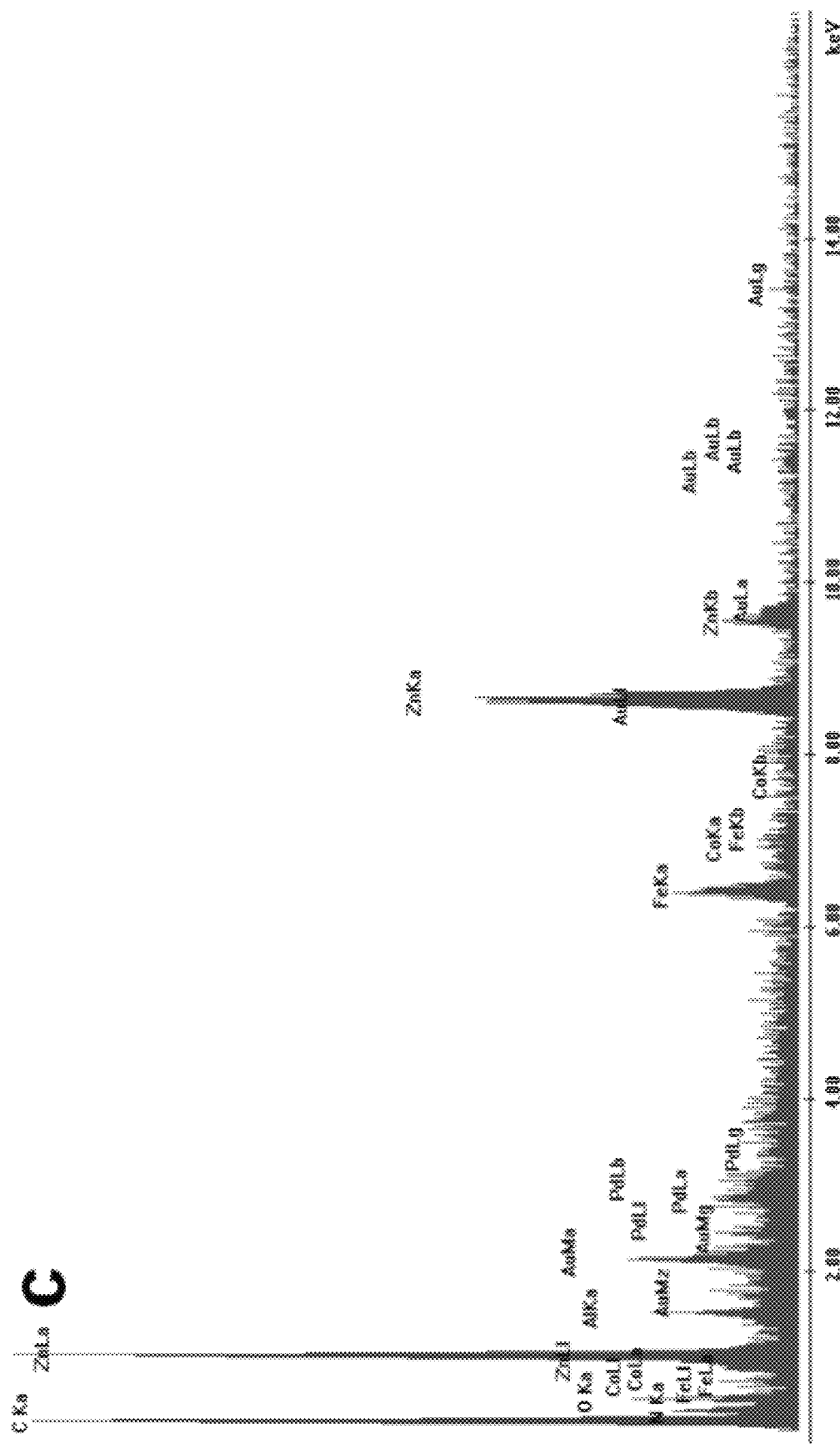
Figures 17A, 17B:
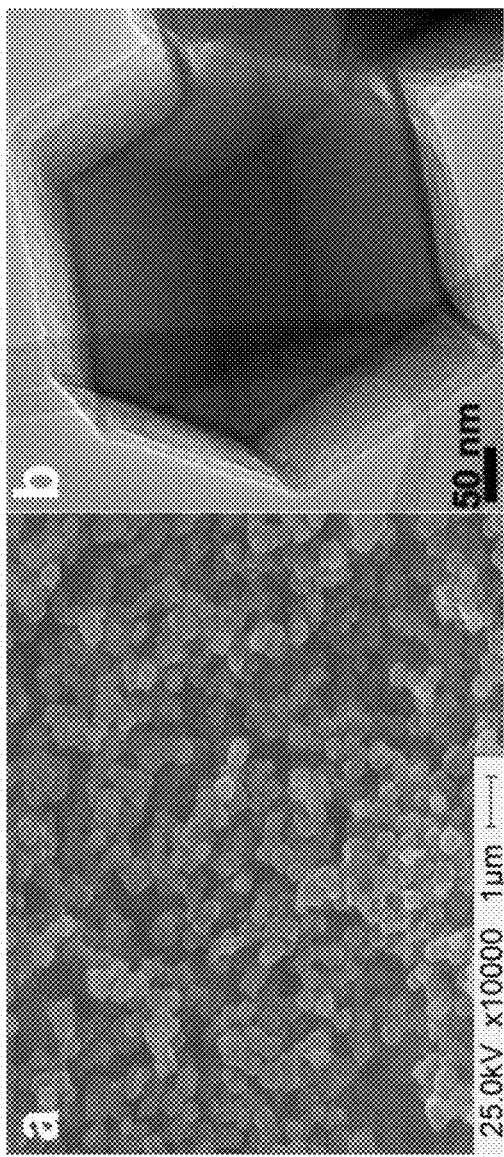
FIGS. 17A-17C show SEM(a) and TEM (b) images and EDS spectrum (c) of ZIF-8@FeNi-TA.
Figure 17C:
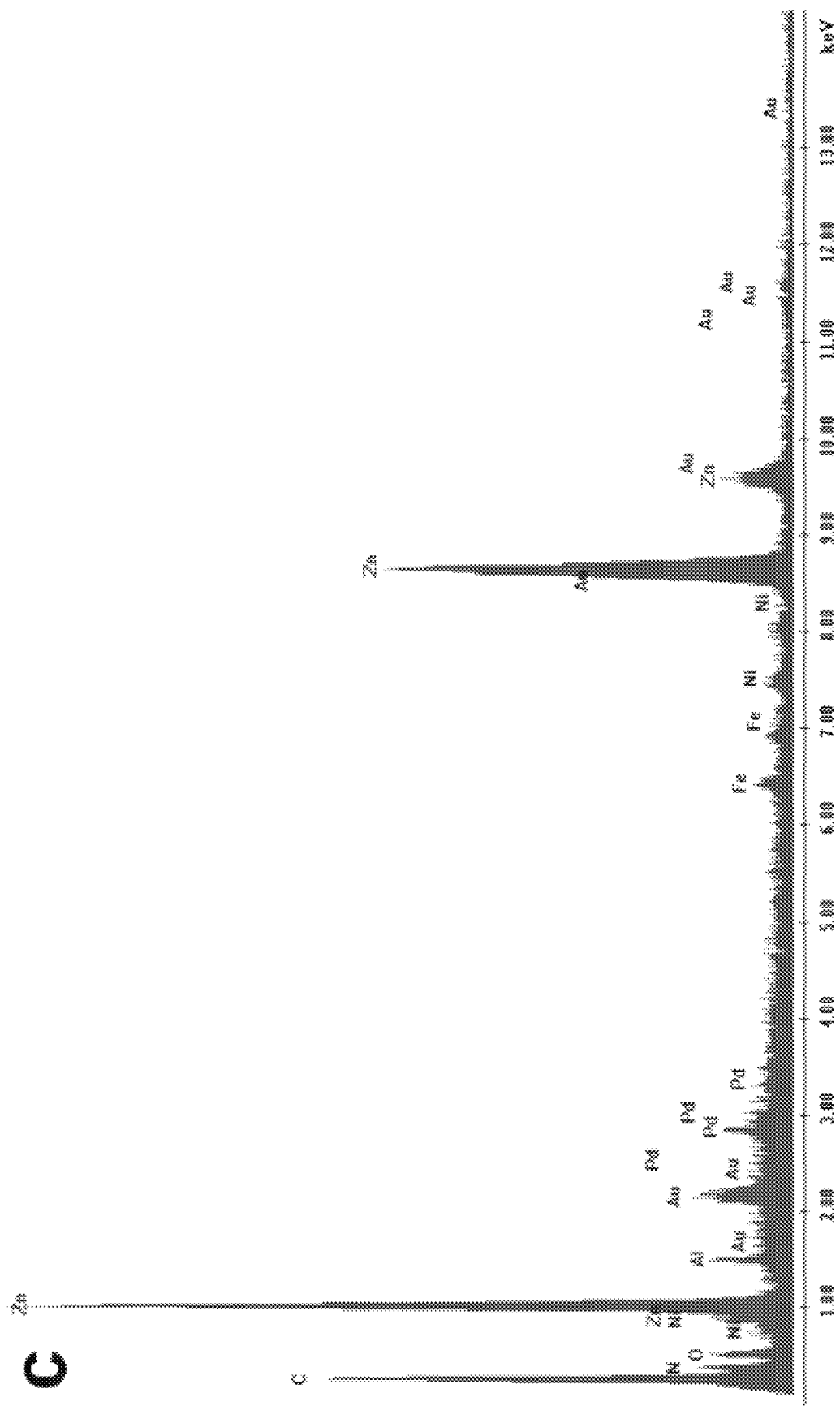
Figures 18A, 18B:
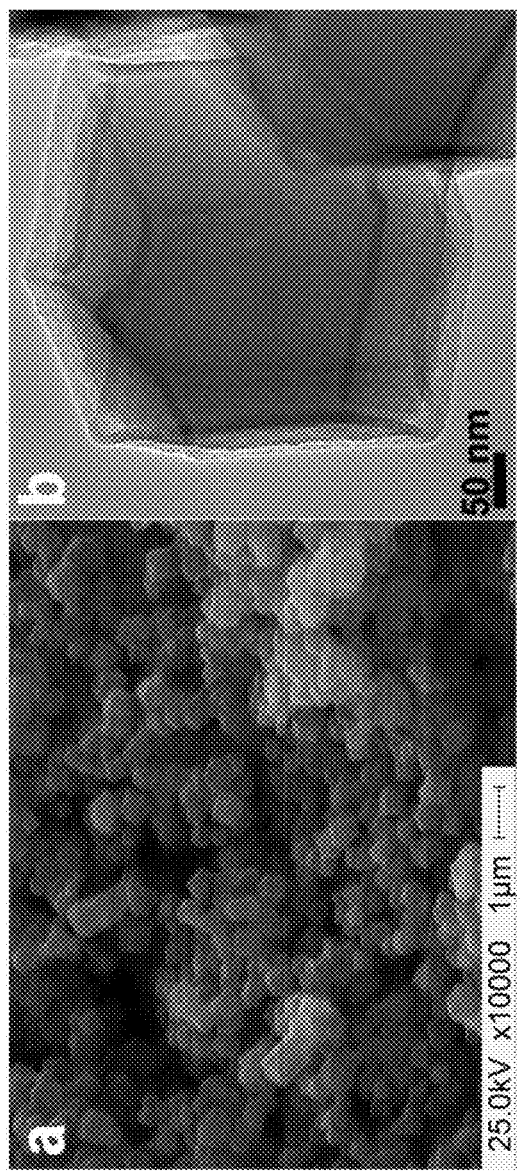
FIGS. 18A-18C show SEM(a) and TEM (b) images and EDS spectrum (c) of ZIF-8@CoNi-TA.
Figure 18C:
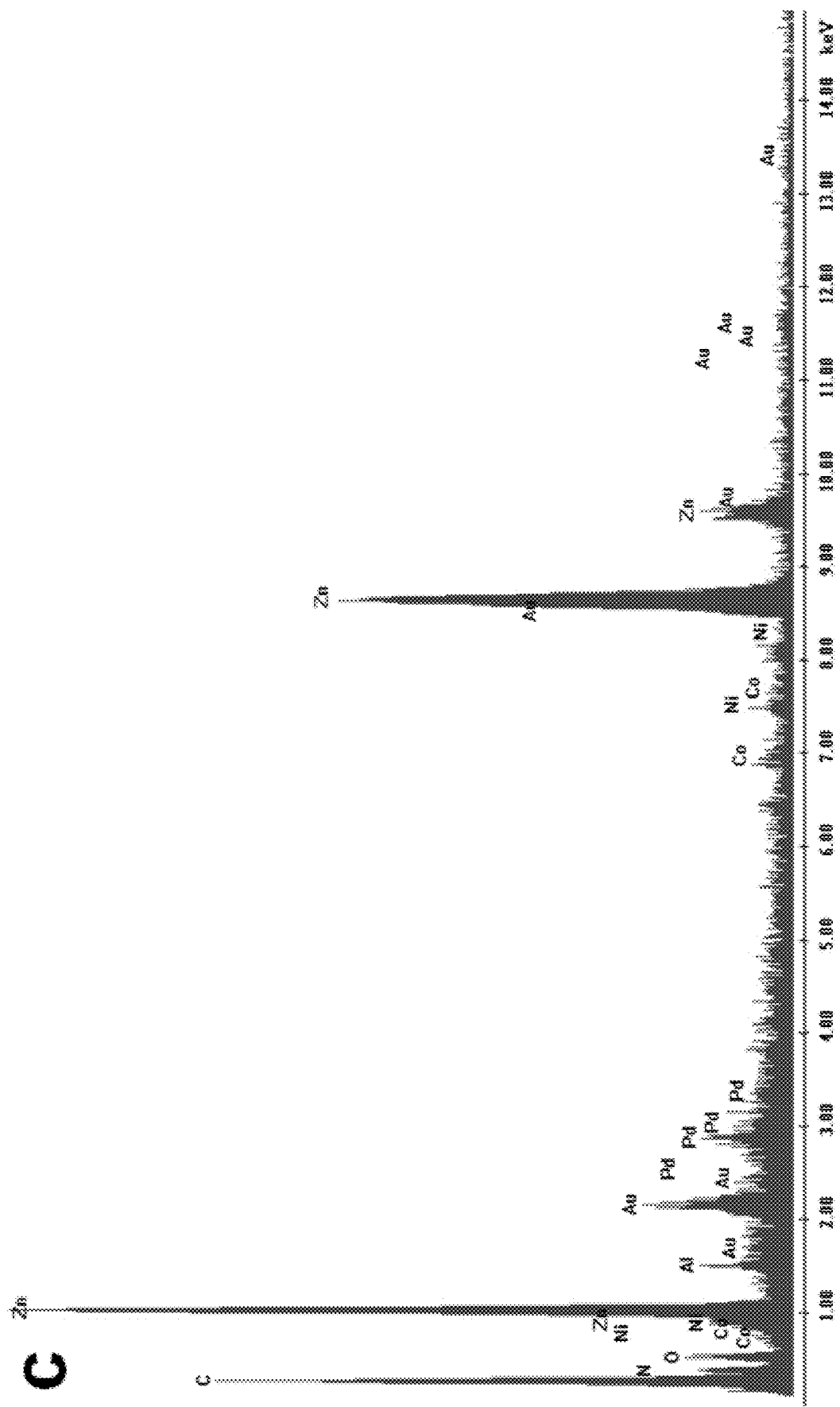

The versatility of the synthetic strategy was further explored by making samples that contained two different metals in M$^{mix}$-N$_x$ sites. This was achieved by retaining our general synthetic methodology and using combinations of (a) iron(III)/cobalt(II), (b) iron(III)/nickel(II) or (c) cobalt(II)/nickel(II) ions in the tannic acid coordination polymer shell layer of the composite precursor (FIG. 1, Step III, Route B). This produced ZIF-8@FeCo-TA, ZIF-8@FeNi-TA and ZIF-8@CoNi-TA. Microscopy and EDS established that the products possessed the expected elemental compositions (FIGS. 16-18).

Figures 6A, 6O:
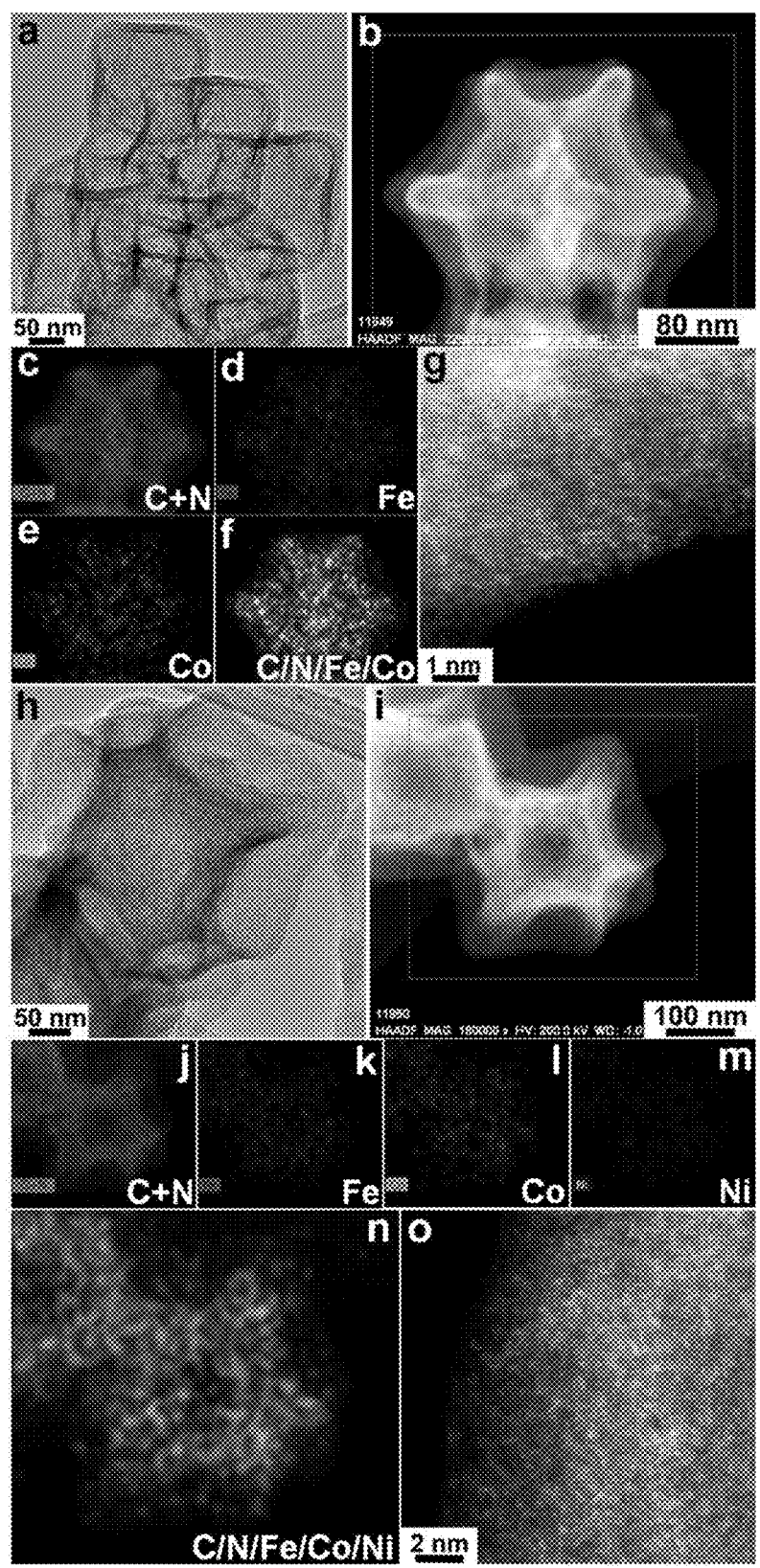
FIGS. 6A-6O represent (a) TEM image, (b-f) HAADF-STEM image and corresponding element maps examining the distribution of C, N, Fe, and Co, (g) atomic-resolution HAADF-STEM image of the H—FeCo—N$_x$—C. Single Fe/Co atoms are highlighted by red circles. (h) TEM image, (i-n) HAADF-STEM image and element maps showing the locations of C, N, Fe, Co, and Ni, (o) atomic-resolution HAADF-STEM image of H—FeCoNi—N$_x$—C. Single Fe/Co/Ni atoms are highlighted by red circles.
Figure 23:
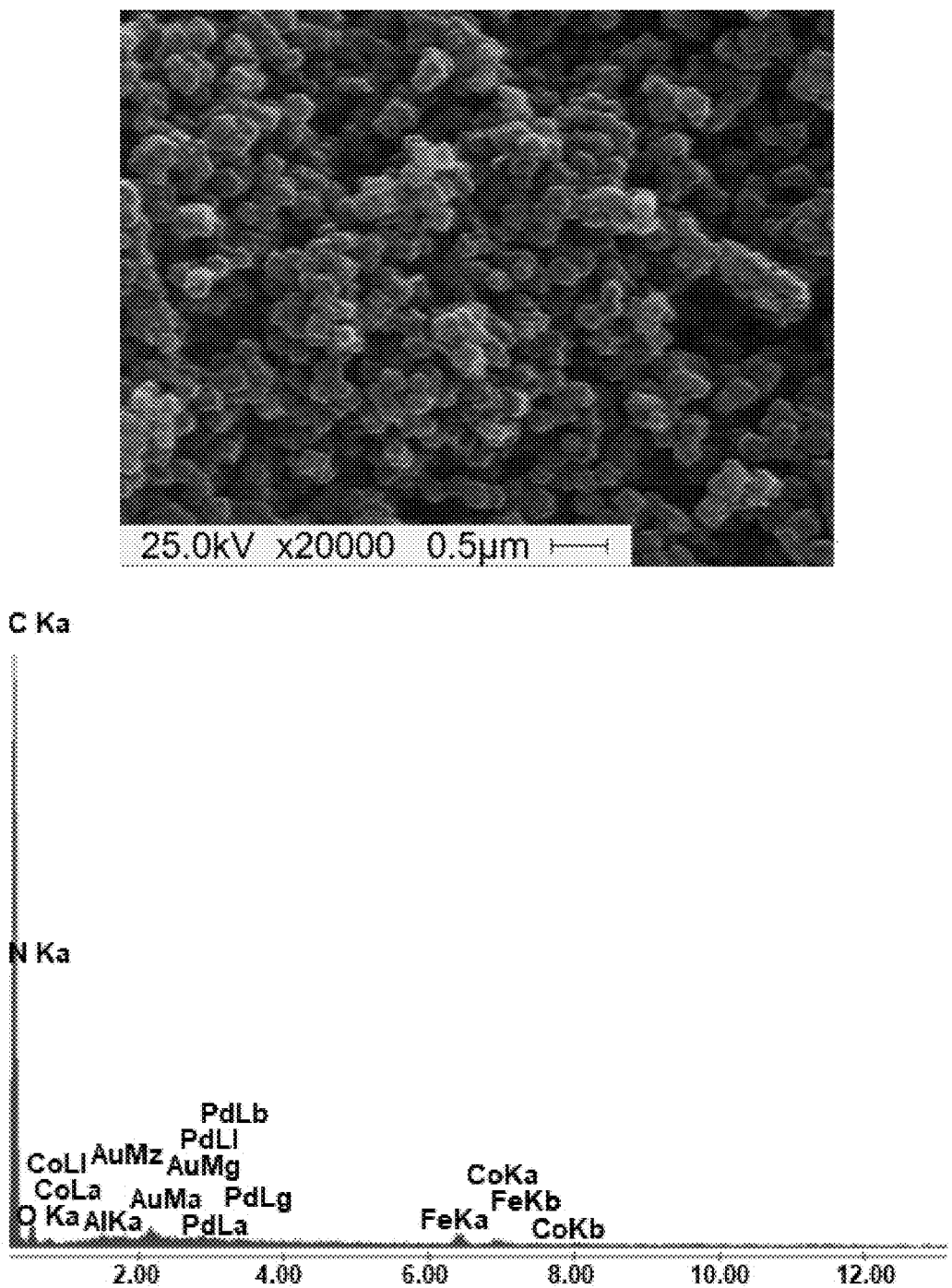
FIG. 23 shows SEM image and EDS spectrum of H—FeCo—$N_x$—C.
Figure 24:
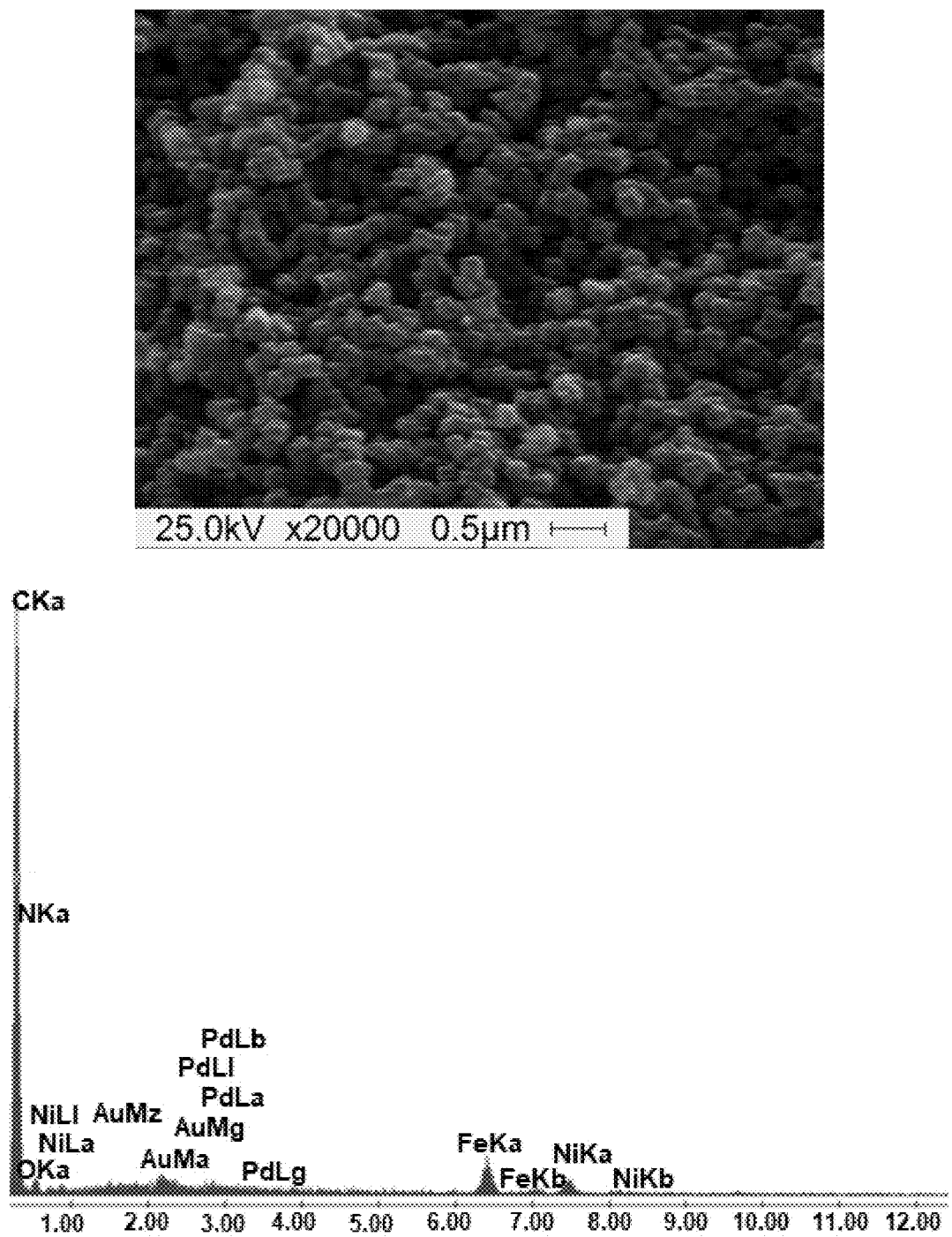
FIG. 24 shows SEM image and EDS spectrum of H—FeNi—$N_x$—C.
Figure 25:
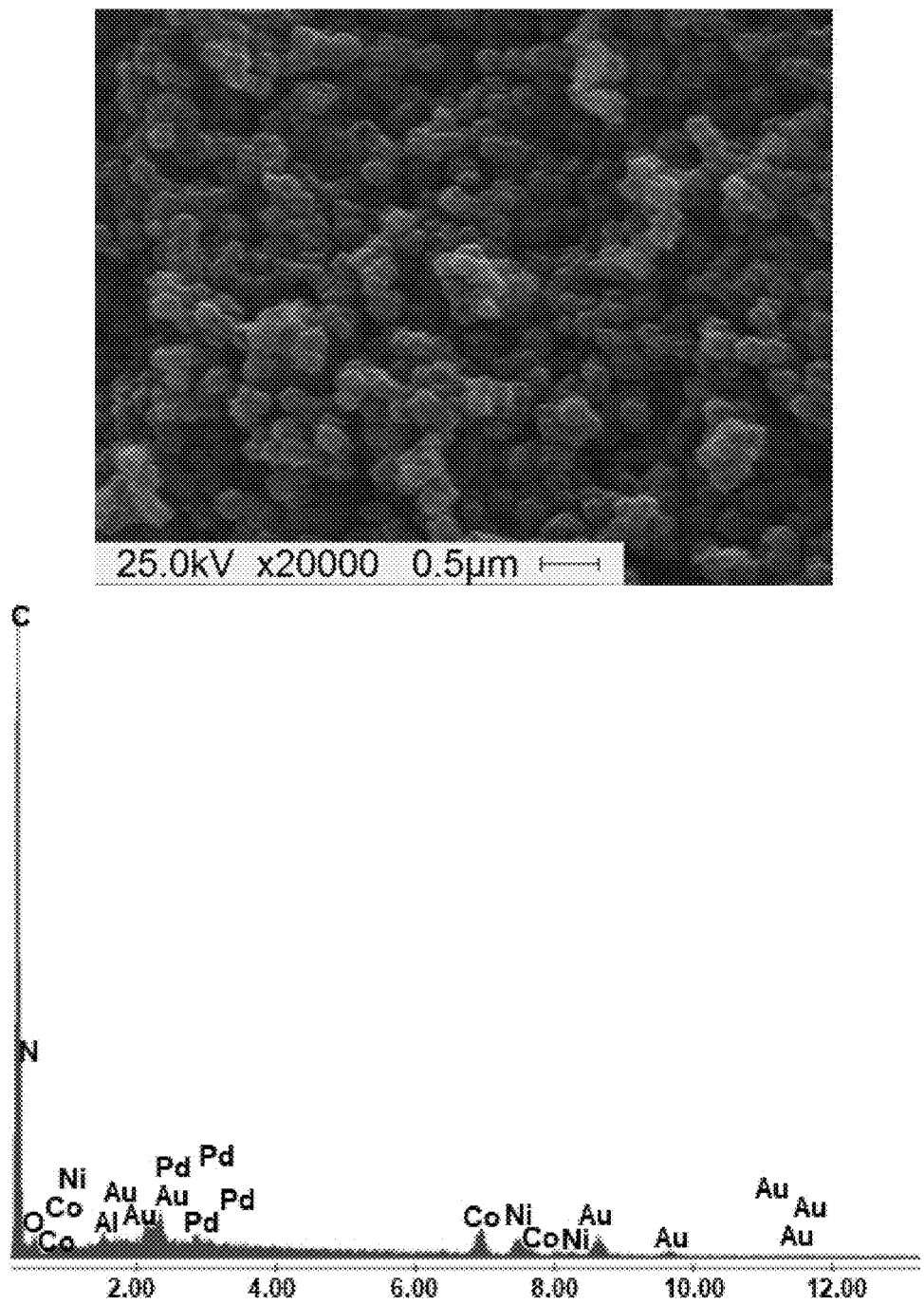
FIG. 25 shows SEM image and EDS spectrum of H—CoNi—$N_x$—C.
Figure 26:
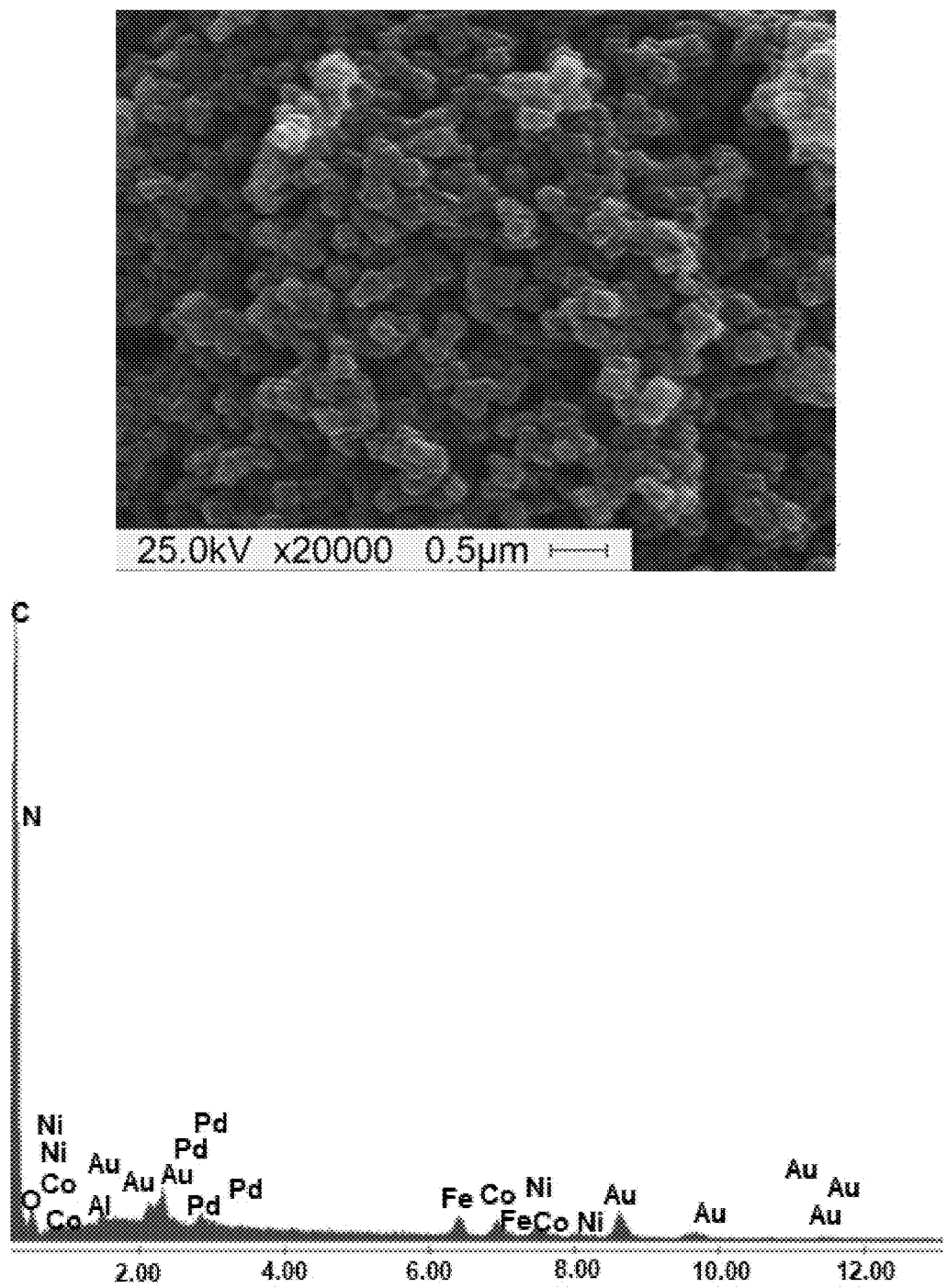
FIG. 26 shows SEM image and EDS spectrum of H—FeCoNi—$N_x$—C.
Figure 27:
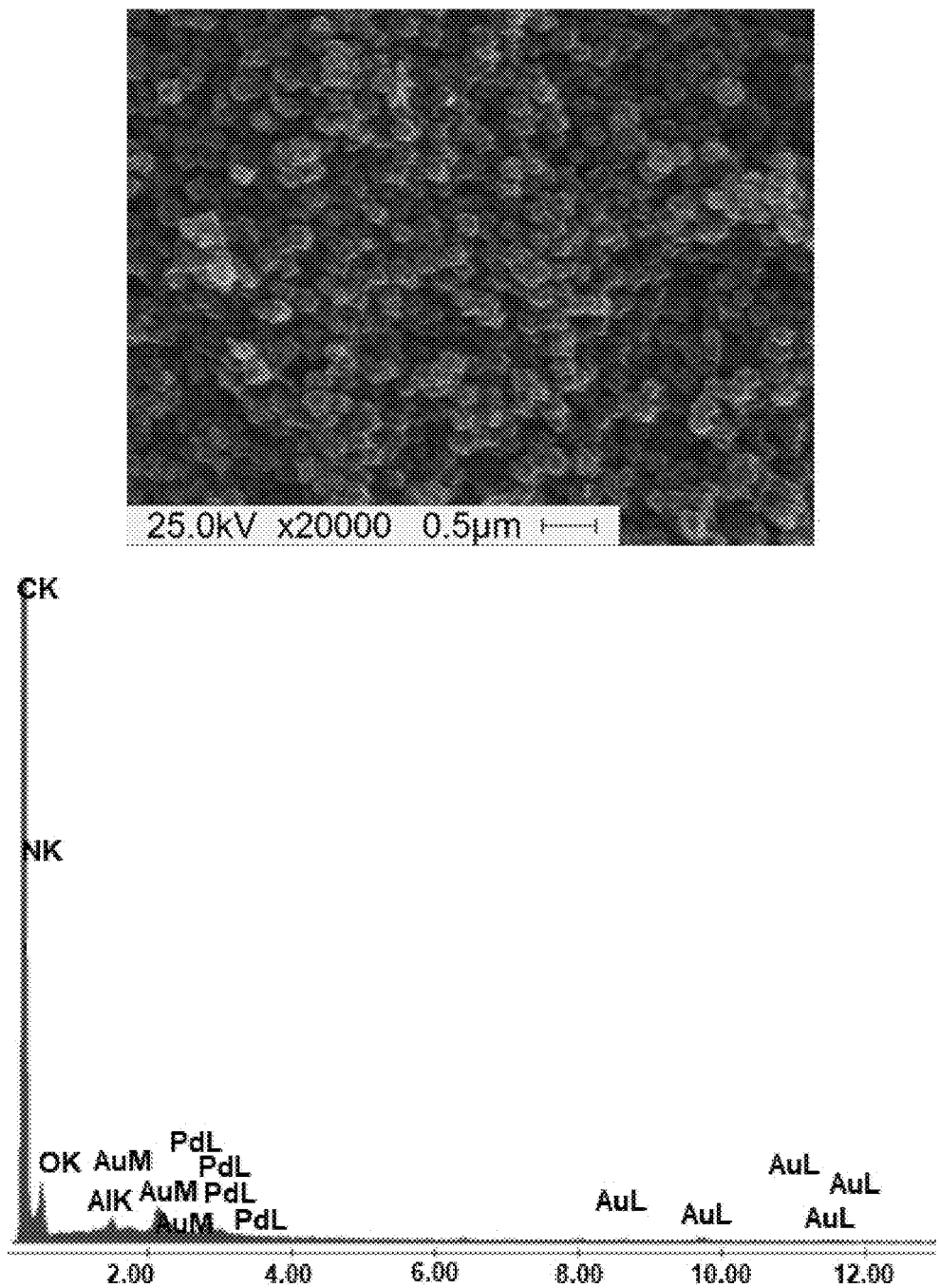
FIG. 27 shows SEM image and EDS spectrum of NPCC.
Figure 40:
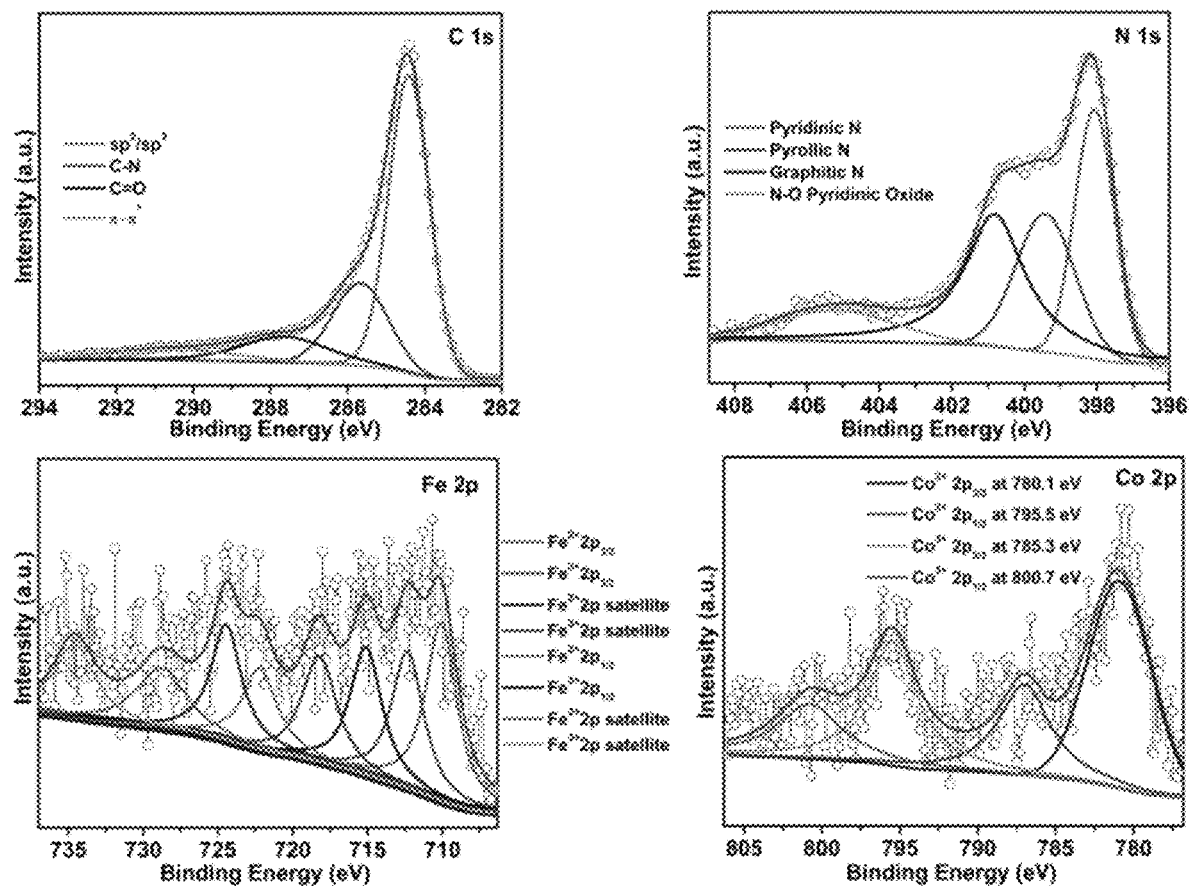
FIG. 40 shows the XPS spectra of H—FeCo—$N_x$—C.
Figure 41:
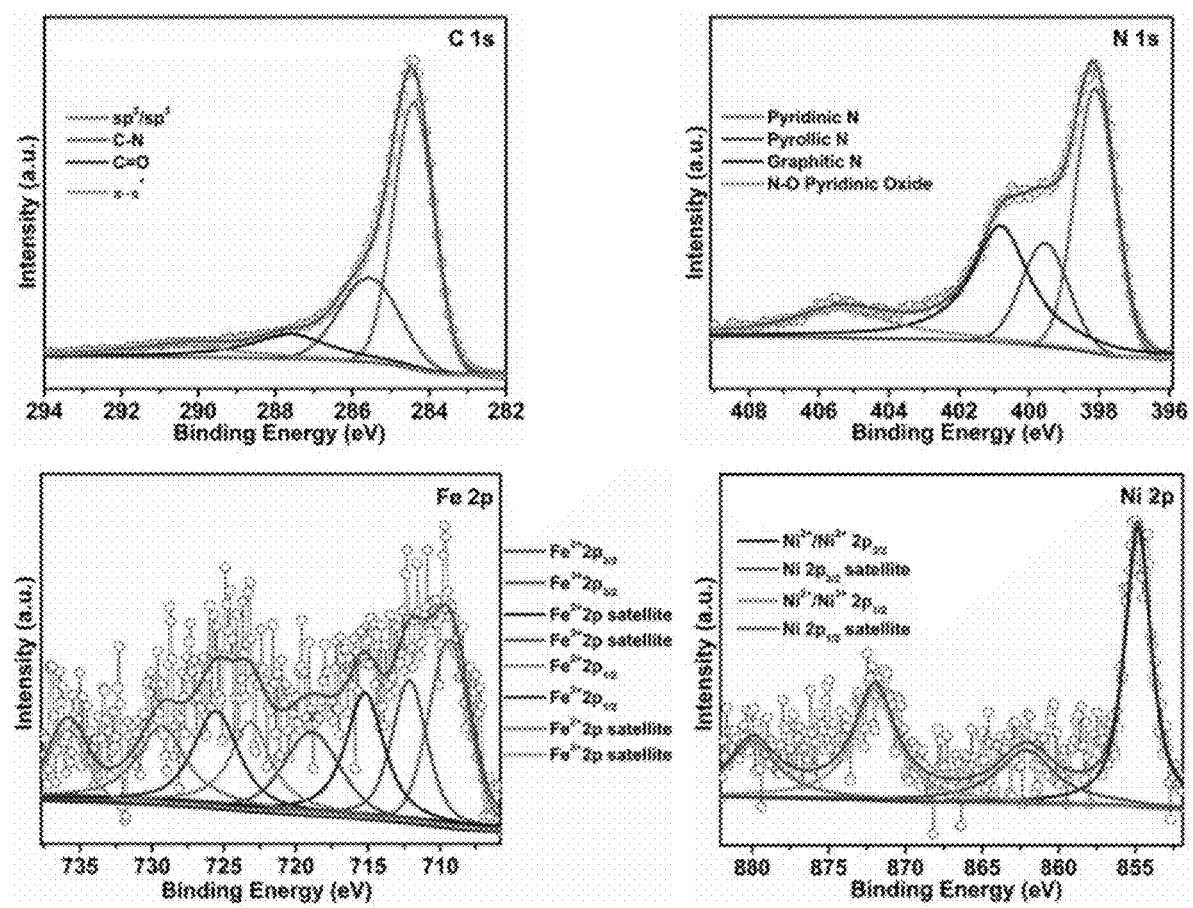
FIG. 41 shows the XPS spectra of H—FeNi—$N_x$—C.
Figure 42:
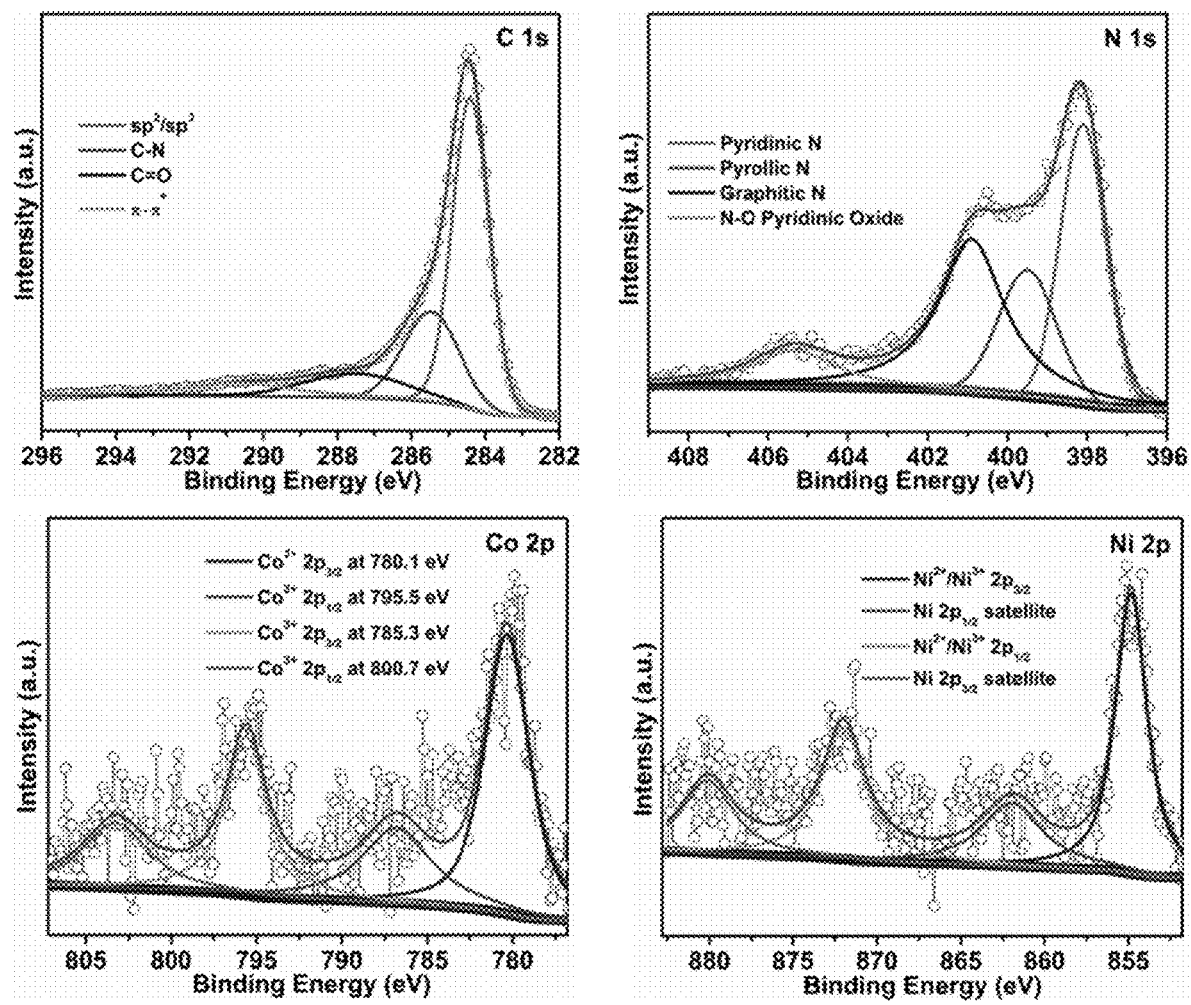
FIG. 42 shows the XPS spectra of H—CoNi—$N_x$—C.
Figure 43:
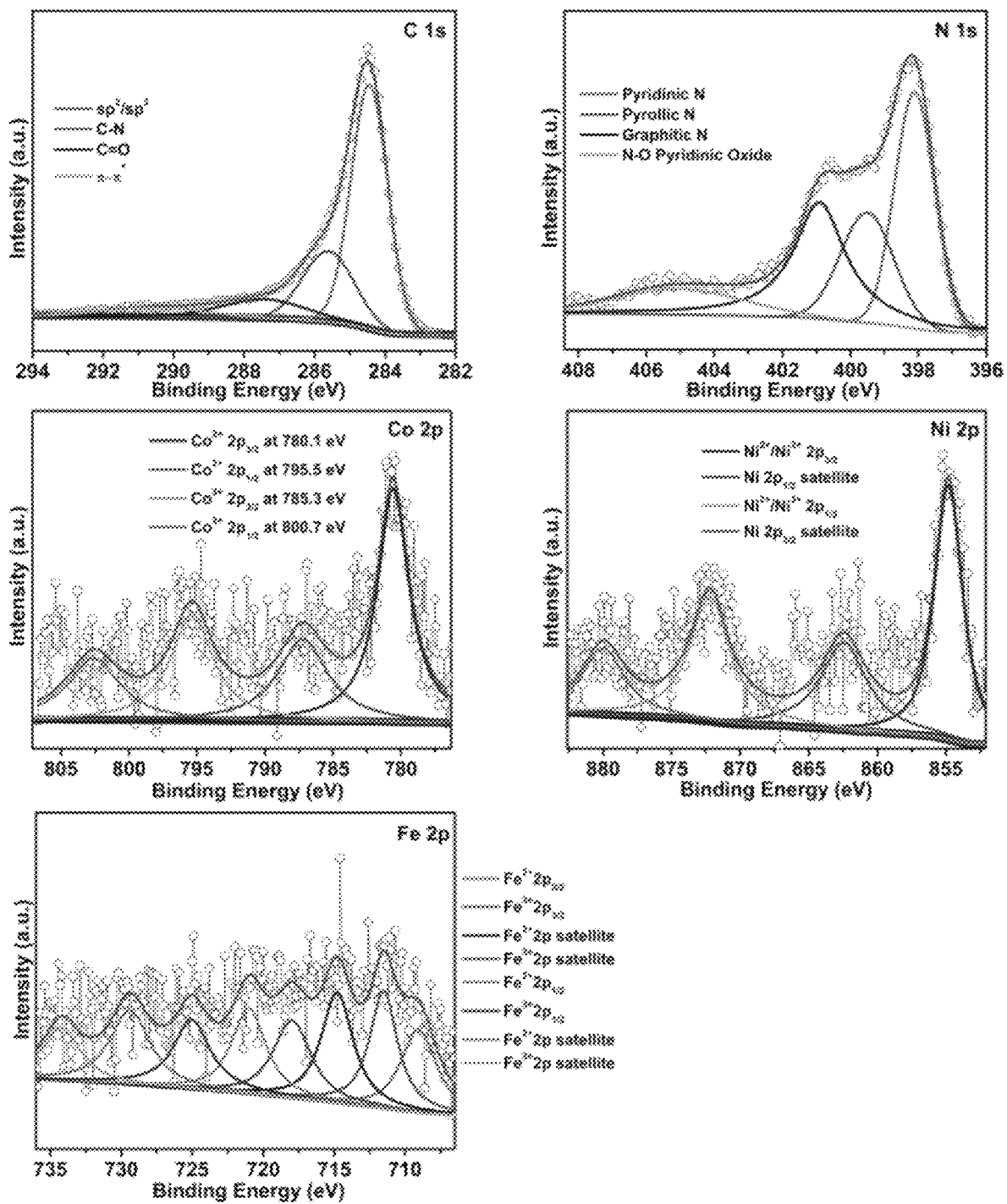
FIG. 43 shows the XPS spectra of H—FeCoNi—$N_x$—C.

The subsequent pyrolysis, acid leaching and second pyrolysis treatment of ZIF-8@FeCo-TA yielded hollow capsules with embedded FeCo—N$_x$ sites (H—FeCo—N$_x$—C). SEM, EDS and TEM analyses verified hollow capsules comprising Fe/Co-nitrogen-doped carbon (FIGS. 6a and 23). No large particles are observed in the TEM image, which is consistent with the formation of isolated metal ions rather than larger aggregates. No metallic species were detected by XPS (FIG. 40). The HAADF-STEM and EDS elemental maps for H—FeCo—N$_x$—C (FIGS. 6b-f) indicate that he Fe/Co elements were uniformly distributed over the sample, suggesting that Fe/Co were able to coexist in atomically dispersed form. The atomic-resolution HAADF-STEM image of H—FeCo—N$_x$—C further verified the presence of atomically dispersed Fe/Co-nitrogen-doped active sites (FIG. 6g). To probe the electronic structure of the atomically dispersed Fe/Co, XANES and EXAFS measurements were performed. Fe K-edge and L-edge XANES spectra of H—FeCo—N$_x$—C closely resembled data for FeTmcpp and H—Fe—N$_x$—C, whereas the Co K-edge and L-edge data for H—FeCo—N$_x$—C closely matched data for CoTmcpp and H—Co—N$_x$—C, implying that the Fe and Co atoms in H—FeCo—N$_x$—C carried positive charges and existed in porphyrin-like environments (FIGS. 3a, 3d). Further, the Fe K-edge EXAFS data for H—FeCo—N$_x$—C align closely with that of H—Fe—N$_x$—C and FeTmcpp, confirming a Fe—N coordination (FIGS. 3b, 3c). The Co K-edge spectra showed only one peak at about 1.4 Å in R space, attributed to a Co—N scattering path (FIG. 3e), which is again remarkably similar to the corresponding spectra of H—Co—N$_x$—C and CoTmcpp. $^{57}$Fe Mössbauer data for H—FeCo—N$_x$—C could be deconvoluted into three doublets and a sextet, which is again similar to data for H—Fe—N$_x$—C(FIG. 4b). The doublets D$_1$, D$_2$ and D$_3$ are due to Fe—N species. Combining the XAS and $^{57}$Fe Mössbauer results, it can be concluded that Fe and Co predominantly exist as isolated cations in H—FeCo—N$_x$—C. It might be possible that some Fe or Co atoms are N-bridged together by chemical bonds, but the path length of Fe—N—Co is too similar to that of H—Fe—N$_x$—C and H—Co—N$_x$—C to allow confirmation of this by EXAFS analysis.

Figure 31:
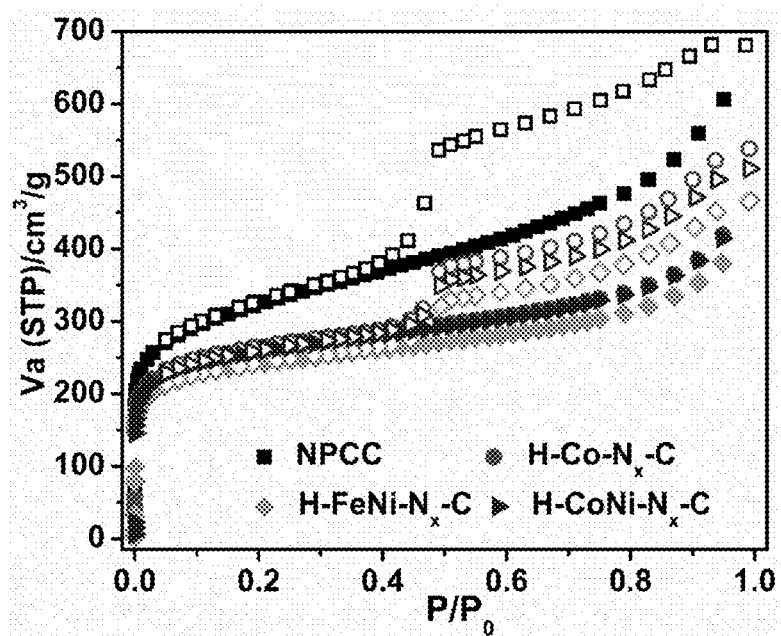
FIG. 31 shows $N_2$ adsorption (filled symbols) and desorption (open symbols) isotherms measured at 77 K for NPCC, H—Co—$N_x$—C, H—FeNi—$N_x$—C and H—CoNi—$N_x$—C.
Figure 33:
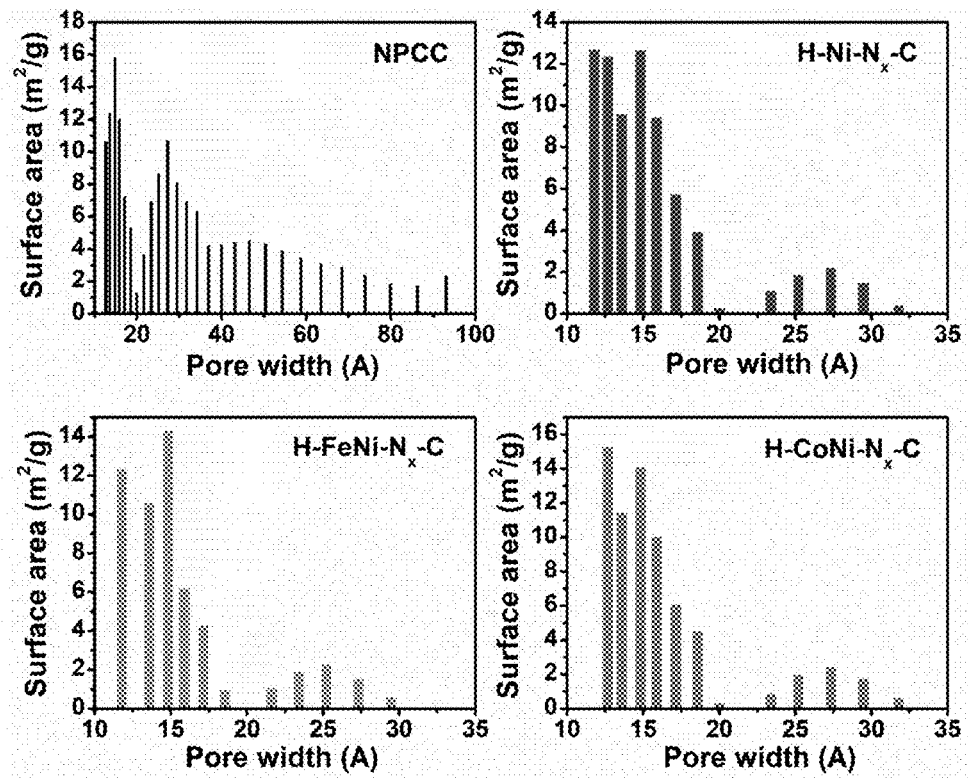
FIG. 33 shows pore size distribution plots calculated using a DFT method from $N_2$ isotherms measured at 77 K for NPCC, H—Ni—$N_x$—C, H—FeNi—$N_x$—C and H—CoNi—$N_x$—C.
Figure 34:
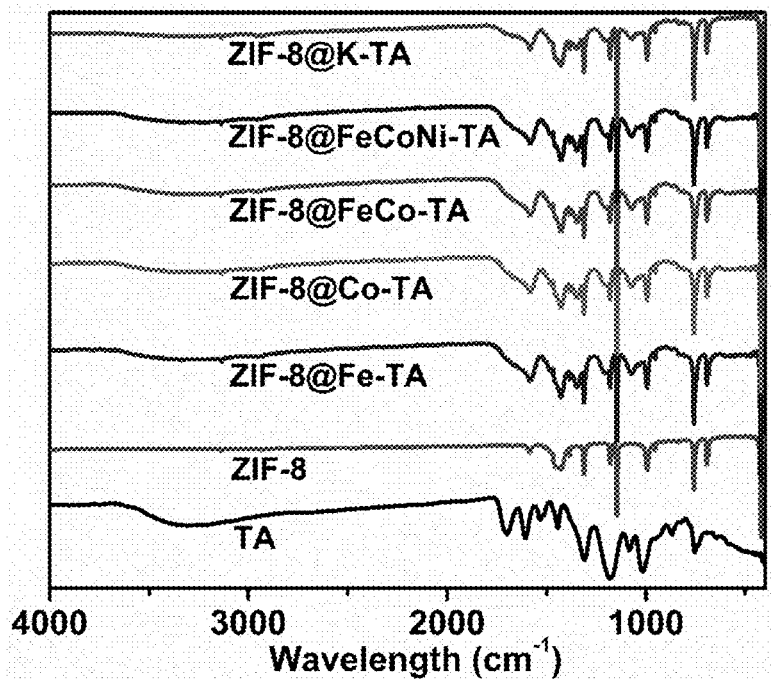
FIG. 34 shows FTIR spectra of metal-organic frameworks described herein.
Figure 35:
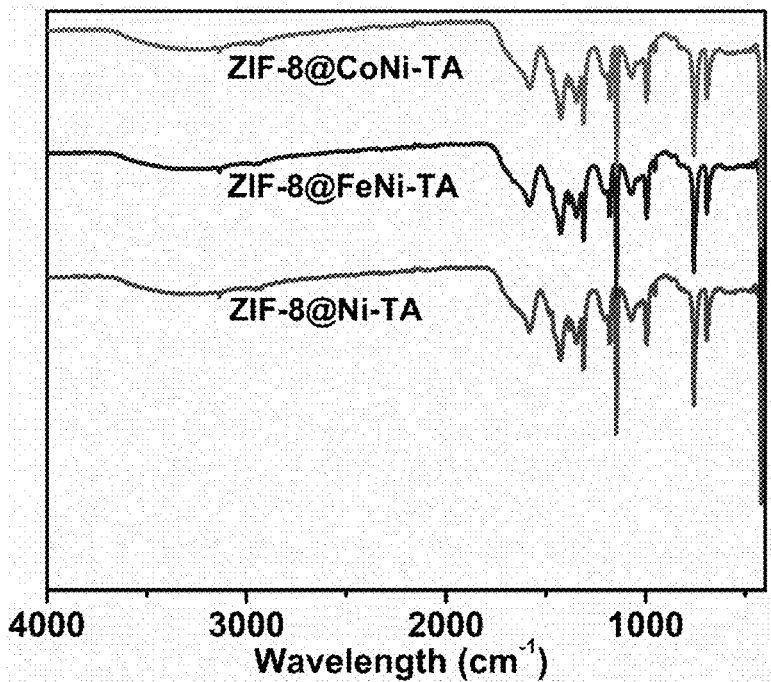
FIG. 35 shows FTIR spectra of metal-organic frameworks described herein.

The scope of the syntheses was expanded to include H—FeCo—N$_x$—C analogs, in particular FeNi—N$_x$—C and H—CoNi—N$_x$—C. PXRD, SEM, TEM, STEM, EDS elemental analysis, XPS, XAS and Raman spectroscopy (FIGS. 3, 24, 25, 29, 30, 36, 41, 42, 47, and 48) revealed a similar structural picture to that of H—FeCo—N$_x$—C: these materials comprised two kinds of atomically dispersed metal atoms decorating the walls of hollow N-doped carbon capsules. ICP-AES and combustion elemental analyses established the metal and nitrogen contents, respectively, in these composites (Table 1). The BET surface areas of these materials ranged from 887 to 962 m$^2$ g$^{-1}$ (Table 2, FIGS. 5 and 31). Pore size distribution plots derived from the adsorption isotherms showed a hierarchical porosity similar to that seen for the H-M-N$_x$—C analogs (FIGS. 32 and 33).

Figures 7A, 7B, 7C, 7D, 7E, 7F:
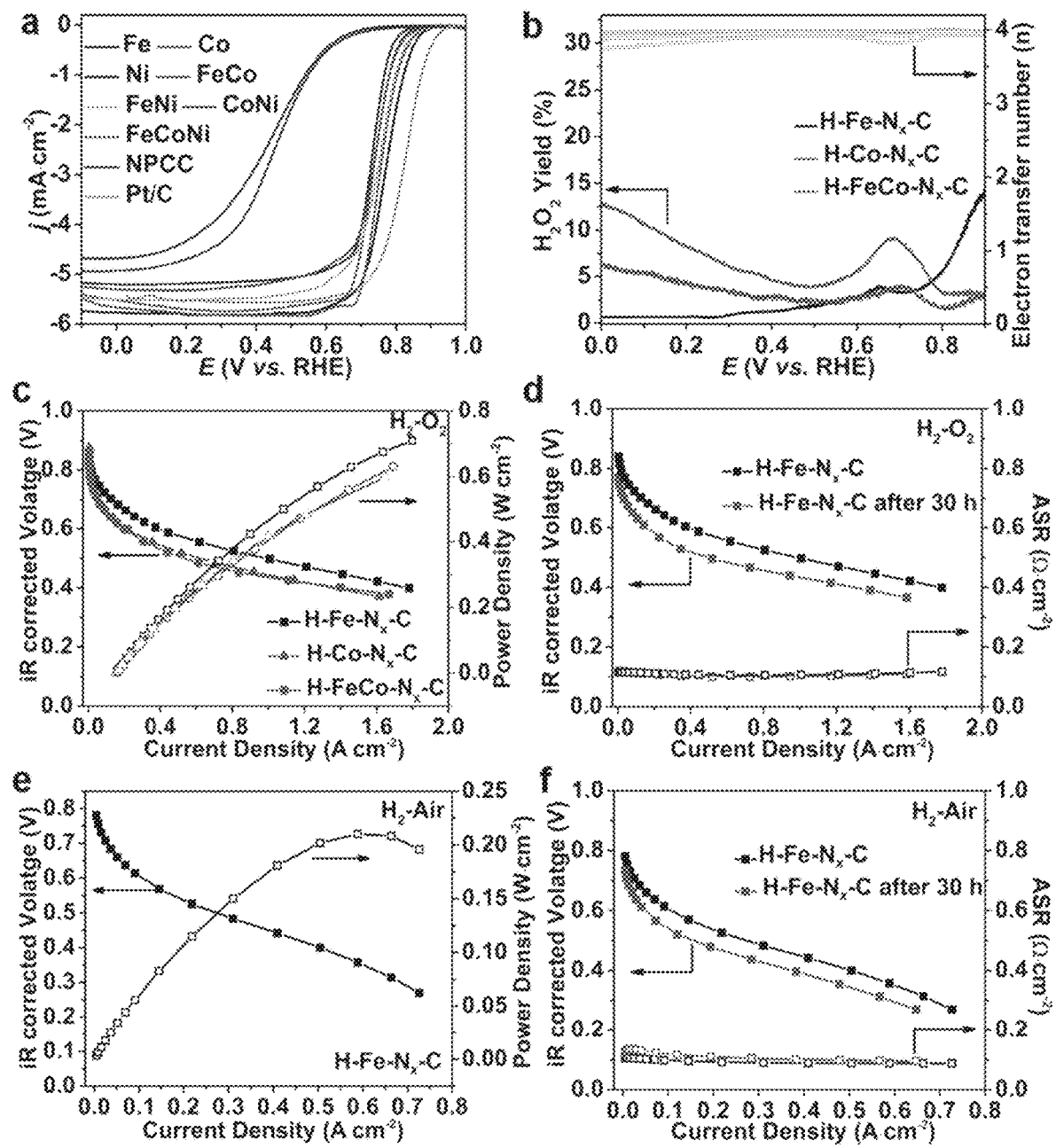
FIGS. 7A-7F represent (a) Linear sweep voltammetry (LSV) curves, (b) H$_2$O$_2$ yield and electron transfer numbers of selected catalysts in 0.5 M H$_2$SO$_4$ by RRDE tests. (c-d) I-V polarization and power density curves for H$_2$—O$_2$ PEMFC with H—Fe—N$_x$—C, H—Co—N$_x$—C, and H—FeCo—N$_x$—C as cathode catalysts at 80° C. (e, f) H$_2$-air PEMFC performance with H—Fe—N$_x$—C as the cathode catalyst.
Figure 8:
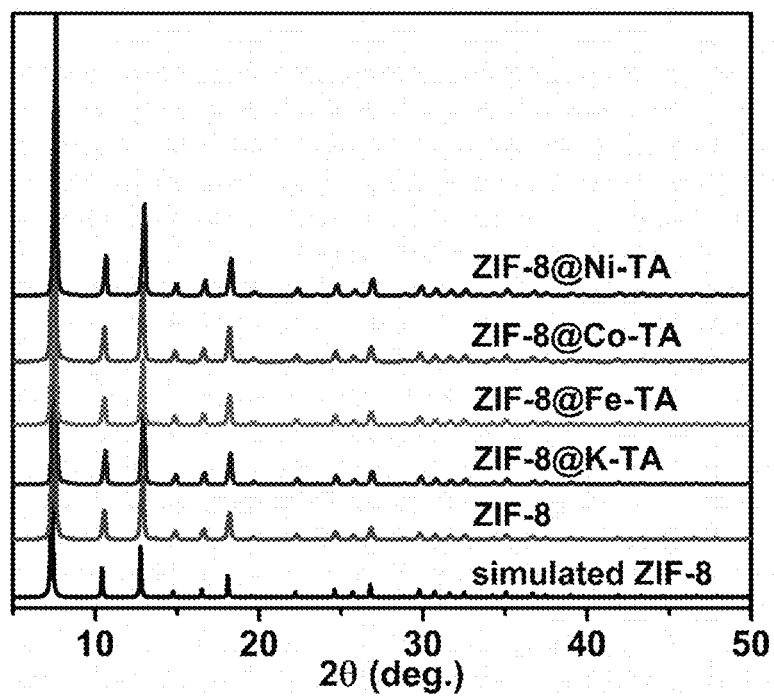
FIG. 8 shows PXRD patterns of metal-organic frameworks described herein.
Figure 9:
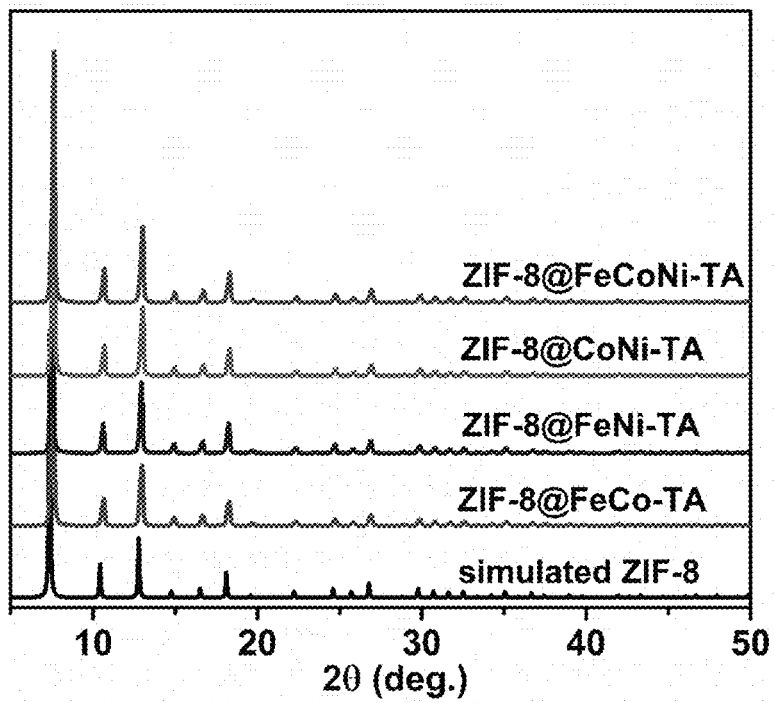
FIG. 9 shows PXRD patterns of metal-organic frameworks described herein.
Figures 19A, 19B:
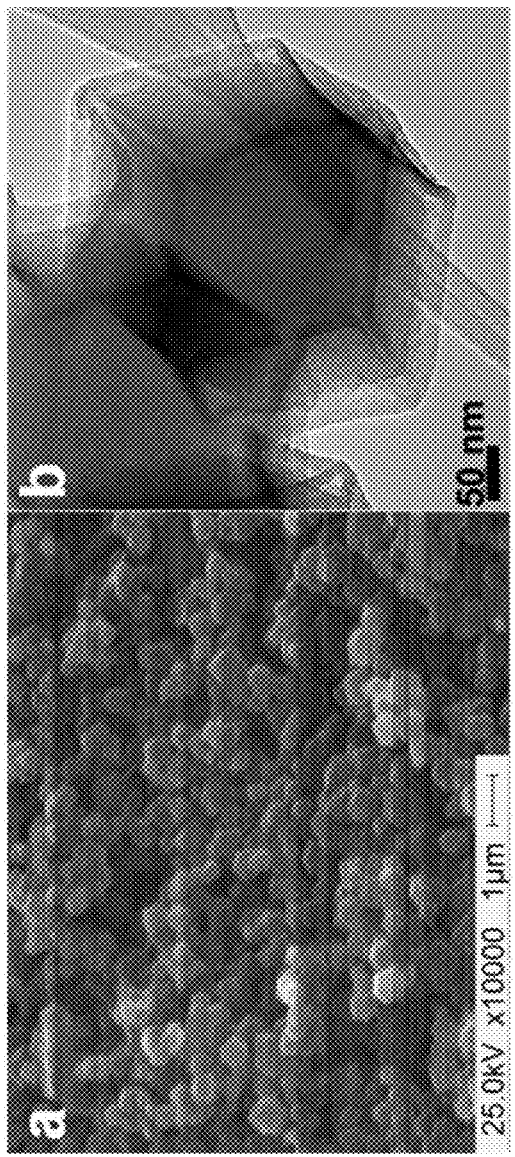
FIGS. 19A-19C show SEM(a) and TEM (b) images and EDS spectrum (c) of ZIF-8@FeCoNi-TA.
Figure 19C:
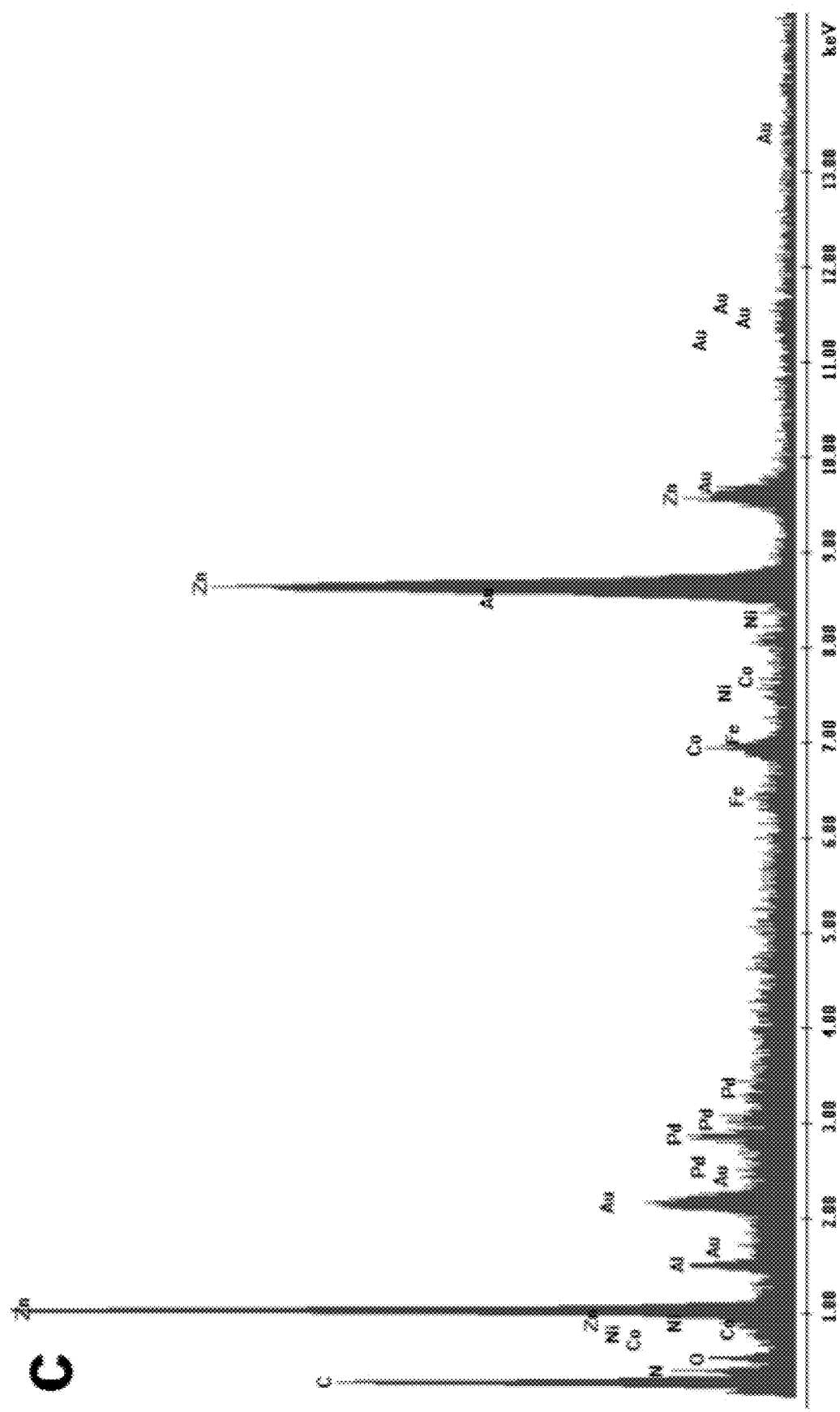
Figures 49A, 49B:
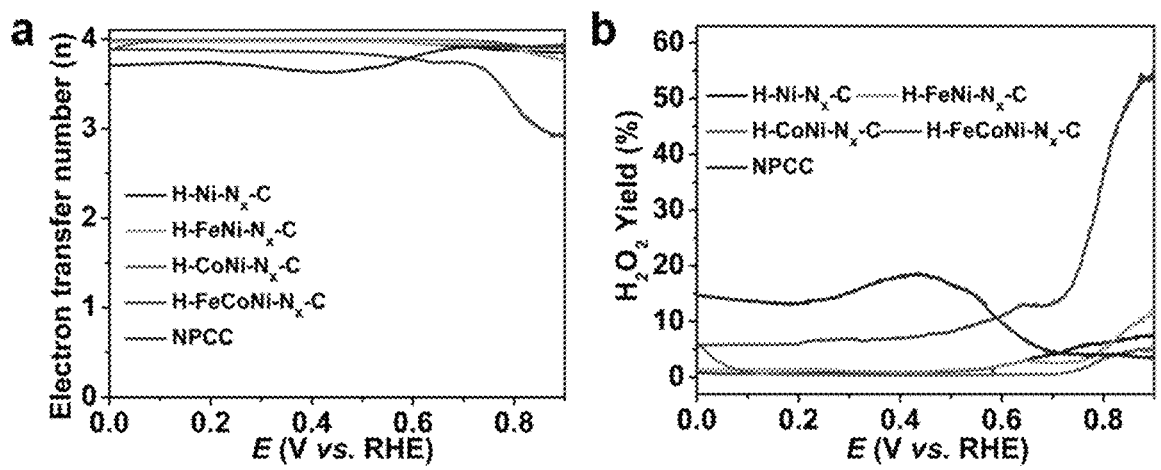
FIGS. 49A-49B show (a) electron transfer number and (b) $H_2O_2$ yield of metal-organic frameworks described herein.
Figure 50:
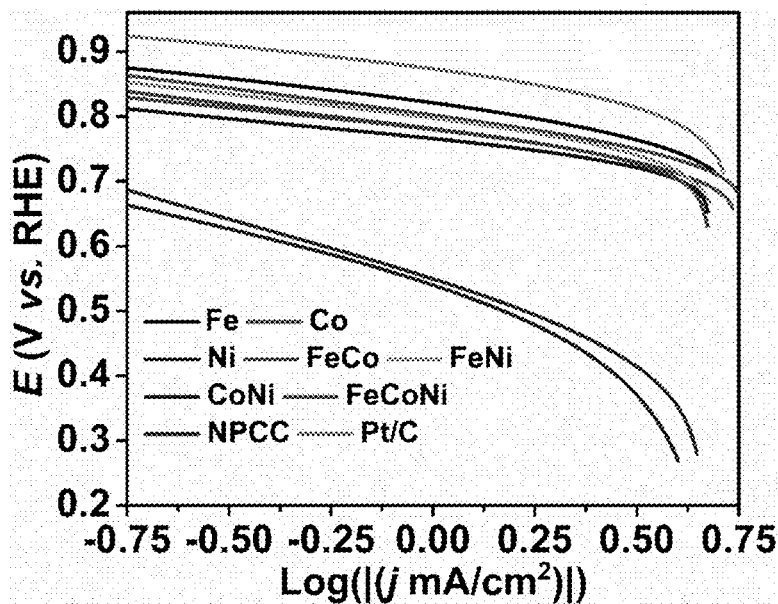
FIG. 50 shows Tafel plots of as-synthesized materials in an $O_2$-saturated $H_2SO_4$ (0.05 M). H—Fe—$N_x$—C, 63 mV·dec$^{-1}$; H—Co—$N_x$—C, 65 mV·dec$^{-1}$; H—Ni—$N_x$—C, 146 mV·dec$^{-1}$; H—FeCo—$N_x$—C, 73 mV·dec$^{-1}$; H—FeNi—$N_x$—C, 78 mV·dec$^{-1}$; H—CoNi—$N_x$—C, 64 mV·dec$^{-1}$; NPCC, 182 mV·dec$^{-1}$; Pt/C, 48 mV·dec$^{-1}$.
Figure 51:
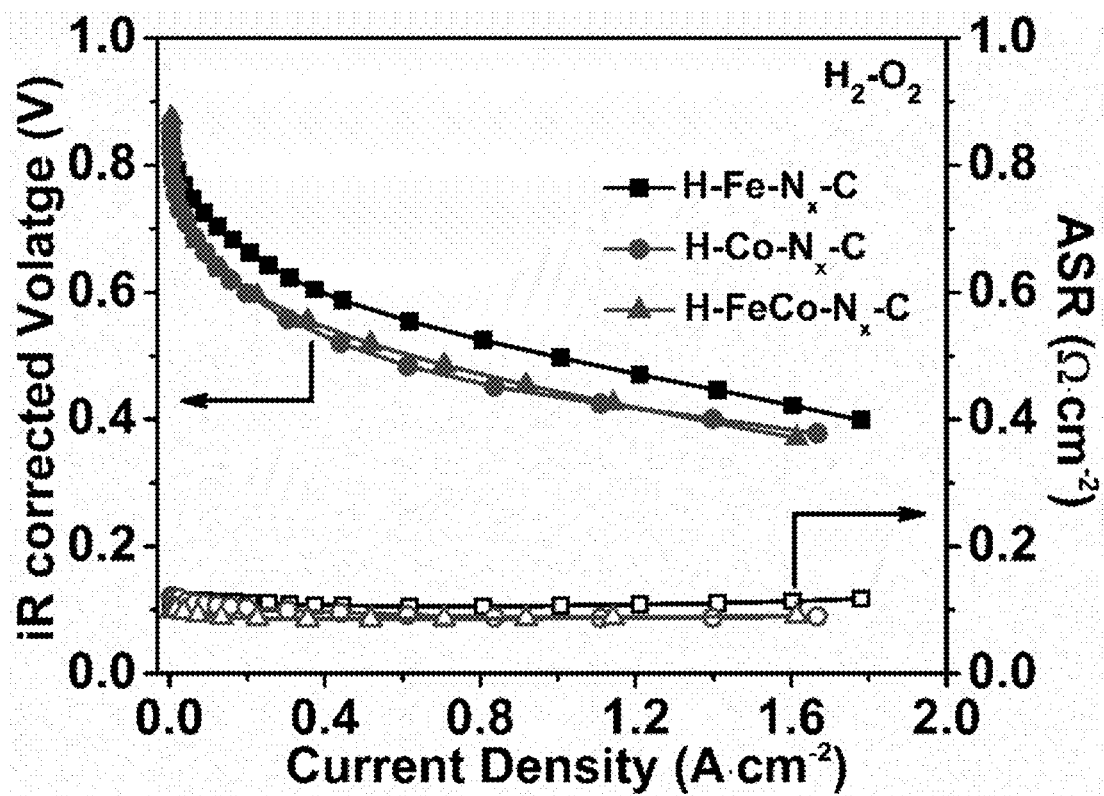
FIG. 51 shows polarization and corresponding resistance curves for $H_2$—$O_2$ PEM fuel cells with different catalysts.

In order to explore the limits of this synthetic approach, H—FeCoNi—N$_x$—C was prepared. This involved incorporating a combination of iron(III)/cobalt(II)/nickel(II) into the tannic acid coordination polymer shell layer of the composite precursor to produce ZIF-8@FeCoNi-TA. The expected metal components were found by SEM, TEM and EDS (FIG. 19). Subsequent pyrolysis/acid leaching/second pyrolysis treatments resulted in the formation of H—FeCoNi—$N_x$—C. The SEM, TEM, and HAADF-STEM images and associated element maps (FIGS. 6h-n and 26) demonstrate that the Fe/Co/Ni components were uniformly dispersed over the N-doped hollow capsules. Atomic-resolution HAADF-STEM allowed visualization of the atomically dispersed Fe/Co/Ni atoms in H—FeCoNi—$N_x$—C. As shown in FIG. 6o, Fe/Co/Ni single-atoms (highlighted by red circles) in high density were visible on the N-doped carbon support, implying a high surface concentration of atomically dispersed $M^{mix}$-$N_x$ (M=Fe, Co and Ni) moieties. XAS analysis showed that iron, cobalt and nickel were coordinated with nitrogen atoms and dispersed as isolated atoms in H—FeCoNi—$N_x$—C (FIG. 3). The electronic structures of Fe, Co or Ni atom in H—FeCoNi—$N_x$—C were similar to those of the corresponding metal porphyrins. The $^{57}$Fe Mössbauer spectrum of H—FeCoNi—$N_x$—C was deconvoluted into four doublets, $D_1$ to $D_4$ which were all assigned to Fe—N species. No other iron-related phases observed (FIG. 4c). The BET surface area of H—FeCoNi—$N_x$—C calculated from $N_2$ physisorption data taken at 77 K was 919 $m^2$ $g^{-1}$ (FIG. 5, Table 2). The corresponding pore size distribution plot revealed hierarchical features characteristic of the other H-M-$N_x$—C and H-$M^{mix}$-$N_x$—C analogs (FIG. 32).

onset and half-wave potentials for H—Fe—$N_x$—C are the result of the unique structure of our porous hollow capsule catalyst, which is inherent to our synthetic methodology. The limiting current densities of H—Fe—$N_x$—C, H—Co—$N_x$—C and H—FeCo—$N_x$—C are larger than those of Pt/C and many other non-precious metal catalysts (FIG. 7a, Table 5). The peroxide yield was used to determine the electron transfer selectivity during ORR. H—Fe—$N_x$—C, H—Co—$N_x$—C, H—FeCo—$N_x$—C, H—FeNi—$N_x$—C and H—CoNi—$N_x$—C showed a very low peroxide yield of around 15% and the electron-transfer numbers were found to fall between 3.7-4. These results suggest the four-electron complete reduction of oxygen to water was preferred (i.e. $O_2+4H^++4e^-\rightarrow 2H_2O$ dominates) (FIGS. 7b and 49). However, further studies are necessary to establish if the ORR occurs through a single 4-electron transfer process or sequential 2-electron transfer processes, as have been reported by others.[71,72] The Tafel slopes of H—Fe—$N_x$—C, H—Co—$N_x$—C, and H—FeCo—$N_x$—C are 63 mV $dec^{-1}$, 65 mV $dec^{-1}$, and 73 mV $dec^{-1}$, respectively, suggesting that the rate-determining step in the ORR using these catalysts is the migration of adsorbed oxygenated species (FIG. 50). NPCC (no metal) and H—Ni—$N_x$—C catalysts exhibited poor ORR activity, confirming that the Co—$N_x$, Fe—$N_x$, or FeCo—$N_x$ sites were important here for realizing a high ORR activity in acidic media.

TABLE 2

Summary of the surface areas, pore volumes (at 0.95 bar), and ORR activities of selected electrocatalysts.

| Material | BET surface area ($m^2$ $g^{-1}$) | Pore Volume ($cm^3$ $g^{-1}$) | Onset potential (V vs. RHE) | Half-wave potential (V vs. RHE) | Current density at 0.8 V (vs. RHE mA $cm^{-2}$) |
|---|---|---|---|---|---|
| H—Fe—$N_x$—C | 917 | 0.611 | 0.950 | 0.77 | 1.68 |
| H—Co—$N_x$—C | 1033 | 0.671 | 0.885 | 0.74 | 0.52 |
| H—Ni—Nx—C | 968 | 0.655 | 0.782 | 0.44 | 0 |
| H—FeCo—$N_x$—C | 962 | 0.630 | 0.943 | 0.75 | 1.06 |
| H—FeNi—$N_x$—C | 887 | 0.594 | 0.913 | 0.75 | 0.93 |
| H—CoNi—$N_x$—C | 950 | 0.650 | 0.876 | 0.73 | 0.28 |
| H—FeCoNi—$N_x$—C | 919 | 0.618 | 0.901 | 0.74 | 0.56 |
| NPCC | 1152 | 0.938 | 0.793 | 0.45 | 0 |
| Pt/C (30% of Pt) | n/d | n/d | 1.0 | 0.83 | 3.6 | n/d = not determined.

Electrocatalytic $O_2$ Reduction and Proton Exchange Membrane Fuel Cell Performance Nitrogen-doped carbon materials (M-$N_x$—C) with embedded metal-nitrogen-doped active sites, such as Fe—$N_x$—C,[28,29,34, 51-53,57,70] Co—$N_x$—C,[19,27,47] and Fe—Co—$N_x$—C[40,64] attract interest as potential alternatives for platinum catalysts in acidic proton exchange membrane fuel cells. The oxygen reduction reaction (ORR) plays a key role in these devices. The synthetic methodology introduced herein offers a platform for the development of new oxygen reduction catalysts. To explore the practical potential of our approach, we conducted a series of experiments to assess the electrocatalytic performance of the H-M-$N_x$—C and H-$M^{mix}$-$N_x$—C materials. We first tested their ORR performance in 0.5 M $H_2SO_4$ using a ring rotating disk electrode (RRDE) operated at 1600 rpm. The onset and half-wave potentials and ultimate current densities calculated from these measurements are summarized in Table 2. The performance of H—Fe—$N_x$—C, H—Co—$N_x$—C, and H—FeCo—$N_x$—C were very similar to those of a commercial Pt/C catalysts evaluated under the same conditions, and compare favorably against other high-performing ORR electrocatalysts reported in the literature (Table 5). The higher In view of the excellent electrochemical properties of these new catalysts, PEMFC performance tests on H—Fe—$N_x$—C, H—Co—$N_x$—C and H—FeCo—$N_x$—C were performed. These materials were utilized as cathode materials for the oxygen reduction reaction. Polarization curves were collected on 5 $cm^2$ membrane electrode assemblies at 80° C. and backpressures of 29.4 psia, using absolute oxygen as the gas feed to the cathode catalysts in the fuel cells. A commercial Vulcan XC72 carbon supported platinum catalyst was employed as the anode for the $H_2$ oxidation reaction.

Figure 52:
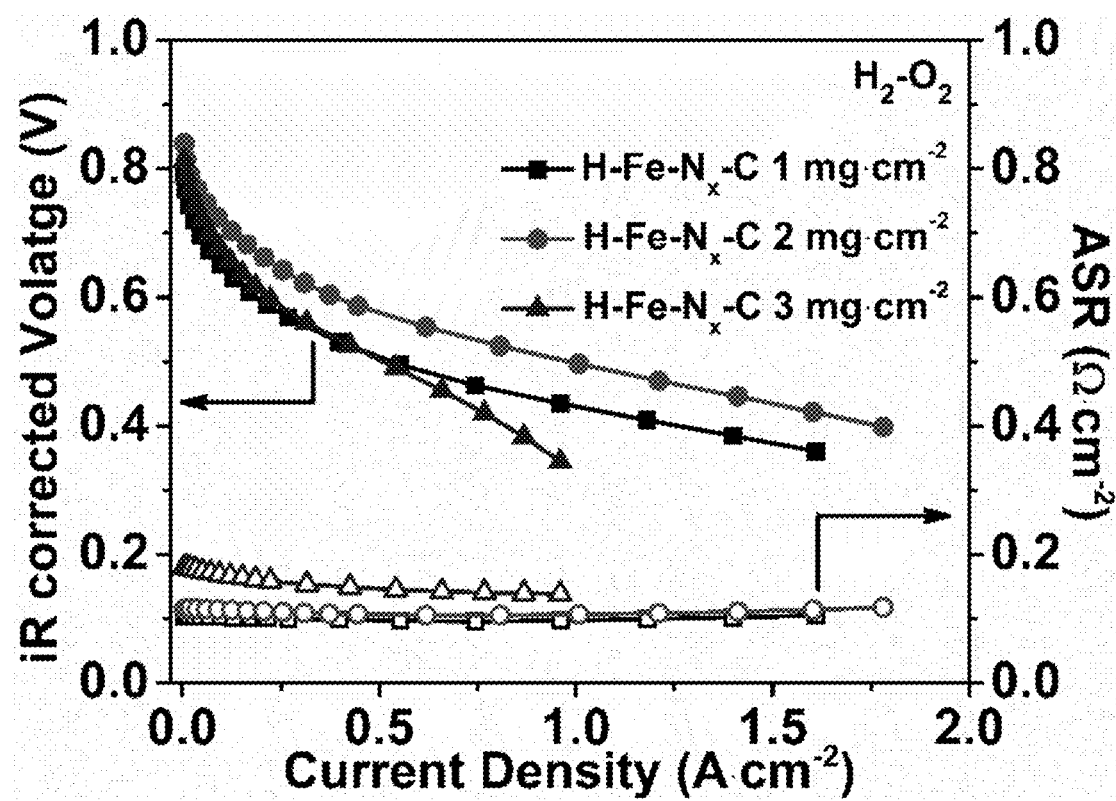
FIG. 52 shows polarization and corresponding resistance curves of H—Fe—$N_x$—C for $H_2$—$O_2$ PEM fuel cells with different cathode catalyst loadings.

Under a catalyst loading of 2 mg $cm^{-2}$, the open-circuit voltages (OCV) of H—Fe—$N_x$—C, H—Co—$N_x$—C and H—FeCo—$N_x$—C in these $H_2/O_2$ fuel cells were 0.85 V, 0.86 V and 0.88 V, respectively (FIG. 7c). At a working voltage of 0.43 V, a current density of 1.55 Å $cm^{-2}$ and a peak power density of 0.655 W $cm^{-2}$ were achieved using a H—Fe—$N_x$—C based membrane electrode assembly (MEA), which are higher than those of the MEAs made with H—Co—$N_x$—C (0.103 Å $cm^{-2}$ and 0.457 W $cm^{-2}$) and H—FeCo—$N_x$—C (0.104 Å $cm^{-2}$ and 0.459 W $cm^{-2}$). The maximum power density of the cell constructed with H—Fe—$N_x$—C was 0.71 W $cm^{-2}$ at 0.4 V, far superior to the values of 0.63 W $cm^{-2}$ at 0.38 V for H—Co—$N_x$—C and 0.6 W $cm^{-2}$ at 0.37 V for H—FeCo—$N_x$—C (FIG. 7c). These values are comparable to those of other reported ZIF-derived noble-metal free catalysts for PEMFCs (Table 6). The PEMFC performance of H—Fe—$N_x$—C based cathodes with different catalyst mass loadings were also investigated. The cathode with a 2 mg $cm^{-2}$ loading of H—Fe—$N_x$—C showed the highest OCV and power density (FIG. 52). The durability of the cell (with 2 mg $cm^{-2}$ of H—Fe—$N_x$—C electrocatalyst) was explored by holding it at a constant voltage of 0.7 V and collecting polarization curves before and after operation over a period of 30 hours (FIG. 7d). A steady decay of fuel cell OCV and current density were observed. Thus, improvements in stability are required before this material can be used in real applications. H—Fe—$N_x$—C also showed relatively low performance in a $H_2$-air battery test (FIGS. 7e, 7f).

Taken together, these experimental results reveal valuable information about our general synthetic methodology that involves introducing transition metal cations into a core-shell polymer composite precursor and then pyrolysis to deliver hollow metal-nitrogen-doped porous carbon catalysts. These catalysts provide abundant single metal sites (Fe, Co, or Ni) or a plurality of metal sites (Fe/Co, Fe/Ni, or Fe/Co/Ni), which are anchored on the walls of hollow nitrogen-doped porous carbon capsules created by the pyrolysis of the organic matter in the composite precursor. The metal-nitrogen sites in these materials were identified as porphyrin-like sites by various advanced characterization techniques. The hollow nitrogen-doped carbon matrix has an electrically conductive and highly accessible surface area (>900 $m^2\ g^{-1}$) and a network of large pores. These structural features allow for efficient mass transport and electron transfer. This range of characteristics is attractive from the viewpoint of electrocatalysis. To demonstrate the utility of our synthetic method for producing a broad library of nitrogen-doped porous carbon supporting metal-nitrogen active sites, the electrocatalytic performances was tested toward the ORR in acidic PEMFCs. A functional relationship was identified between the type of metal-nitrogen sites and their electrochemical activity. This report highlights how a single synthetic strategy can create diverse libraries of porous carbon catalysts supporting metal-single atom catalysts. Such versatility allows the fast synthesis and screening of diverse electrocatalysts for target applications. Improvements in overall catalytic activities and stability are demanded for practical applications, which may be achievable through judicious selection of the metals and relative proportions of individual metal components in the catalysts.

TABLE 3

X-ray absorption spectroscopy (XAS) measurements
Summary of K-edge EXAFS curve fitting parameters for H—M—$N_x$—C.

| material | path | [a]CN | [e]R, % | [b]R (Å) | [e]R, % | [c]$\sigma^2$ (Å) | [e]R, % | [d]ΔE | [e]R, % |
|---|---|---|---|---|---|---|---|---|---|
| H—Fe—$N_x$—C | Fe—N/C | 4 | 0.341 | 1.972 | 0.052 | 0.0096 | 0.008 | 3.54 | 0.022 |
|  | Fe—Fe | 0.7 | 0.563 | 2.644 | 0.012 | 0.007 | 0.001 | 3.54 | 0.022 |
| H—Co—$N_x$—C | Co—N | 0.8 | 0.311 | 1.819 | 0.014 | 0.007 | 0.004 | 3.583 | 0.008 |
|  | Co—N | 2.2 | 0.644 | 1.934 | 0.012 | 0.002 | 0.003 | 3.583 | 0.008 |
|  | Co—Co | 2 | 0.032 | 2.824 | 0.008 | 0.0028 | 0.004 | 3.583 | 0.008 |
| H—Ni—$N_x$—C | Ni—N | 2.64 | 0.84 | 1.415 | 0.016 | 0.008 | 0.001 | 5.48 | 0.00577 |
|  | Ni—C | 1 | 0.07 | 1.861 | 0.064 | 0.001 | 0.008 | 5.48 | 0.00577 |

[a]CN, coordination number;
[b]R, distance between absorber and backscatter atoms;
[c]$\sigma^2$, Debye-Waller factor to account for both thermal and structural disorders;
[d]$\Delta E_0$, inner potential correction;
[e]R factor (%), indicates the goodness of the fit.

TABLE 4

$^{57}$Fe Mössbauer Measurements
Mössbauer parameters derived from the fittings.

| component | δ (mm/s) | Qs (mm/s) | $H_{hf}$ (KOe) | FWHM (mm/s) | Area (%) |
|---|---|---|---|---|---|
| H—Fe—$N_x$—C ||||||
| D1 | 0.24 ± 0.01 | 0.97 ± 0.01 |  | 0.41 ± 0.01 | 34.9 |
| D2 | 0.35 ± 0.01 | 2.91 ± 0.02 |  | 0.51 ± 0.01 | 30.5 |
| D3 | 0.34 ± 0.02 | 1.48 ± 0.04 |  | 0.49 ± 0.01 | 18.8 |
| sext | 0.08 ± 0.01 | 0.44 ± 0.01 | 297.1 ± 1.4 | 0.21 ± 0.01 | 15.8 |
| H—FeCo—$N_x$—C ||||||
| D1 | 0.22 ± 0.02 | 0.79 ± 0.04 |  | 0.41 ± 0.01 | 17.9 |
| D2 | 0.42 ± 0.03 | 2.82 ± 0.07 |  | 0.50 ± 0.01 | 39.3 |
| D3 | 0.41 ± 0.01 | 1.29 ± 0.03 |  | 0.41 ± 0.01 | 25.2 |
| sext | 0.27 ± 0.03 | 0.31 ± 0.07 | 310.6 ± 7.7 | 0.39 ± 0.02 | 17.6 |
| H—FeCoNi—$N_x$—C ||||||
| D1 | 0.23 ± 0.02 | 0.84 ± 0.03 |  | 0.45 ± 0.01 | 23.9 |
| D2 | 0.77 ± 0.02 | 3.09 ± 0.04 |  | 0.64 ± 0.01 | 36.5 |
| D3 | 0.45 ± 0.01 | 1.41 ± 0.02 |  | 0.49 ± 0.01 | 34.5 |
| D4 | 0.38 ± 0.01 | 0.83 ± 0.03 |  | 0.15 ± 0.01 | 5.1 |

δ: Chemical Shift;
Qs: quadrupole splitting;
$H_{hf}$: Hyperfine magnetic field;
FWHM: full-width at half maximum;
Area %: relative spectral area % of each component

TABLE 5

Summary of the electrocatalytic ORR performance in acidic solution of the materials reported herein and compared to selected high-performance materials from the literature.

| catalyst | RRDE activity ($E_{1/2}$, V vs. RHE) | Electrolyte | Reference |
|---|---|---|---|
| H—Fe—$N_x$—C | 0.77 | 0.5M $H_2SO_4$ | This work |
| H—Co—$N_x$—C | 0.74 | 0.5M $H_2SO_4$ | This work |
| H—FeCo—$N_x$—C | 0.75 | 0.5M $H_2SO_4$ | This work |
| Co—N—C | 0.761 | 0.1M $HClO_4$ | ACS Catal. 2015, 5, 7068.[1] |
| Co—$N_x$ | 0.67 | 0.1M $HClO_4$ | Chem. Eur. J. 2011, 17, 2063.[2] |
| FeCo—NC | 0.74 | 0.05M $H_2SO_4$ | Small 2016, 12, 4193.[3] |
| Co/Zn(mIm)$_2$ | 0.76 | 0.1M $HClO_4$ | ChemElectroChem 2016, 3, 1541.[4] |
| ZIF-67-900 | 0.71 | 0.5M $H_2SO_4$ | J. Mater. Chem. A 2014, 2, 14064.[5] |
| Co—NC-900 | 0.5 | 0.1M $HClO_4$ | Nanoscale Res. Lett. 2017, 12, 144.[6] |
| Co—N/CNFs | 0.7 | 0.1M $HClO_4$ | ACS Catal. 2017, 7, 6864.[7] |
| Co—N—C | 0.5 | 0.5M $H_2SO_4$ | ChemCatChem 2017, 9, 1969.[8] |
| ZIF-C | 0.65 | 1M $HClO_4$ | Int. J. Electrochem. Sci. 2016, 11, 9295.[9] |
| CoP-CMP | 0.64 | 0.5M $H_2SO_4$ | Adv. Mater. 2014, 26, 1450.[10] |
| PANI-Co—C | 0.75 | 0.5M $H_2SO_4$ | Science 2011, 332, 443.[11] |
| ZIF-67 derived carbon | 0.71 | 0.1M $HClO_4$ | J. Mater. Chem. A 2014, 2, 11606.[12] |
| ISAS-Co/HNCS | 0.773 | 0.5M $H_2SO_4$ | J. Am. Chem. Soc 2017, 139, 17269.[13] |
| Co-doped ZIFs | 0.8-0.82 | 0.5M $H_2SO_4$ | Adv. Mater. 2018, 1706758.[14] |
| CPANI-Fe—NaCl | <0.73 | 0.1M $HClO_4$ | J. Am. Chem. Soc. 2015, 137, 5414.[15] |
| CPM-99Fe/C | ~0.75 | 0.1M $HClO_4$ | J. Am. Chem. Soc. 2015, 137, 2235.[16] |
| Fe—N/C-800 | ~0.60 | 0.1M $HClO_4$ | J. Am. Chem. Soc. 2014, 136, 11027.[17] |
| Fe-NT-G | ~0.76 | 0.1M $HClO_4$ | Nat. Nanotechnol. 2012, 7, 394.[18] |
| Fe$_3$C/C-700 | 0.73 | 0.1M $HClO_4$ | Angew. Chem. Int. Ed. 2014, 53, 3675.[19] |
| PFeTTPP-1000 | 0.76 | 0.1M $HClO_4$ | Angew. Chem. Int. Ed. 2013, 52, 8349.[20] |
| FeCo-OMPC | 0.85 | 0.1M $HClO_4$ | Sci. Rep. 2013, 3, 2715.[21] |
| (Fe, Mn)—N—C | 0.84 | 0.1M $HClO_4$ | Nat. Commun. 2015, 6, 8618.[22] |
| FePhen@MOF-ArNH$_3$ | 0.77 | 0.1M $HClO_4$ | Nat. Commun. 2015, 6, 7343.[23] |
| Fe$_3$C/NG-800 | 0.77 | 0.1M $HClO_4$ | Adv. Mater. 2015, 27, 2521.[24] |
| FeCo/C-800 | 0.76 | 0.1M $HClO_4$ | Adv. Mater. 2015, 27, 3431.[25] |

TABLE 6

Figure 47:
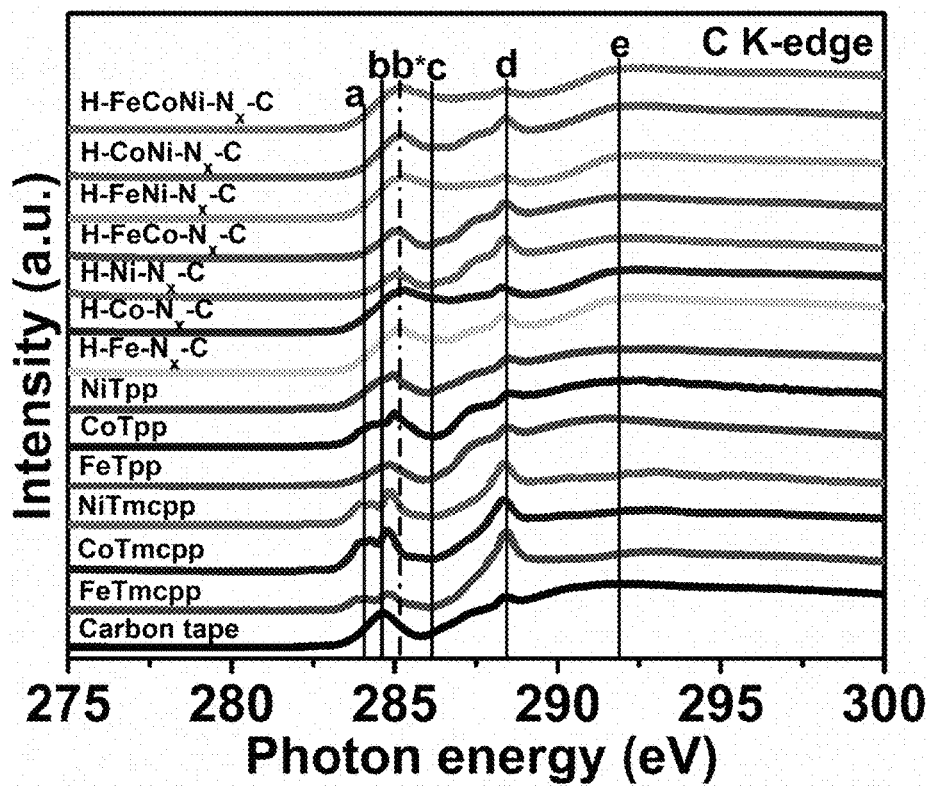
FIG. 47 shows the C K-edge XANES spectra for metal-organic frameworks described herein.

(FIG. 47). C K-edge XANES spectra for the different materials.
C K-edge XANES features and their assignments

| Peak | Photon energy (eV) | Species |
|---|---|---|
| a | 283.9 | π* porphyrin |
| b | 284.5 | π* C=C |
| b* | 285.1 | π* C=C |
| c | 286.5 | π* C—OH or C—O or C—NH—C |
| d | 288.3 | π* C=O, C=C—NH$_2$ |
| e | 292.3 | σ* C—C |

TABLE 7

Figure 48:
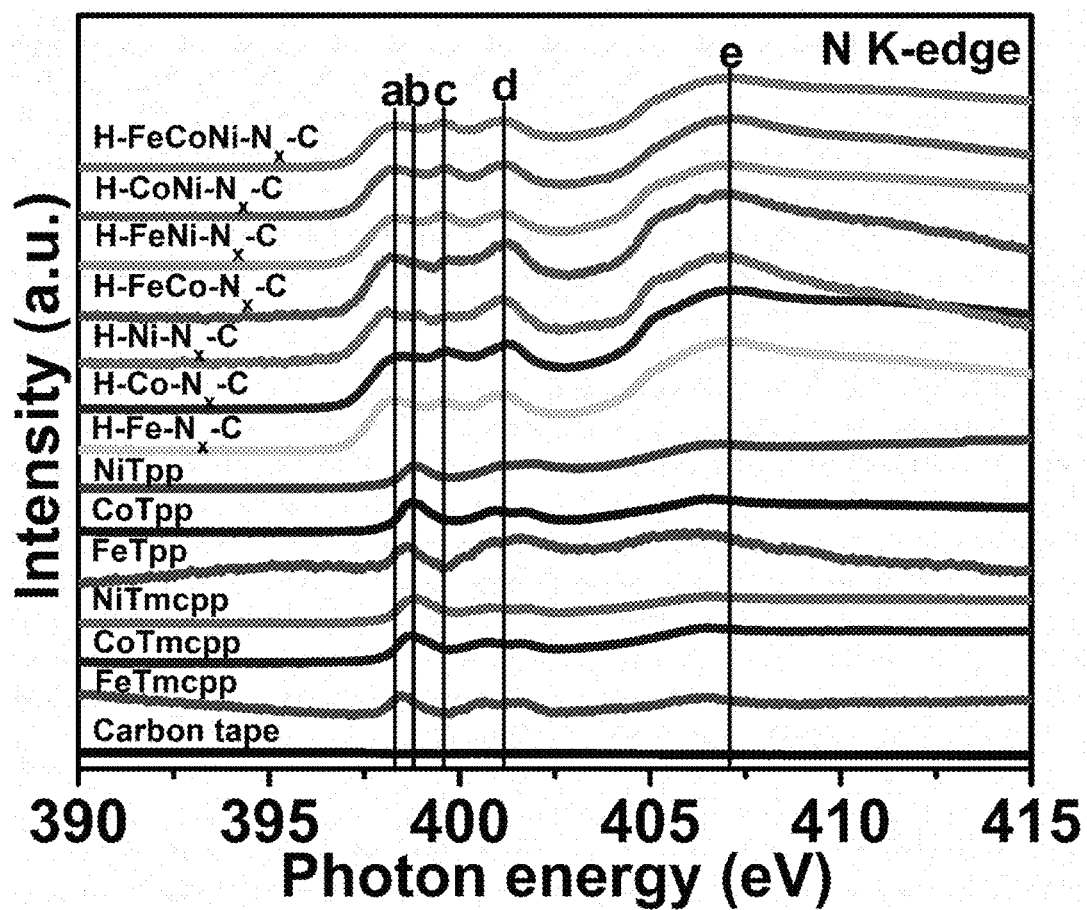
FIG. 48 shows the N K-edge XANES spectra for metal-organic frameworks described herein.

(FIG. 48). N K-edge XANES spectra for the different materials.
N K-edge XANES feaures and their assignments

| Peak | photon energy (eV) | Species |
|---|---|---|
| a | 398.3 | Pyridinic N (π* N=C) |
| b | 399.7 | Pyrrolic N (amino type species) σ* N—H |
| c | 401.2 | Graphite N |
| d | 405.3 | NH$^{4+}$/N—C/N—H |
| e | 407.1 | σ* C—N |

From the foregoing, it will be seen that aspects herein are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings is to be interpreted as illustrative and not in a limiting sense.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

REFERENCES (1). Benzigar, M. R.; Talapaneni, S. N.; Joseph, S.; Ramadass, K.; Singh, G.; Scaranto, J.; Ravon, U.; Al-Bahily, K.; Vinu, A. Recent Advances in Functionalized Micro and Mesoporous Carbon Materials: Synthesis and Applications. Chem. Soc. Rev. 2018, 47, 2680-2721.

(2). Zhang, P.; Zhu, H.; Dai, S. Porous Carbon Supports: Recent Advances with Various Morphologies and Compositions. ChemCatChem 2015, 7, 2788-2805.

(3). Lee, J.; Kim, J.; Hyeon, T. Recent Progress in the Synthesis of Porous Carbon Materials. Adv. Mater. 2006, 18, 2073-2094.

(4). Zhi, L.; Wang, J.; Cui, G.; Kastler, M.; Schmaltz, B.; Kolb, U.; Jonas, U.; Mullen, K. From Well-Defined Carbon-Rich Precursors to Monodisperse Carbon Particles with Hierarchic Structures. Adv. Mater. 2007, 19, 1849-1853.

(5). Xia, Y; Yang, Z.; Mokaya, R. Templated Nanoscale Porous Carbons. Nanoscale 2010, 2, 639-59.

(6). Galeano, C.; Meier, J. C.; Soorholtz, M.; Bongard, H.; Baldizzone, C.; Mayrhofer, K. J. J.; Schüth, F. Nitrogen-Doped Hollow Carbon Spheres as a Support for Platinum-Based Electrocatalysts. *ACS Catal.* 2014, 4, 3856-3868.

(7). Galeano, C.; Baldizzone, C.; Bongard, H.; Spliethoff, B.; Weidenthaler, C.; Meier, J. C.; Mayrhofer, K. J. J.; Schuth, F. Carbon-Based Yolk-Shell Materials for Fuel Cell Applications. *Adv. Funct. Mater.* 2014, 24, 220-232.

(8). Ikeda, S.; Ishino, S.; Harada, T.; Okamoto, N.; Sakata, T; Mori, H.; Kuwabata, S.; Torimoto, T; Matsumura, M. Ligand-Free Platinum Nanoparticles Encapsulated in a Hollow Porous Carbon Shell as a Highly Active Heterogeneous Hydrogenation Catalyst. *Angew. Chem. Int. Ed.* 2006, 45, 7063-7066.

(9). Liu, R.; Mahurin, S. M.; Li, C.; Unocic, R. R.; Idrobo, J. C.; Gao, H.; Pennycook, S. J.; Dai, S. Dopamine as a Carbon Source: the Controlled Synthesis of Hollow Carbon Spheres and Yolk-Structured Carbon Nanocomposites. *Angew. Chem. Int. Ed.* 2011, 50, 6799-6802.

(10). Wang, G. H.; Hilgert, J.; Richter, F. H.; Wang, F.; Bongard, H. J.; Spliethoff, B.; Weidenthaler, C.; Schuth, F. Platinum-Cobalt Bimetallic Nanoparticles in Hollow Carbon Nanospheres for Hydrogenolysis of 5-Hydroxymethylfurfural. *Nat. Mater.* 2014, 13, 293-300.

(11). Yang, H.; Bradley, S. J.; Chan, A.; Waterhouse, G. I.; Nann, T; Kruger, P. E.; Telfer, S. G. Catalytically Active Bimetallic Nanoparticles Supported on Porous Carbon Capsules Derived From Metal-Organic Framework Composites. *J. Am. Chem. Soc.* 2016, 138, 11872-11881.

(12). Yang, H.; Bradley, S. J.; Wu, X.; Chan, A.; Waterhouse, G. I. N.; Nann, T.; Zhang, J.; Kruger, P. E.; Ma, S.; Telfer, S. G. General Synthetic Strategy for Libraries of Supported Multicomponent Metal Nanoparticles. *ACS Nano* 2018, 12, 4594-4604.

(13). Guo, F.; Yang, H.; Liu, L.; Han, Y; AI-Enizi, A. M.; Nafady, A.; Kruger, P. E.; Telfer, S. G.; Ma, S. Hollow Capsules of Doped Carbon Incorporating Metal@Metal Sulfide and Metal@Metal Oxide Core-Shell Nanoparticles Derived from Metal-Organic Framework Composites for Efficient Oxygen Electrocatalysis. *J. Mater. Chem. A* 2019, 7, 3624-3631.

(14). Shen, M.; Wei, C.; Ai, K.; Lu, L. Transition Metal-Nitrogen-Carbon Nanostructured Catalysts for the Oxygen Reduction Reaction: From Mechanistic Insights to Structural Optimization. *Nano Research* 2017, 10, 1449-1470.

(15). Wu, G.; Zelenay, P. Nanostructured Nonprecious Metal Catalysts For Oxygen Reduction Reaction. *Acc. Chem. Res.* 2013, 46, 1878-89.

(16). Masa, J.; Xia, W; Muhler, M.; Schuhmann, W On the Role of Metals in Nitrogen-Doped Carbon Electrocatalysts for Oxygen Reduction. *Angew. Chem. Int. Ed.* 2015, 54, 10102-10120.

(17). Mamtani, K.; Ozkan, U. S. Heteroatom-Doped Carbon Nanostructures as Oxygen Reduction Reaction Catalysts in Acidic Media: An Overview. *Catal. Lett.* 2014, 145, 436-450.

(18). Wu, G.; More, K. L.; Johnston, C. M.; Zelenay, P. High-Performance Electrocatalysts for Oxygen Reduction Derived from Polyaniline, Iron, and Cobalt. *Science* 2011, 332, 443-447.

(19). Bashyam, R.; Zelenay, P. A Class of Non-Precious Metal Composite Catalysts for Fuel Cells. *Nature* 2006, 443, 63-66.

(20). Ding, W.; Wei, Z.; Chen, S.; Qi, X.; Yang, T.; Hu, J.; Wang, D.; Wan, L. J.; Alvi, S. F.; Li, L. Space-Confinement-Induced Synthesis of Pyridinic- and Pyrrolic-Nitrogen-Doped Graphene for the Catalysis of Oxygen Reduction. *Angew. Chem. Int. Ed.* 2013, 52, 11755-11759.

(21). Tang, J.; Liu, J.; Li, C.; Li, Y; Tade, M. O.; Dai, S.; Yamauchi, Y Synthesis of Nitrogen-Doped Mesoporous Carbon Spheres with Extra-Large Pores Through Assembly of Diblock Copolymer Micelles. *Angew. Chem. Int. Ed.* 2015, 54, 588-593.

(22). Lv, Q.; Si, W.; He, J.; Sun, L.; Zhang, C.; Wang, N.; Yang, Z.; Li, X.; Wang, X.; Deng, W; Long, Y; Huang, C.; Li, Y Selectively Nitrogen-Doped Carbon Materials as Superior Metal-Free Catalysts for Oxygen Reduction. *Nat. Commun.* 2018, 9, 3376.

(23). Zhao, Y; Wan, J.; Yao, H.; Zhang, L.; Lin, K.; Wang, L.; Yang, N.; Liu, D.; Song, L.; Zhu, J.; Gu, L.; Liu, L.; Zhao, H.; Li, Y; Wang, D. Few-Layer Graphdiyne Doped with Sp-hybridized Nitrogen Atoms at Acetylenic Sites for Oxygen Reduction Electrocatalysis. *Nat. Chem.* 2018, 10, 924-931.

(24). Zhao, Y; Watanabe, K.; Hashimoto, K. Self-Supporting Oxygen Reduction Electrocatalysts Made from a Nitrogen-Rich Network Polymer. *J. Am. Chem. Soc.* 2012, 134, 19528-19531.

(25). Serov, A.; Artyushkova, K.; Atanassov, P. Fe—N—C Oxygen Reduction Fuel Cell Catalyst Derived from Carbendazim: Synthesis, Structure, and Reactivity. *Adv. Eng. Mater.* 2014, 4, 1301735.

(26). Sahraie, N. R.; Kramm, U. I.; Steinberg, J.; Zhang, Y.; Thomas, A.; Reier, T.; Paraknowitsch, J. P.; Strasser, P. Quantifying the Rensity and Utilization of Active Sites in Non-Precious Metal Oxygen Electroreduction Catalysts. *Nat. Commun.* 2015, 6, 8618.

(27). Chang, S.-T.; Wang, C.-H.; Du, H.-Y; Hsu, H.-C.; Kang, C.-M.; Chen, C.-C.; Wu, J. C. S.; Yen, S.-C.; Huang, W—F.; Chen, L.-C.; Lin, M. C.; Chen, K.-H. Vitalizing Fuel Cells with Vitamins: Pyrolyzed Vitamin $B_{12}$ as a Non-Precious Catalyst for Enhanced Oxygen Reduction Reaction of Polymer Electrolyte Fuel Cells. *Energy Environ. Sci.* 2012, 5, 5305-5314.

(28). Fu, X.; Zamani, P.; Choi, J. Y; Hassan, F. M.; Jiang, G.; Higgins, D. C.; Zhang, Y; Hoque, M. A.; Chen, Z. In Situ Polymer Graphenization Ingrained with Nanoporosity in a Nitrogenous Electrocatalyst Boosting the Performance of Polymer-Electrolyte-Membrane Fuel Cells. *Adv. Mater.* 2017, 29, 1604456.

(29). Meng, F. L.; Wang, Z. L.; Zhong, H. X.; Wang, J.; Yan, J. M.; Zhang, X. B. Reactive Multifunctional Template-Induced Preparation of Fe—N-Doped Mesoporous Carbon Microspheres Towards Highly Efficient Electrocatalysts for Oxygen Reduction. *Adv. Mater.* 2016, 28, 7948-7955.

(30). Han, Y; Wang, Y G.; Chen, W.; Xu, R.; Zheng, L.; Zhang, J.; Luo, J.; Shen, R. A.; Zhu, Y; Cheong, W. C.; Chen, C.; Peng, Q.; Wang, D.; Li, Y Hollow N-Doped Carbon Spheres with Isolated Cobalt Single Atomic Sites: Superior Electrocatalysts for Oxygen Reduction. *J. Am. Chem. Soc.* 2017, 139, 17269-17272.

(31). Xiao, M.; Zhu, J.; Feng, L.; Liu, C.; Xing, W Meso/Macroporous Nitrogen-Doped Carbon Architectures with Iron Carbide Encapsulated in Graphitic Layers as an Efficient and Robust Catalyst for the Oxygen Reduction Reaction in Both Acidic and Alkaline solutions. *Adv. Mater.* 2015, 27, 2521-2527.

(32). Wang, Y C.; Lai, Y J.; Song, L.; Zhou, Z. Y; Liu, J. G.; Wang, Q.; Yang, X. D.; Chen, C.; Shi, W.; Zheng, Y P.; Rauf, M.; Sun, S. G. S-Doping of an Fe/N/C ORR Catalyst for Polymer Electrolyte Membrane Fuel Cells with High Power Density. *Angew. Chem. Int. Ed.* 2015, 54, 9907-9910.

(33). Chen, Y; Li, Z.; Zhu, Y; Sun, D.; Liu, X.; Xu, L.; Tang, Y Atomic Fe Dispersed on N-Doped Carbon Hollow Nanospheres for High-Efficiency Electrocatalytic Oxygen Reduction. *Adv. Mater.* 2019, 31, 1806312.

(34). Yuan, S.; Shui, J. L.; Grabstanowicz, L.; Chen, C.; Commet, S.; Reprogle, B.; Xu, T.; Yu, L.; Liu, D. J. A highly Active and Support-Free Oxygen Reduction Catalyst Prepared from Ultrahigh-Surface-Area Porous Polyporphyrin. *Angew. Chem. Int. Ed.* 2013, 52, 8349-8353.

(35). Workman, M. J.; Serov, A.; Tsui, L.-k.; Atanassov, P.; Artyushkova, K. Fe—N—C Catalyst Graphitic Layer Structure and Fuel Cell Performance. *ACS Energy Lett.* 2017, 2, 1489-1493.

(36). Liang, H. W.; Wei, W.; Wu, Z. S.; Feng, X.; Mullen, K. Mesoporous Metal-Nitrogen-Doped Carbon Electrocatalysts for Highly Efficient Oxygen Reduction Reaction. *J. Am. Chem. Soc.* 2013, 135, 16002-16005.

(37). Xie, J.; Li, B. Q.; Peng, H. J.; Song, Y W; Li, J. X.; Zhang, Z. W; Zhang, Q. From Supramolecular Species to Self-Templated Porous Carbon and Metal-Doped Carbon for Oxygen Reduction Reaction Catalysts. *Angew. Chem. Int. Ed.* 2019, 58, 4963-4967.

(38). Zhang, Z.; Dou, M.; Liu, H.; Dai, L.; Wang, F. A Facile Route to Bimetal and Nitrogen-Codoped 3D Porous Graphitic Carbon Networks for Efficient Oxygen Reduction. *Small* 2016, 12, 4193-4199.

(39). Liang, H. W.; Bruller, S.; Dong, R.; Zhang, J.; Feng, X.; Mullen, K. Molecular Metal-$N_x$ Centres in Porous Carbon for Electrocatalytic Hydrogen Evolution. *Nat. Commun.* 2015, 6, 7992.

(40). Palaniselvam, T.; Kashyap, V.; Bhange, S. N.; Baek, J.-B.; Kurungot, S. Nanoporous Graphene Enriched with Fe/Co—N Active Sites as a Promising Oxygen Reduction Electrocatalyst for Anion Exchange Membrane Fuel Cells. *Adv. Funct. Mater.* 2016, 26, 2150-2162.

(41). Fei, H. L.; Dong, J. C.; Feng, Y X.; Allen, C. S.; Wan, C. Z.; Volosskiy, B.; Li, M. F.; Zhao, Z. P.; Wang, Y L.; Sun, H. T.; An, P. F.; Chen, W X.; Guo, Z. Y; Lee, C.; Chen, D. L.; Shakir, I.; Liu, M. J.; Hu, T. D.; Li, Y D.; Kirkland, A. I.; Duan, X. F.; Huang, Y General Synthesis and Definitive Structural Identification of MN4C4 Single-Atom Catalysts with Tunable Electrocatalytic Activities. *Nat. Catal.* 2018, 1, 63-72.

(42). Fei, H.; Dong, J.; Arellano-Jimenez, M. J.; Ye, G.; Dong Kim, N.; Samuel, E. L.; Peng, Z.; Zhu, Z.; Qin, F.; Bao, J.; Yacaman, M. J.; Ajayan, P. M.; Chen, D.; Tour, J. M. Atomic Cobalt on Nitrogen-Doped Graphene for Hydrogen Generation. *Nat. Commun.* 2015, 6, 8668.

(43). Zhao, L.; Zhang, Y; Huang, L. B.; Liu, X. Z.; Zhang, Q. H.; He, C.; Wu, Z. Y; Zhang, L. J.; Wu, J.; Yang, W.; Gu, L.; Hu, J. S.; Wan, L. J. Cascade Anchoring Strategy for General Mass Production of High-Loading Single-Atomic Metal-Nitrogen Catalysts. *Nat. Commun.* 2019, 10, 1278.

(44). Lee, J. H.; Park, M. J.; Yoo, S. J.; Jang, J. H.; Kim, H. J.; Nam, S. W.; Yoon, C. W; Kim, J. Y A Highly Active and Durable Co—N—C Electrocatalyst Synthesized Using Exfoliated Graphitic Carbon Nitride Nanosheets. *Nanoscale* 2015, 7, 10334-10339.

(45). Sa, Y J.; Seo, D. J.; Woo, J.; Lim, J. T.; Cheon, J. Y; Yang, S. Y; Lee, J. M.; Kang, D.; Shin, T. J.; Shin, H. S.; Jeong, H. Y; Kim, C. S.; Kim, M. G.; Kim, T. Y; Joo, S. H. A General Approach to Preferential Formation of Active Fe—$N_x$ Sites in Fe—N/C Electrocatalysts for Efficient Oxygen Reduction Reaction. *J. Am. Chem. Soc.* 2016, 138, 15046-15056.

(46). Ma, S.; Goenaga, G. A.; Call, A. V.; Liu, D. J. Cobalt Imidazolate Framework as Precursor for Oxygen Reduction Reaction Electrocatalysts. *Chem. Eur. J.* 2011, 17, 2063-2067.

(47). Wang, X. X.; Cullen, D. A.; Pan, Y-T.; Hwang, S.; Wang, M.; Feng, Z.; Wang, J.; Engelhard, M. H.; Zhang, H.; He, Y; Shao, Y; Su, D.; More, K. L.; Spendelow, J. S.; Wu, G. Nitrogen-Coordinated Single Cobalt Atom Catalysts for Oxygen Reduction in Proton Exchange Membrane Fuel Cells. *Adv. Mater.* 2018, 30, 1706758.

(48). Chen, Y Z.; Wang, C.; Wu, Z. Y; Xiong, Y; Xu, Q.; Yu, S. H.; Jiang, H. L. From Bimetallic Metal-Organic Framework to Porous Carbon: High Surface Area and Multicomponent Active Dopants for Excellent Electrocatalysis. *Adv. Mater.* 2015, 27, 5010-5016.

(49). Zitolo, A.; Ranjbar-Sahraie, N.; Mineva, T.; Li, J.; Jia, Q.; Stamatin, S.; Harrington, G. F.; Lyth, S. M.; Krtil, P.; Mukerjee, S.; Fonda, E.; Jaouen, F. Identification of Catalytic Sites in Cobalt-Nitrogen-Carbon Materials for the Oxygen Reduction Reaction. *Nat. Commun.* 2017, 8, 957.

(50). Zang, W; Sumboja, A.; Ma, Y; Zhang, H.; Wu, Y; Wu, S.; Wu, H.; Liu, Z.; Guan, C.; Wang, J.; Pennycook, S. J. Single Co Atoms Anchored in Porous N-Doped Carbon for Efficient Zinc-Air Battery Cathodes. *ACS Catal.* 2018, 8961-8969.

(51). Shui, J.; Chen, C.; Grabstanowicz, L.; Zhao, D.; Liu, D. J. Highly Efficient Nonprecious Metal Catalyst Prepared with Metal-Organic Framework in a Continuous Carbon Nanofibrous Network. *PNAS* 2015, 112, 10629-10634.

(52). Zhao, D.; Shui, J. L.; Grabstanowicz, L. R.; Chen, C.; Commet, S. M.; Xu, T; Lu, J.; Liu, D. J. Highly Efficient Non-Precious Metal Electrocatalysts Prepared from One-Pot Synthesized Zeolitic Imidazolate Frameworks. *Adv. Mater.* 2014, 26, 1093-1097.

(53). Tian, J.; Morozan, A.; Sougrati, M. T.; Lefevre, M.; Chenitz, R.; Dodelet, J. P.; Jones, D.; Jaouen, F. Optimized Synthesis of Fe/N/C Cathode Catalysts for PEM Fuel Cells: A Matter of Iron-Ligand Coordination Strength. *Angew. Chem. Int. Ed.* 2013, 52, 6867-6870.

(54). Proietti, E.; Jaouen, F.; Lefevre, M.; Larouche, N.; Tian, J.; Herranz, J.; Dodelet, J. P. Iron-Based Cathode Catalyst with Enhanced Power Density in Polymer Electrolyte Membrane Fuel Cells. *Nat. Commun.* 2011, 2, 416.

(55). Li, J.; Ghoshal, S.; Liang, W; Sougrati, M.-T.; Jaouen, F.; Halevi, B.; McKinney, S.; McCool, G.; Ma, C.; Yuan, X.; Ma, Z.-F.; Mukerjee, S.; Jia, Q. Structural and Mechanistic Basis for the High Activity of Fe—N—C Catalysts Toward Oxygen Reduction. *Energy Environ. Sci.* 2016, 9, 2418-2432.

(56). Zhang, C.; Wang, Y C.; An, B.; Huang, R.; Wang, C.; Zhou, Z.; Lin, W. Networking Pyrolyzed Zeolitic Imidazolate Frameworks by Carbon Nanotubes Improves Conductivity and Enhances Oxygen-Reduction Performance in Polymer-Electrolyte-Membrane Fuel Cells. *Adv. Mater.* 2017, 29, 1604556.

(57). Liu, Q.; Liu, X.; Zheng, L.; Shui, J. The Solid-Phase Synthesis of an Fe—N—C Electrocatalyst for High-Power Proton-Exchange Membrane Fuel Cells. *Angew. Chem. Int. Ed.* 2018, 57, 1204-1208.

(58). Cantillo, N. M.; Goenaga, G. A.; Gao, W.; Williams, K.; Neal, C. A.; Ma, S.; More, K. L.; Zawodzinski, T. A. Investigation of a Microporous Iron(iii) Porphyrin Framework Derived Cathode Catalyst in PEM Fuel Cells. *J. Mater. Chem. A* 2016, 4, 15621-15630.

(59). Zhu, Q.-L.; Xia, W.; Zheng, L.-R.; Zou, R.; Liu, Z.; Xu, Q. Atomically Dispersed Fe/N-Doped Hierarchical Carbon Architectures Derived from a Metal-Organic Framework Composite for Extremely Efficient Electrocatalysis. *ACS Energy Lett.* 2017, 2, 504-511.

(60). Chen, Y; Ji, S.; Zhao, S.; Chen, W.; Dong, J.; Cheong, W C.; Shen, R.; Wen, X.; Zheng, L.; Rykov, A. I.; Cai, S.; Tang, H.; Zhuang, Z.; Chen, C.; Peng, Q.; Wang, D.; Li, Y Enhanced Oxygen Reduction with Single-Atomic-Site Iron Catalysts for a Zinc-Air Battery and Hydrogen-Air Fuel Cell. *Nat. Commun.* 2018, 9, 5422.

(61). Zhang, H.; Hwang, S.; Wang, M.; Feng, Z.; Karakalos, S.; Luo, L.; Qiao, Z.; Xie, X.; Wang, C.; Su, D.; Shao, Y; Wu, G. Single Atomic Iron Catalysts for Oxygen Reduction in Acidic Media: Particle Size Control and Thermal Activation. *J. Am. Chem. Soc.* 2017, 139, 14143-14149.

(62). Shen, H.; Gracia-Espino, E.; Ma, J.; Zang, K.; Luo, J.; Wang, L.; Gao, S.; Mamat, X.; Hu, G.; Wagberg, T.; Guo, S. Synergistic Effects between Atomically Dispersed Fe—N—C and C—S—C for the Oxygen Reduction Reaction in Acidic Media. *Angew. Chem. Int. Ed.* 2017, 56, 13800-13804.

(63). Lin, Q.; Bu, X.; Kong, A.; Mao, C.; Bu, F.; Feng, P. Heterometal-Embedded Organic Conjugate Frameworks from Alternating Monomeric Iron and Cobalt Metalloporphyrins and Their Application in Design of Porous Carbon Catalysts. *Adv. Mater.* 2015, 27, 3431-3436.

(64). Wang, J.; Huang, Z.; Liu, W.; Chang, C.; Tang, H.; Li, Z.; Chen, W.; Jia, C.; Yao, T.; Wei, S.; Wu, Y; Li, Y Design of N-Coordinated Dual-Metal Sites: A Stable and Active Pt-Free Catalyst for Acidic Oxygen Reduction Reaction. *J. Am. Chem. Soc.* 2017, 139, 17281-17284.

(65). Zhao, R.; Liang, Z.; Gao, S.; Yang, C.; Zhu, B.; Zhao, J.; Qu, C.; Zou, R.; Xu, Q. Puffing Up Energetic Metal-Organic Frameworks to Large Carbon Networks with Hierarchical Porosity and Atomically Dispersed Metal Sites. *Angew. Chem. Int. Ed.* 2019, 58, 1975-1979.

(66). Zitolo, A.; Goellner, V.; Armel, V.; Sougrati, M. T.; Mineva, T.; Stievano, L.; Fonda, E.; Jaouen, F. Identification of Catalytic Sites for Oxygen Reduction in Iron- and Nitrogen-Doped Graphene Materials. *Nat. Mater.* 2015, 14, 937-942.

(67). Kramm, U. I.; Lefevre, M.; Larouche, N.; Schmeisser, D.; Dodelet, J. P. Correlations between Mass Activity and Physicochemical Properties of Fe/N/C Catalysts for the ORR in PEM Fuel Cell via $^{57}$Fe Mossbauer Spectroscopy and Other Techniques. *J. Am. Chem. Soc.* 2014, 136, 978-985.

(68). Roelfes, G.; Vrajmasu, V.; Chen, K.; Ho, R. Y; Rohde, J. U.; Zondervan, C.; La Crois, R. M.; Schudde, E. P.; Lutz, M.; Spek, A. L.; Hage, R.; Feringa, B. L.; Munck, E.; Que, L., Jr. End-on and Side-on Peroxo Derivatives of Non-Heme Iron Complexes with Pentadentate Ligands: Models for Putative Intermediates in Biological Iron/Dioxygen Chemistry. *Inorg. Chem.* 2003, 42, 2639-2653.

(69). Jiang, W J.; Gu, L.; Li, L.; Zhang, Y; Zhang, X.; Zhang, L. J.; Wang, J. Q.; Hu, J. S.; Wei, Z.; Wan, L. J. Understanding the High Activity of Fe—N—C Electrocatalysts in Oxygen Reduction: Fe/Fe$_3$C Nanoparticles Boost the Activity of Fe—N$_{(x)}$. *J. Am. Chem. Soc.* 2016, 138, 3570-3578.

(70). Chung, H. T.; Cullen, D. A.; Higgins, D.; Sneed, B. T.; Holby, E. F.; More, K. L.; Zelenay, P. Direct Atomic-Level Insight into the Active Sites of a High-Performance PGM-Free ORR Catalyst. *Science* 2017, 357, 479-484.

(71). Gokhale, R.; Chen, Y; Serov, A.; Artyushkova, K.; Atanassov, P. Novel Dual Templating Approach for Preparation of Highly Active Fe—N—C Electrocatalyst for Oxygen Reduction. *Electrochim. Acta* 2017, 224, 49-55.

(72). Goenaga, G. A.; Roy, A. L.; Cantillo, N. M.; Foister, S.; Zawodzinski, T. A. A Family of Platinum Group Metal-Free Catalysts for Oxygen Reduction in Alkaline Media. *J. Power Sources* 2018, 395, 148-157.

(73). Venna, S. R.; Jasinski, J. B.; Carreon, M. A. Structural Evolution of Zeolitic Imidazolate Framework-8. *J. Am. Chem. Soc.* 2010, 132, 18030-18033.

What is claimed is:

1. A metal-organic framework comprising a carbon matrix doped with nitrogen atoms, wherein transition metal ions are bonded to the carbon matrix via the nitrogen atoms, the metal-organic framework comprising a zeolitic imidazolate framework that is ZIF-1, ZIF-2, ZIF-3, ZIF-4, ZIF-5, ZIF-7, or any combination thereof;
wherein the transition metal ions are coordinated by nitrogen atoms, with isolated metal cation sites anchored on capsule walls, wherein the metal-organic framework has a total pore volume of about 0.5 cm$^3$/g, and wherein the metal-organic framework has a Brunauer-Emmett-Teller (BET) surface area of about 800 m$^2$/g to about 1,000 m$^2$/g.

2. The metal-organic framework of claim 1, wherein the metal-organic framework is produced by
(a) pyrolyzing a metal-organic framework precursor, wherein the metal-organic framework precursor comprises a zeolitic imidazolate framework comprising a polyphenol coating with one or more transition metal ions to produce a first pyrolyzed product;
(b) contacting the first pyrolyzed product with an acid to produce a second product; and
(c) pyrolyzing the second product to produce the metal-organic framework.

3. The metal-organic framework of claim 2, wherein the metal-organic framework precursor is produced by (i) coating the zeolitic imidazolate framework with a polyphenol or salt thereof to produce a first coated product; and (ii) admixing the first coated product with one or more transition metal salts.

4. The metal-organic framework of claim 3, wherein the polyphenol salt comprises an alkali metal salt or an alkaline earth metal salt.

5. The metal-organic framework of claim 2, wherein the zeolitic imidazolate framework (ZIF) is a zinc-based ZIF.

6. The metal-organic framework of claim 2, wherein the polyphenol comprises tannic acid.

7. The metal-organic framework of claim 2, wherein the metal-organic framework precursor is pyrolyzed at a temperature up to about 1,200° C. under an inert atmosphere.

8. The metal-organic framework of claim 2, wherein the first pyrolyzed product is admixed with an acid having a concentration of from about 0.1 M to about 1.0 M.

9. The metal-organic framework of claim 2, wherein the second product is pyrolyzed at a temperature up to about 1,200° C.

10. The metal-organic framework of claim 2, wherein the second product is pyrolyzed under an inert atmosphere.

11. The metal-organic framework of claim 1, wherein the transition metal ions comprises iron, nickel, cobalt, platinum, palladium, rhodium, iridium, rhenium, ruthenium, chromium, or any combination thereof.

12. The metal-organic framework of claim 1, wherein the transition metal ions comprises iron alone or in combination with nickel, cobalt, or a combination thereof.

13. The metal-organic framework of claim 1, wherein the transition metal ions are from 0.2 wt % to 3 wt % of the metal-organic framework.

14. The metal-organic framework of claim 1, wherein the metal-organic framework has nitrogen in the amount of from about 1 wt % to about 20 wt %.

15. The metal-organic framework of claim 1, wherein tannic acid is complexed with $K^+$ and coated on the surface of the zeolitic imidazolate framework, wherein the K+ can then be exchanged with other metal ions to load different metal ions, and wherein after ion exchange is completed, the metal-organic framework is placed in a tube furnace and annealed at 900° C. for 3 hours in an Ar atmosphere.

16. The metal-organic framework of claim 15, wherein the metal-organic framework comprises hollow carbon-supported single-atom metal materials.

* * * * *